United States Patent
Nelson et al.

(10) Patent No.: US 8,639,634 B2
(45) Date of Patent: Jan. 28, 2014

(54) SYSTEM AND METHOD FOR ADMINISTRATION OF EMPLOYEE LEAVE

(75) Inventors: Karen J. Nelson, Farmington, CT (US); Marjorie E. Savage, Wolcott, CT (US); Fredrick J. Weber, Berkeley, CA (US)

(73) Assignee: Hartford Fire Insurance Company, Hartford, CT (US)

( * ) Notice: Subject to any disclaimer, the term of this patent is extended or adjusted under 35 U.S.C. 154(b) by 187 days.

(21) Appl. No.: 13/025,498

(22) Filed: Feb. 11, 2011

(65) Prior Publication Data
US 2012/0030128 A1 Feb. 2, 2012

Related U.S. Application Data

(60) Provisional application No. 61/368,304, filed on Jul. 28, 2010.

(51) Int. Cl.
*G06Q 10/00* (2012.01)
(52) U.S. Cl.
USPC .................................................. 705/322
(58) Field of Classification Search
None
See application file for complete search history.

(56) References Cited

U.S. PATENT DOCUMENTS

| | | | |
|---|---|---|---|
| 7,974,857 B1 * | 7/2011 | Fischer et al. | 705/4 |
| 2005/0060174 A1 * | 3/2005 | Heyward et al. | 705/1 |
| 2006/0224478 A1 * | 10/2006 | Harbison et al. | 705/32 |
| 2008/0195512 A1 | 8/2008 | Klebanoff et al. | |
| 2010/0036671 A1 | 2/2010 | Chu et al. | |

OTHER PUBLICATIONS

Synchrony Integrated Absence Management. Oct. 2006. Travelers Insurance Company, Hartford, CT.
Smart Companies Know the Key to Growth is Keeping Workers Working. 2006. Metropolitan Life Insurance Company, Hartford, CT.

* cited by examiner

*Primary Examiner* — Jami A Plucinski
*Assistant Examiner* — Shaun Sensenig
(74) *Attorney, Agent, or Firm* — Howard IP Law Group, PC

(57) ABSTRACT

A computer system and computer-implemented method are provided for management of employee leave and absence policies. The system is configured to receive data related to an employee leave claim at a single point of contact. The single point of contact may be implemented as a single address for leave issues related to any type of leave, including for example for employment-related injuries compensated through workers compensation, short term disability, long-term disability, and other types of leave. The system may be configured to provide prompts to a user for claims relating to multiple types of leave. The system may be configured to furnish data to separate computer systems for administration of multiple types of leave. The system may be configured to provide communications related to employee leave claims between separate computer systems responsive to receipt of data from one or more of the computer systems.

24 Claims, 66 Drawing Sheets

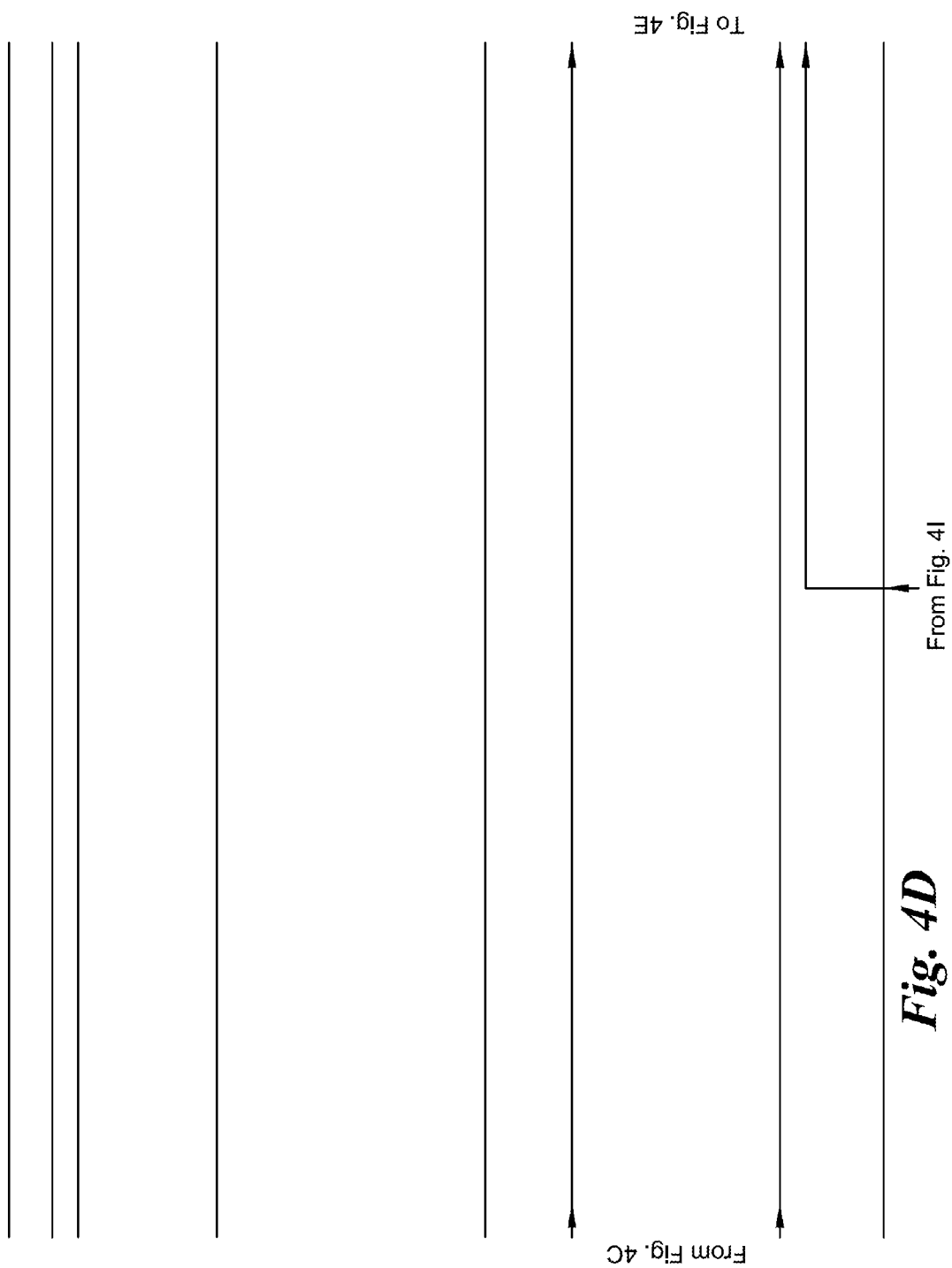

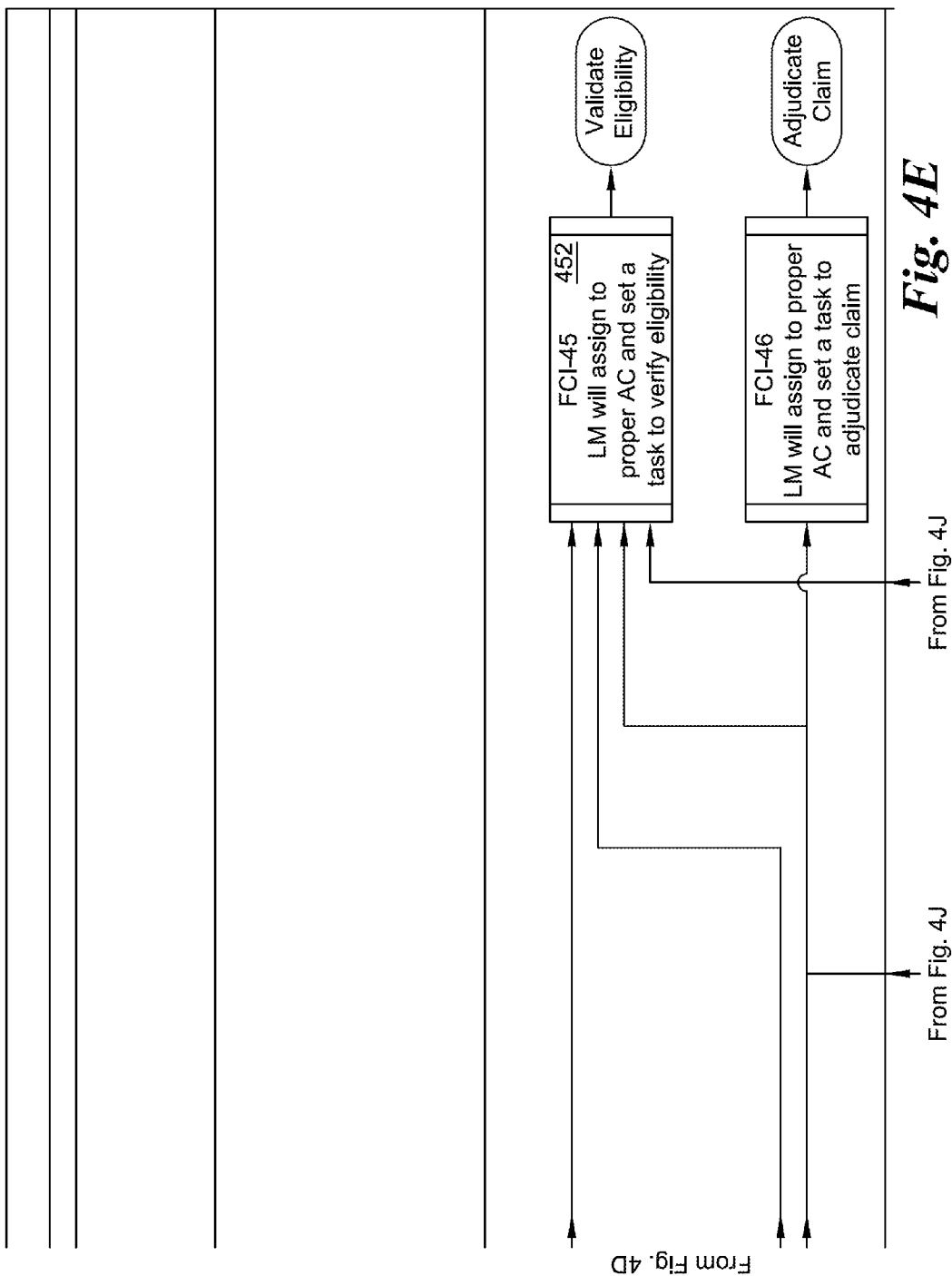

Leave Management - Validate Eligibility

| Intake Absence Coordinator (Blue) | LM System (Green) | MailRoom (Yellow) | Employee/ Employer (Orange) | STD/WC (Pink) | |
|---|---|---|---|---|---|
| | | | | | |

| Fig. 5A | Fig. 5B | Fig. 5C |
|---|---|---|
| Fig. 5D | Fig. 5E | Fig. 5F |

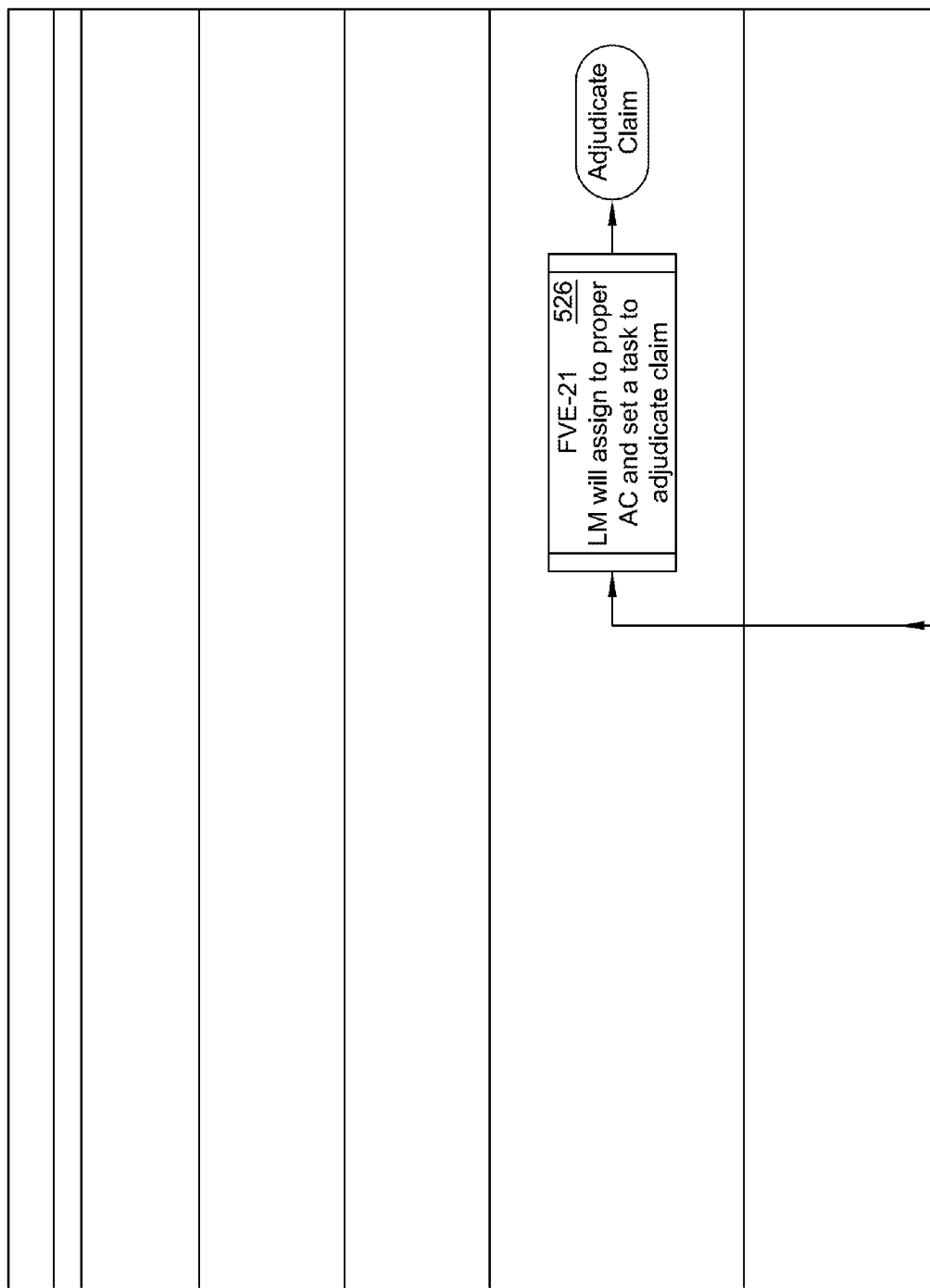

| Team Lead/AD<br>Clinical Resource<br>(Purple) | Assigned Absence Coordinator<br>(White) |
|---|---|

*Fig. 6G*

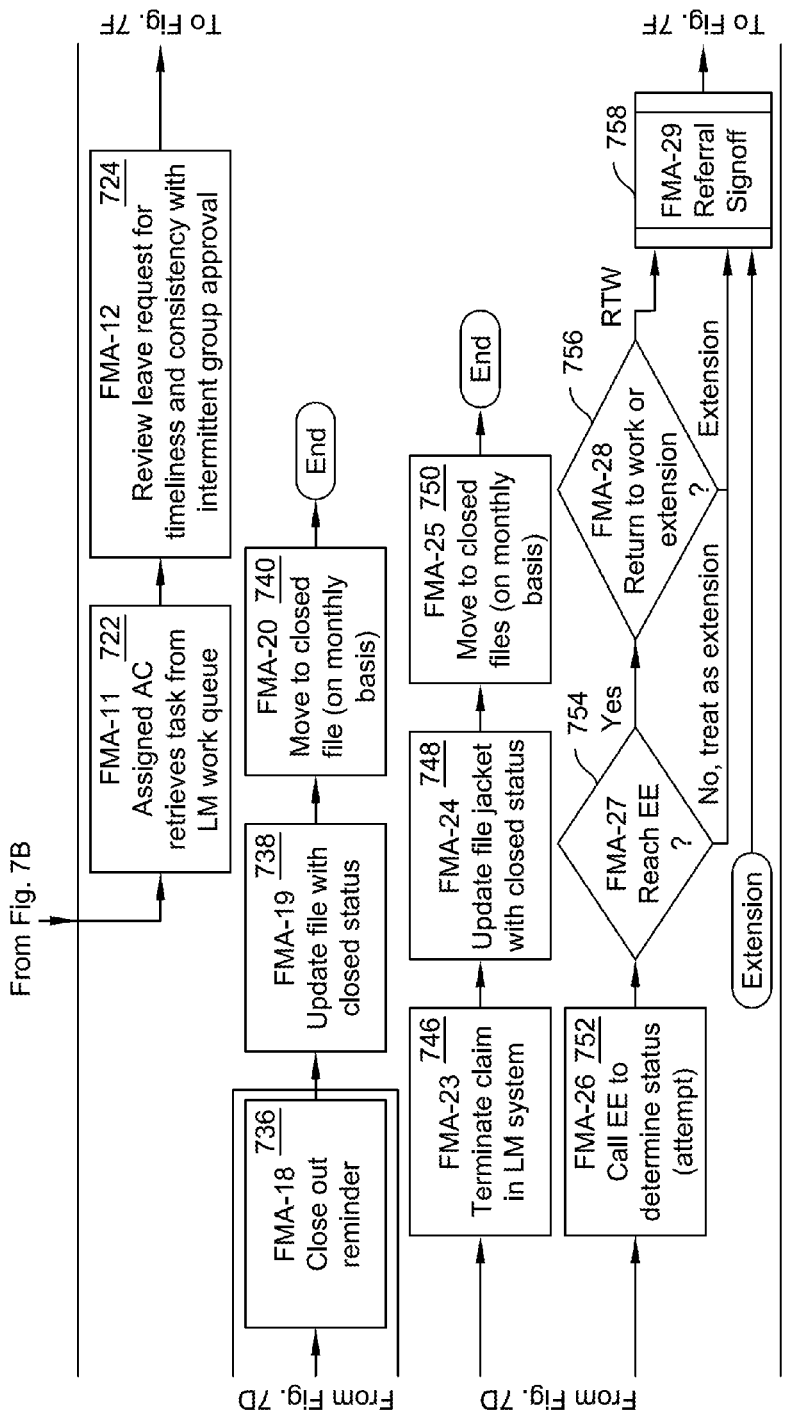

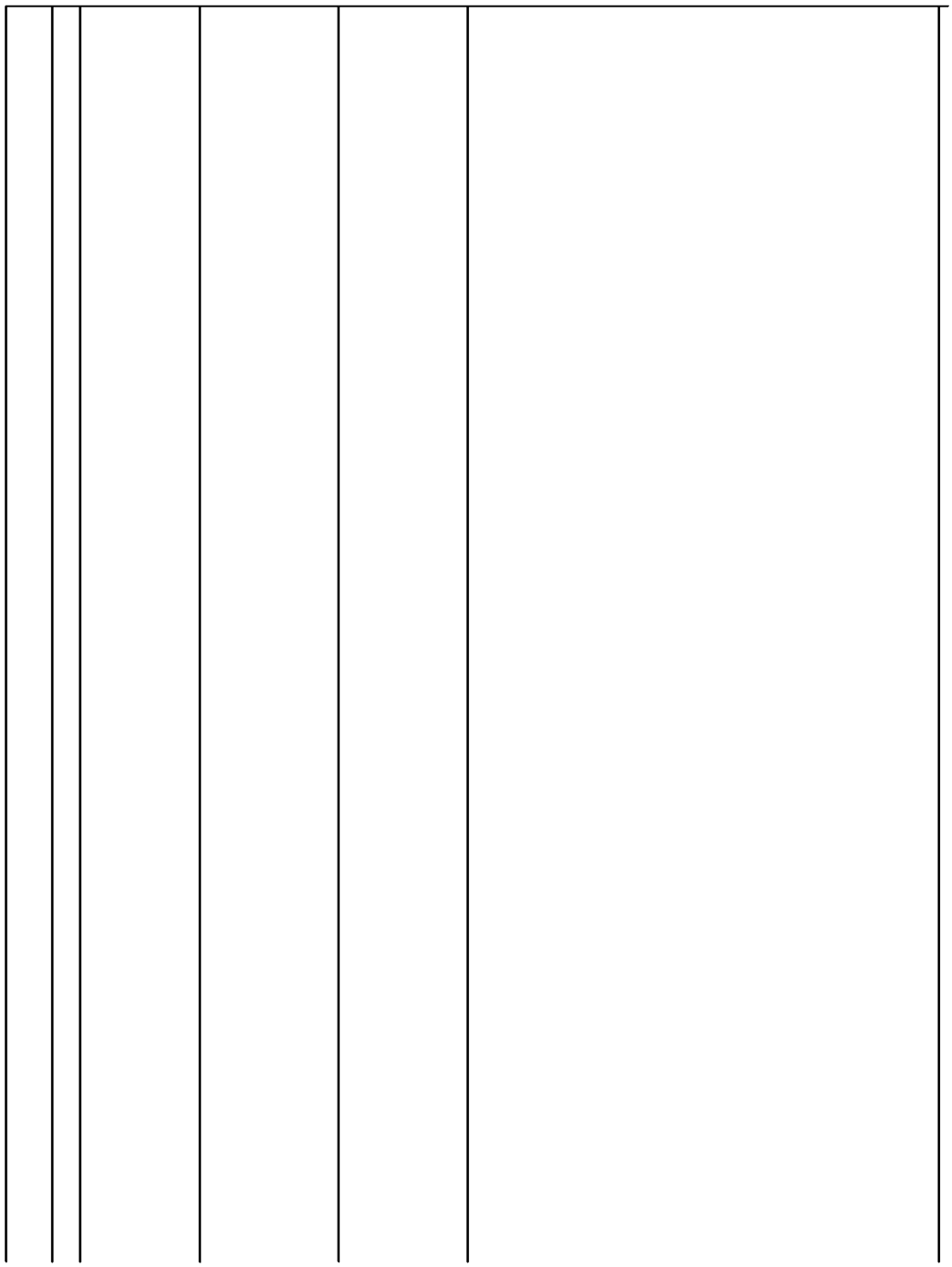

| Fig. 10A | Fig. 10B | Fig. 10C |
|---|---|---|
| Fig. 10D | Fig. 10E | Fig. 10F |

Leave Management - Inquiry

| LM System (Green) | MailRoom (Yellow) | Employee/Employer (Orange) | STD/WC (Pink) |
|---|---|---|---|
| | | | |

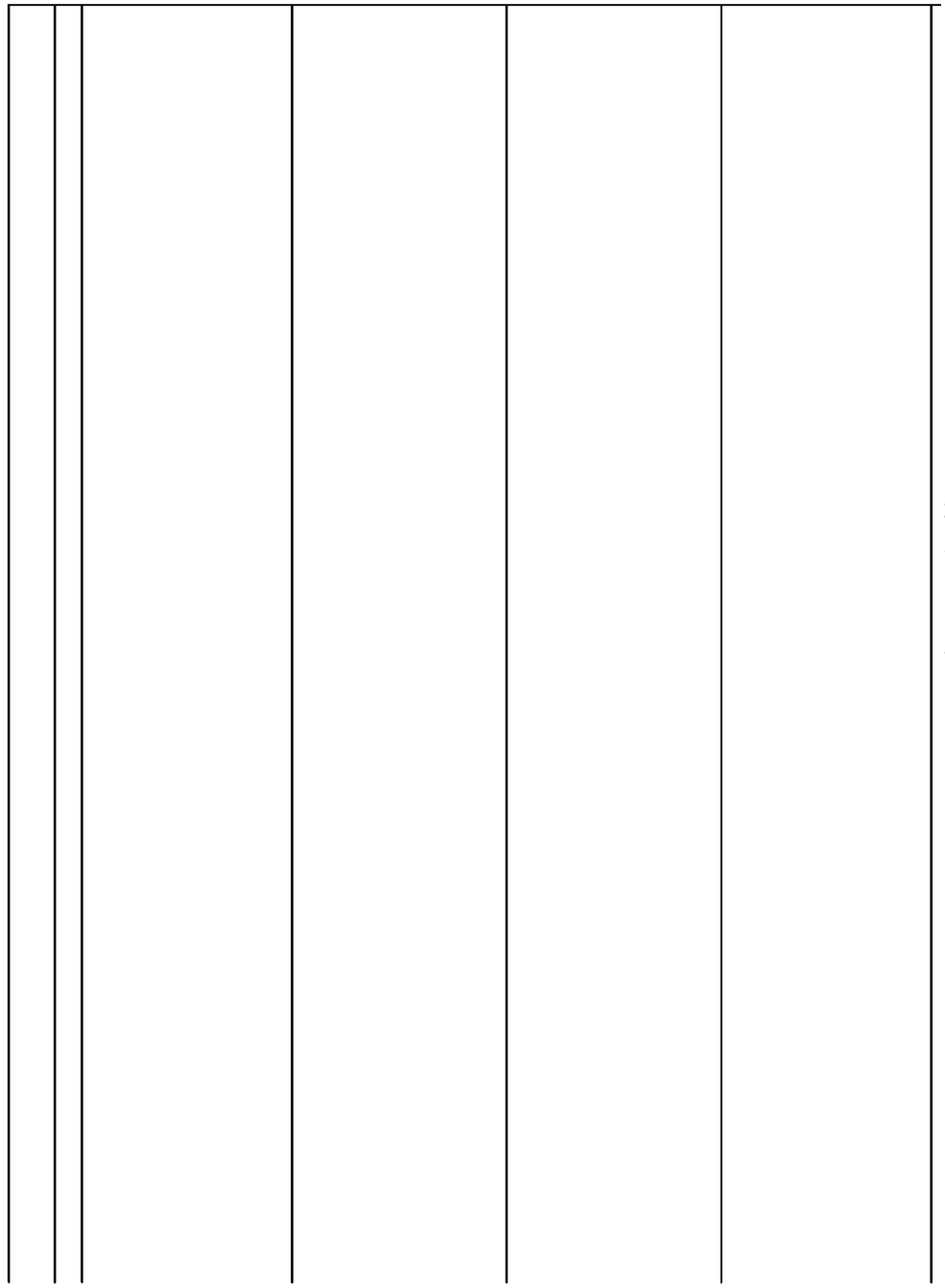

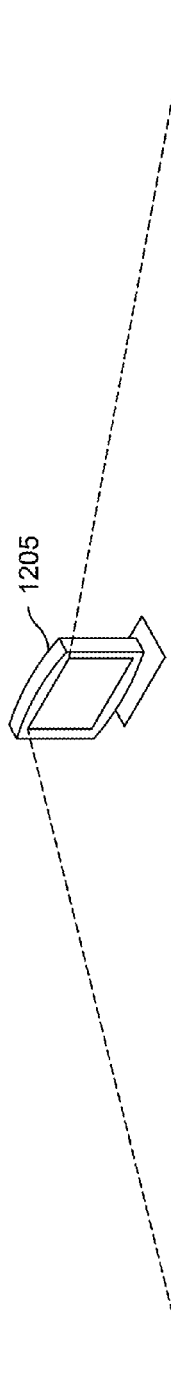

| Program | FML Non-Concurrent | STD | LTD | WC-Indemnity | WC-Medical Only |
|---|---|---|---|---|---|
| Total claims | 134 | 240 | 14 | 76 | 228 |
| Total Incurred Cost [Open & Closed Claims including Paid Benefits and Reserves] | 1930 days | $873,234 | $482,409 | $2,531,506 | $123,838 |
| Total Lost Days [non-concurrent] | 1930 days | 9162 | n/a | 405,465 | n/a |
| Incidence | (per 100) | (per 100) | (per 1000) | % of all claims | % of all claims |
| Sample Case | 13.4 | 9.4 | 6.1 | 25% | 75% |
| Industry Benchmark | 14 | 6 | 3.2 | 13% | 87% |
| Severity | | | | | |
| Sample- Avg. Claim Cost [open & closed claims] | n/a | $4323 | $34,458 | $33,309 | $543 |
| Industry Benchmark | n/a | $4159 | $4457 | $8776 | $925 |
| Sample- Avg. Cost/FTE | n/a | $3250 | $47,128 | $21,489 | $2156 |
| Industry Benchmark | n/a | $397 | $211 | $53 | $7 |
| | | $155 | n/a | n/a | n/a |
| Duration | (days) | (days) | | | |
| Sample Avg. Duration/Closed Claim | 21.3 | 43 | n/a | 302 days | n/a |
| Industry Benchmark | n/a | 52 | n/a | 80.6 days | n/a |
| Sample- Lost Workdays per100 FTE | 286 | 265 | n/a | 181 days | n/a |
| Industry Benchmark | 298 | 162 | n/a | n/a | n/a |

Fig. 12A

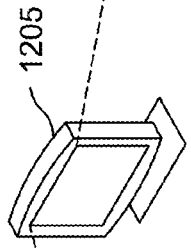

| Location | Plan | Total Claims | Total Lost days | Avg. Duration/Closed Claim | Total Claim Cost |
|---|---|---|---|---|---|
| 7-S | FML-Standalone | 78 | 579 days | 10.0 days | n/a |
| | STD | 62 | 2835 days | 44 days | $173,614 |
| | LTD | 11 | 1024 days | 83 days | $265,131 |
| | WC-Indemnity | 34 | 74,619 days | 602 days | $2,457,989 |
| | WC-Med Only | 41 | n/a | n/a | $41,496 |
| | Sub-Total | 226 | 4438 days | days | $2,938,230 |
| 3-O | FML-Standalone | 22 | 321 days | 14.6 days | n/a |
| | STD | 39 | 1842 days | 48 days | $264,002 |
| | LTD | 1 | 78 days | n/a | $139,740 |
| | WC-Indemnity | n/a | n/a | n/a | n/a |
| | WC-Med Only | 21 | n/a | n/a | $8157 |
| | Sub-Total | 62 | 2241 days | 31.5 days | $411,899 |
| 1-B | FML-Standalone | 10 | 284 days | 13.5 days | n/a |
| | STD | 23 | 827 days | 36 days | $71,137 |
| | LTD | 1 | 98 days | n/a | $18,829 |
| | WC-Indemnity | 36 | 11,572 days | 603 days | $1,469,509 |
| | WC-Med Only | 140 | n/a | n/a | $70,524 |
| | Sub-Total | 216 | 12,781 days | 217.5 days | $1,629,999 |

*Fig. 12B*

| Loss Unit | # Claims | % of Claims | Avg Duration | Total Benefits | % of Benefits | Avg. Closed Claim Cost |
|---|---|---|---|---|---|---|
| 007 S | 62 | 30.4% | 44 | $173,614 | 19.9% | $2,717 |
| 003 O | 39 | 19.1% | 48 | $264,002 | 32.0% | $6,724 |
| 001 B | 25 | 12.3% | 36 | $71,137 | 9.5% | $3,047 |
| 021 OS | 14 | 6.9% | 51 | $53,538 | 7.1% | $4,378 |
| 008 ST | 12 | 5.9% | 43 | $42,239 | 5.6% | $3,763 |
| 012 C | 9 | 4.4% | 37 | $54,824 | 7.4% | $6,092 |
| 016 CH | 7 | 3.4% | 46 | $26,281 | 3.6% | $3,754 |
| 024 W | 6 | 2.9% | 47 | $29,694 | 3.0% | $5,450 |
| 002 BR | 5 | 2.5% | 26 | $50,160 | 0.8% | $1,989 |
| 005 R | 4 | 2.0% | 53 | $17,421 | 0.8% | $1,989 |
| 013 BRI | 4 | 2.0% | 51 | $26,737 | 2.5% | $6,099 |
| 011 STP | 3 | 1.5% | 26 | $5,966 | 0.9% | $3,179 |
| 010 M | 2 | 1.0% | 107 | $2,797 | 1.6% | $5,880 |
| 009 CO | 2 | 1.0% | 19 | $23,352 | 0.2% | $635 |
| 017 E | 2 | 1.0% | 31 | $1,270 | 0.2% | $1,422 |
| 023 WIL | 2 | 1.0% | 8 | $6,358 | 0.0% | $81 |
| 014 BRD | 2 | 1.0% | 42 | $17,968 | 0.4% | $3,308 |
| 025 WILL | 1 | 0.5% | 15 | $1,422 | 0.1% | $1,065 |
| 020 SA | 1 | 0.5% | 46 | $1,065 | 2.7% | $19,529 |
| 019 V | 1 | 0.5% | 58 | $3,308 | 1.6% | $11,613 |
| 018 L | 1 | 0.5% | 5 | $81 | 0.1% | $577 |
| Grand Total | 204 | | 43 | $873,234 | | $4,159 |

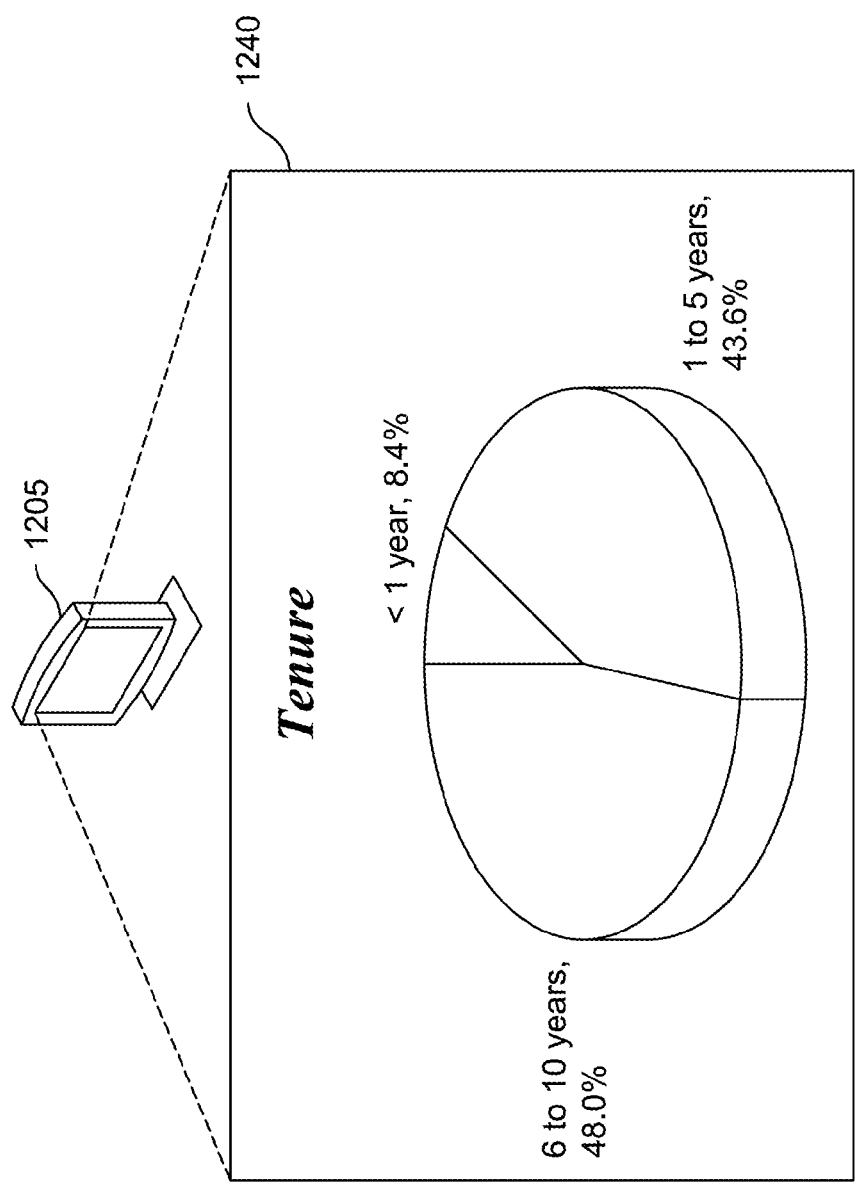

Leave Management Productivity Summary For:
ABC CAR RENTAL COMPANY

Your Company's Results

Anticipated Savings Percentage: 496
Savings (FTE's): 24
Savings (workdays): 5,513

Workdays Per Year - All FTE's: 2,300,000
Time Lost due to Absence (FTE's): 599
Time Lost due to Absence (% total): 6.0%
Time Lost due to Absence (workdays): 137,824
Administrative Complexity Level: 5

*Your summary ID # is: 52

Additional Results Based on Your Input

Lost Time - STD
Total case lost workdays: 22,400
Rate of Absence: 1.0%

Lost Time - WC
Total case lost workdays: 17,400
Rate of Absence: 0.8%

Lost Time - FMLA
Total case lost workdays: 3,600
Rate of Absence: 0.2%

Lost Time - Sick Leave
Total case sick days: 51,000
Rate of Absence: 2.2%

Lost Time - Totals
Total Lost workdays: 94,400
Total Rate of Absence: 4.1%

Job Characteristics/
Absence Multiplier: 1.5
Additional Lost
Total Additional Lost Productivity %: 1.9%
Productivity
Total Additional Lost Productivity Days: 43,424

*Fig. 13F*

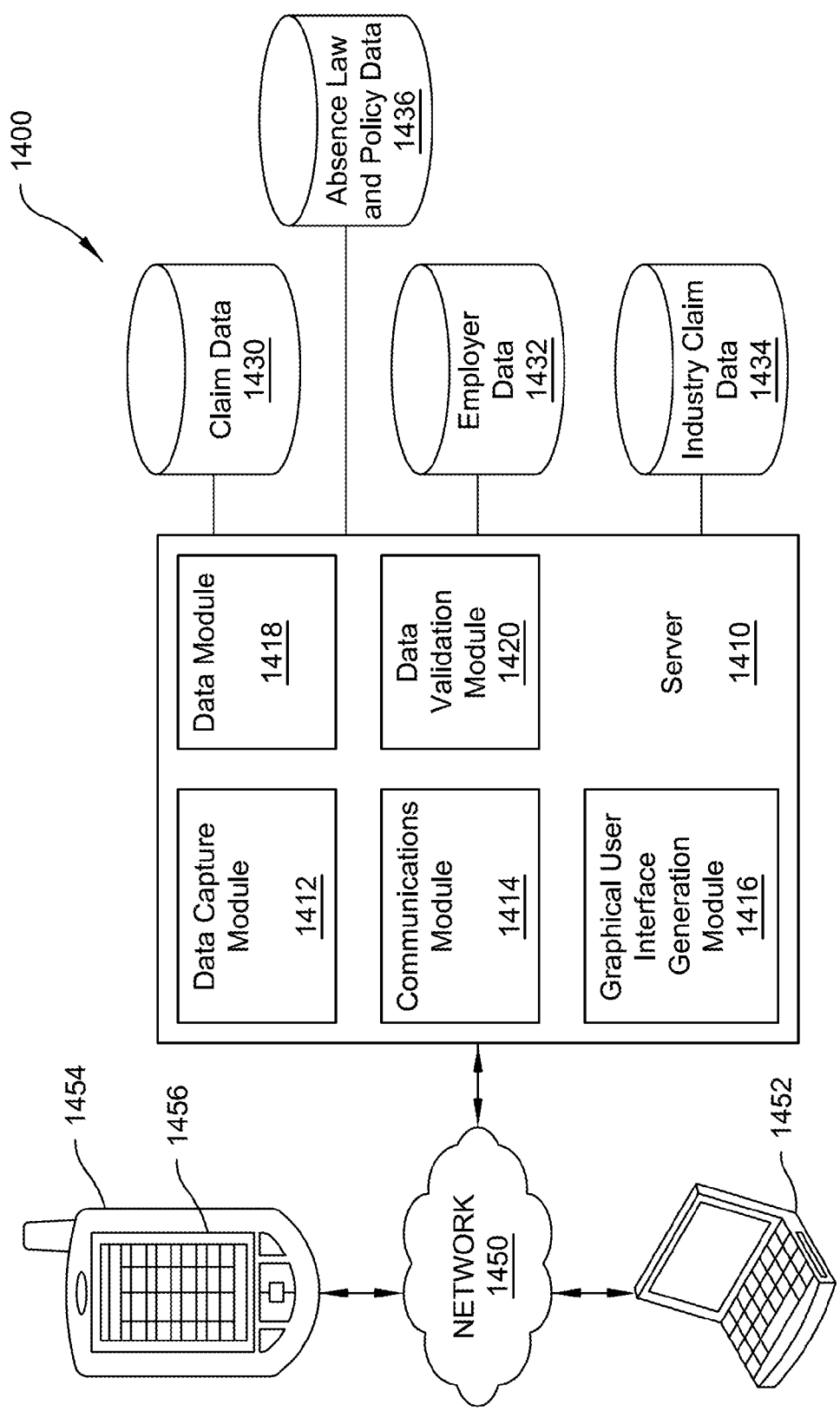

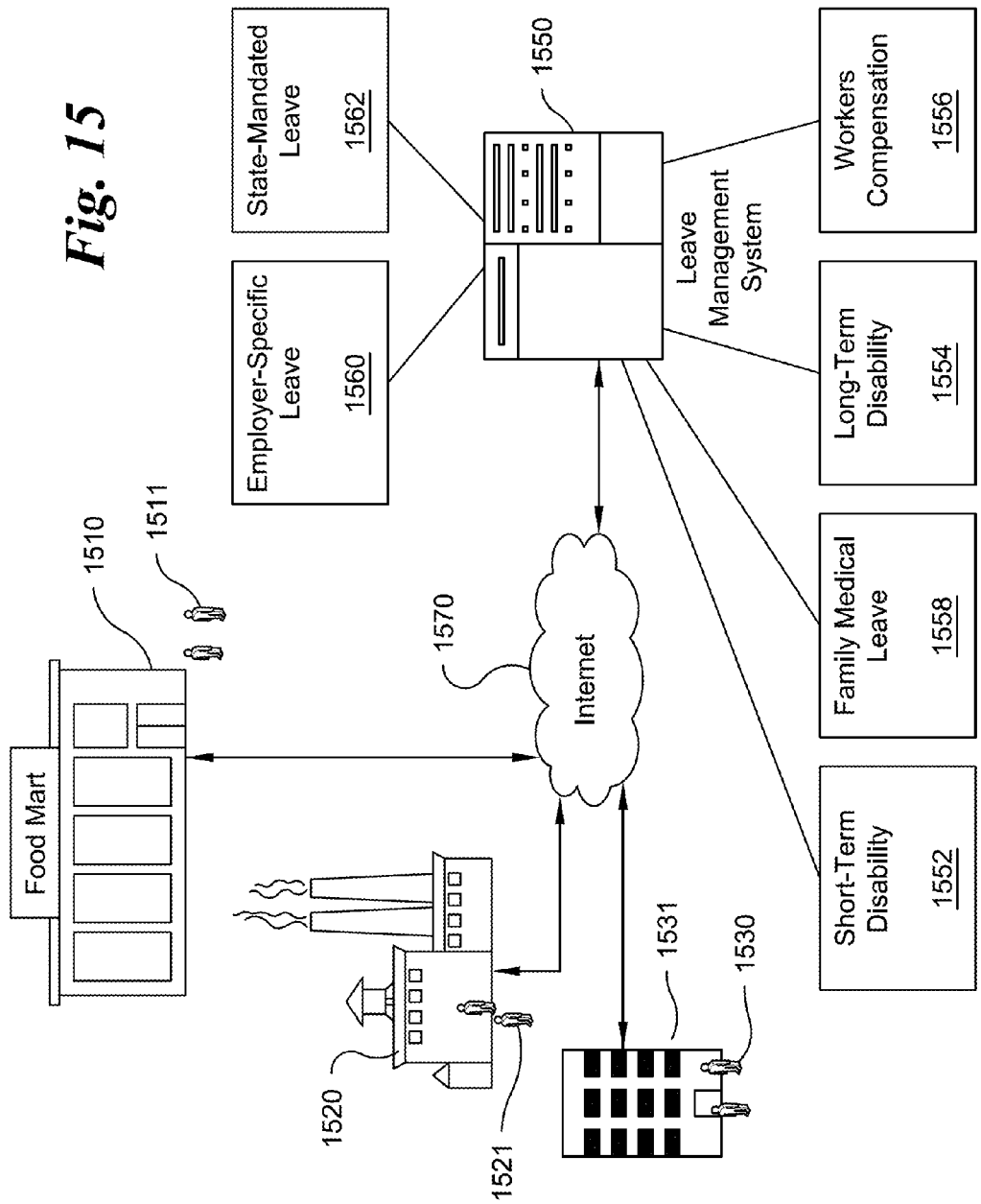

SYSTEM AND METHOD FOR ADMINISTRATION OF EMPLOYEE LEAVE

CROSS REFERENCE TO RELATED APPLICATION

This application claims the benefit of and priority to, under 35 U.S.C. 119(e), U.S. Provisional Patent Application No. 61/368,304, filed Jul. 28, 2010, the entire contents of which is hereby incorporated herein by reference for all purposes.

FIELD OF INVENTION

The present invention relates to computer systems, and particularly to computer systems for administration of employee leave.

BACKGROUND

Employers have policies and plans that address employee time away from work. For example, employers are required to provide workers' compensation coverage for employees who incur job-related illnesses or injuries. An employer may have policies for sick leave for relatively short periods of illness, such as up to two weeks, short term disability leave for non-occupational illnesses or injuries for periods longer than the period of sick leave and of up to generally 90 or 180 days, and long term disability plans that provide income benefits after an elimination period generally of 90 or 180 days. In addition, the Federal Family and Medical Leave Act (FMLA) applies to employers with more than 50 employees and provides eligible employees with job-protected leave for certain family or medical reasons. FMLA leave can run concurrently for the same employee with disability leave (both occupational and non-occupational conditions). Employees can also take FMLA leave for child bonding, care of a family member with a serious health condition, care of a service member injured in the line of duty, or for military exigency reasons.

Most states also have one or more leave laws with which employers must comply. Some state leave laws are similar to the FMLA in terms of qualifying leave reasons but many states provide job-protected leave for other reasons such as organ donor situations, domestic violence, victims of crime, school visitation, and volunteer firefighter leave. Determining requirements and tracking requirements for all of the different types of mandated leave is a complex task for employers.

SUMMARY

In an embodiment, a computer system for processing data related to administration of employee leave has a processor; a memory storage device in communication with the processor; and a communications device in communication with the processor, the memory storage device and a computer communications network, wherein the processor is configured to: receive, from a user-accessible device, via the computer communications network, data in the nature of a request to initiate a claim for one of a plurality of types of employee leave; responsive to receiving the data, determine the type of leave, and cause the user-accessible device to prompt the user for data specific to the determined type of leave; and receive and store leave claim data in the memory storage device.

In an embodiment, a computer-implemented method for processing data related to administration of employee leave includes receiving, by a processor, from a user-accessible device, via a computer communications network, data in the nature of a request to initiate a claim for one of a plurality of types of employee leave; responsive to receiving the data, determining by the processor the type of leave, causing the user-accessible device to prompt the user for data specific to the determined type of leave; and storing received leave claim data in a memory storage device in communication with the processor.

In an embodiment, a non-transitory computer-readable medium has computer-readable instructions stored thereon, which instructions, when executed by the processor, cause the processor to: receive, from a user-accessible device, data in the nature of a request to initiate a claim for one of a plurality of types of employee leave; responsive to receiving the data, determine the type of leave, and cause the user-accessible device to prompt the user for data specific to the determined type of leave; and receive and store leave claim data in the memory storage device.

In an embodiment, a computer system for administration of employee leave includes a comprehensive leave management computer system, which has a processor and a memory storage device in communication with the processor, wherein the processor is configured to: receive data indicative of an employee leave claim, determine, based on the received data, a type of claim, and, in accordance with the determination, provide an output signal to transmit data relating to the claim to one of a plurality of computer systems for processing a type of leave claim.

In an embodiment, a computer-implemented method for administration of employee leave includes receiving, by a processor of a comprehensive leave management computer system, data indicative of an employee leave claim, determining by the processor, based on the received data and rules stored in a memory storage device of the comprehensive leave management computer system, a type of claim, and, in accordance with the determination, provide an output signal to transmit data relating to the claim to one of a plurality of computer systems for processing a type of leave claim.

In an embodiment, a non-transitory computer-readable medium has computer-readable instructions stored thereon, which instructions, when executed by the processor, cause the processor to: receive data indicative of an employee leave claim, determine, based on the received data, a type of claim, and, in accordance with the determination, provide an output signal to transmit data relating to the claim to one of a plurality of computer systems for processing a type of leave claim.

In an embodiment, a non-transitory computer-readable medium, of a handheld wireless communications device having a display, has computer-readable instructions thereon which, when executed by a processor, cause the processor to: provide an output signal to the display to cause the display to prompt a user to provide data for an employee leave claim; receive data in response to the prompt via a user interface of the handheld wireless communications device; determine a type of employee leave claim based on the received data; based on the determined type of employee leave claim, cause the display to further prompt the user to provide data particular to the determined type of employee leave claim; receive, in response to the further prompting, via the user interface of the handheld wireless communications device, data responsive to the prompts; determine, based on the received data, eligibility of the claim for employee leave; responsive to determining that the leave is eligible, provide an output signal to a leave management server having data indicative of an identity of the employee, an identity of the employer, leave data and eligibility indication data; and provide an output signal to cause the display to display a message indicative of eligibility of the leave.

In an embodiment, a computer system administers multiple types of employee leave policies. The system is configured to receive data related to a new employee leave at a single point of contact. The single point of contact may be implemented as a single address for leave issues related to any type of leave, including for example for employment-related injuries compensated through workers compensation, short term disability, long-term disability, and other types of leave. The single point of contact may be implemented in various modes of communication, such as a single telephone number for intake for different types of leave, a single web address or other resource accessible from a browser for different types of leave, a single fax number, and other contact points. The system may be configured to provide prompts to a user for claims relating to multiple types of leave. The system may be configured to furnish data to separate computer systems for administration of multiple types of leave. The system may be configured to provide communications between separate computer systems responsive to receipt of data from one or more of the computer systems. The system may be configured to store data relating to multiple types of leave and to access the stored data to create reports and analyses of the data relating to multiple types of leave, including accessing stored data relating to one employer and providing reports and analyses of the data relating to the one employer.

BRIEF DESCRIPTION OF THE FIGURES

FIGS. 4A-4J show an exemplary process flow diagram of a method in an embodiment of the invention.

FIGS. 5A-5F show an exemplary process flow diagram of a method in an embodiment of the invention.

FIGS. 6A-6L show an exemplary process flow diagram of a method in an embodiment of the invention.

FIGS. 7A-7F show an exemplary process flow diagram of a method in an embodiment of the invention.

FIGS. 9A-9D show an exemplary process flow diagram of a method in an embodiment of the invention.

FIGS. 10A-10F show an exemplary process flow diagram of a method in an embodiment of the invention.

FIGS. 12A-12E are exemplary tables and graphs displaying analyses of leave management data which may be generated by a computer system shown in FIG. 11, in accordance with an embodiment of the invention.

FIGS. 13A-13F are exemplary screen shots generated by a server application for providing estimated productivity gains in accordance with an embodiment of the invention.

FIG. 14 is a schematic diagram illustrating a computer network and system in accordance with an embodiment of the invention.

FIG. 15 is a schematic diagram illustrating a computer system for implementing an embodiment of the invention in a network.

DETAILED DESCRIPTION

Figure 1:
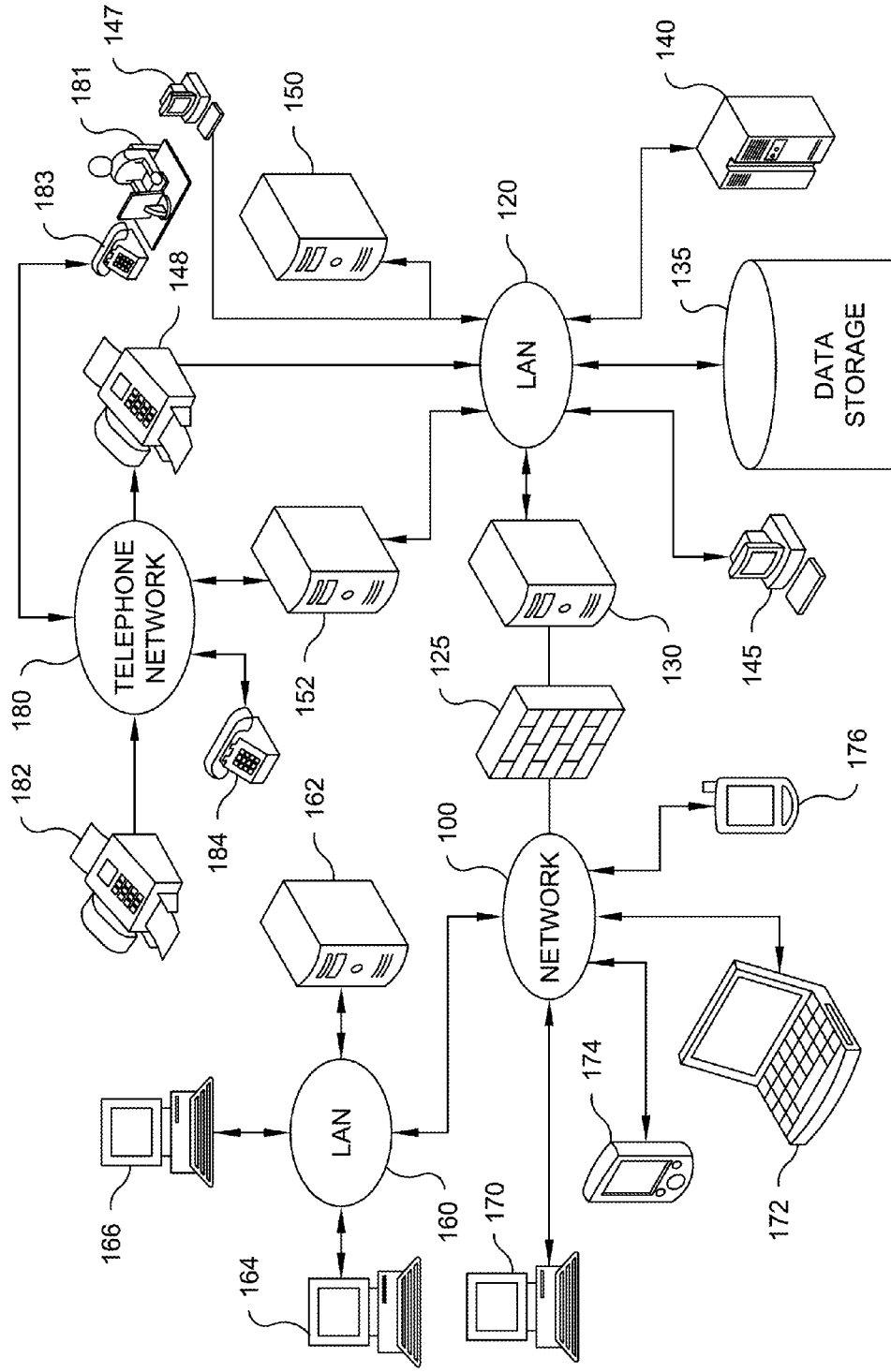
FIG. 1 is a schematic diagram of an exemplary computer network for implementation of embodiments of a method and system of the invention.

It is to be understood that the figures and descriptions of the present invention have been simplified to illustrate elements that are relevant for a clear understanding of the present invention, while eliminating, for the purpose of clarity, many other elements found in typical computer systems and methods related to administration of employee absences, such as system for administration of individual types of leaves, such as short term disability, long term disability, workers compensation, and family and medical leave.

A system according to an embodiment of the invention is configured to administer multiple types of employee leave policies. The system may be termed a coordination system or a comprehensive leave management system, by way of example. The system is configured to receive data related to a new employee leave at a single point of contact. The single point of contact may be implemented as a single address for leave issues related to any type of leave, including for example for employment-related injuries compensated through workers compensation, short term disability, long-term disability, family illness, child bonding, military exigencies, volunteer services, and other types of leave. The single point of contact may be implemented in various modes of communication, such as a single telephone number for intake for different types of leave, a single web address or other resource accessible from a browser for different types of leave, a single fax number, and other contact points. The system may be configured to provide prompts to a user for claims relating to multiple types of leave. The system may be configured to furnish data to separate computer systems for administration of multiple types of leave. By way of example, the data received at intake may be furnished to a workers compensation claim administration system. The workers compensation claim administration system may provide and facilitate claim determination and adjudication, case management, such as coordination with providers of medical and rehabilitation services, return to work services, which may include coordination with rehabilitation services providers, and other services. The workers compensation claim administration system may furnish periodic updates on the status of the claim, and/or updates upon certain events, via one or more modes of electronic communication, to the comprehensive leave management system.

The comprehensive leave management system may be configured to provide data concerning a new claim after intake to another system, such as a short term disability administration system. The short term disability administration system may be configured to perform disability claim determination, case management and return to work services. The short term disability claim administration system may furnish periodic updates on the status of the claim, and/or updates upon certain events, via one or more modes of electronic communication, to the comprehensive leave management system.

The system may be configured to provide communications between separate computer systems responsive to receipt of data from one or more of the computer systems. For example, responsive to receipt of data indicative of denial of a workers compensation claim, the comprehensive leave management system may initiate a short term disability leave claim and communicate data from its database and/or from a workers compensation claim management system to a short term disability leave management system. The system may be configured to store data relating to multiple types of leave and to access the stored data to create reports and analyses of the data relating to multiple types of leave, including accessing stored data relating to one employer and providing reports and analyses of the data relating to the one employer.

The separate computer systems, such as the workers compensation claim administration system and the short term disability administration system, may be configured to manage data in differing formats. The comprehensive leave management system may be configured to translate data from a format employed by one system to a format employed by another system.

In transferring information relating to health or other issues between systems, consents of individuals may be required. For example, an employee may have provided a consent for the employee's medical records to be examined in connection with a claim for benefits under workers compensation, but not for claims under other types of benefits, such as short term disability benefits. The comprehensive leave management system may be configured to review records received from another system for data indicative of applicable privacy waivers. In an embodiment, data relating to a claim stored by a workers compensation management system may include entries indicative of whether or not a consent of the employee to provide certain information in connection with other types of claims has been obtained. The required consent may be a consent to share information received in connection with determining eligibility for or in connection with processing one type of claim with systems and individuals determining eligibility for or processing a different type of claim. The comprehensive leave management system may be configured to check data received from the workers compensation management system for the presence of appropriate consents. The comprehensive leave management system may be configured to, responsive to determining that a consent is present, data relating to the claim to another system. The comprehensive leave management system may be configured to, responsive to determining that a required consent is absent, generate a communication to the employee requesting a consent. The communication may be on paper, via e-mail, or otherwise communicated, and may include a paper form for physical signature, an electronic form for printing and physical signature, or an electronic form for electronic signature. In another embodiment, the comprehensive leave management system may be configured to return a signal to the workers compensation management system that required consent(s) are absent, and not to take any further action with respect to that claim until data is received, from the workers compensation management system, indicative of required consent(s). In another embodiment, a workers compensation management system may be configured to perform a check for the presence of data indicative of required consent(s) prior to transmitting data to the comprehensive leave management system, and not to transfer the data unless the consent data is present. In an embodiment, the comprehensive leave management system may be configured to prompt a user to check a claim file for required consents prior to transmitting data between other systems, and to require receipt of data indicative of an affirmative response from a user that the required consent is associated with the claim file, prior to forwarding data related to a claim to another system.

The comprehensive leave management system may be configured, in an embodiment, to administer one or more different types of leave. The comprehensive leave management system may be configured to track and report leave under employer policies and union contracts, such as vacation, personal time and sick time leave, in addition to or as an alternative to legally mandated leave.

The comprehensive leave management system may be configured to administer one or more benefits, such as wage replacement benefits, permanency benefits, death benefits and medical expenses related to an injury for workers compensation leave. The comprehensive leave management system may further be configured to administer investigation, management and resolution of a claim and costs associated with investigation, management and resolution of a claim.

The comprehensive leave management system may be configured with rules to prompt the system to send inquiries to other computer systems and to employers, employees, case managers, service providers, and others, based on lapse of time from certain events and occurrence or non-occurrence of certain events.

The comprehensive leave management system may be configured to permit employees and employers to access data concerning claims relevant to the employee and employee via suitable interfaces, such as over a computer network using a web-based interface, from a smart phone or personal digital assistance, via telephone using an integrated voice response system, and through other modes.

The functionality of a comprehensive leave management system may be implemented in computer systems configured to administer one type of leave. By way of example, a coordinated system for administering multiple types of leave may be implemented employing multiple computer systems in communication with one another. Each of the computer systems may administer only one type of leave. Through suitable software, which may be augmented by workflows, for example, the multiple computer systems may function as a comprehensive leave management system. By way of example, a workers compensation administration computer system may be in communication with a short term disability administration computer system. The workers compensation administration computer system may be configured to, upon denial of a claim for workers compensation, format and output data concerning the claim to the short term disability administration computer system. The short term disability administration computer system may be configured to initiate a claim for short term disability leave upon receipt of the data from the workers compensation administration computer system, without a need for the employee to submit a separate claim.

By way of further example, the individual computer systems may be configured to, responsive to determining that a data item, such as a medical examination certification, is required, format messages to the other individual computer systems to request a check for the data item. In response, the other individual computer systems may perform searches of their databases for the requested data item, and, if the data item is located, format and send a reply to the inquiring computer system with the requested data item. This process may avoid the sending of multiple requests to employees, employers, medical professionals, and others, for the same information and documents. As discussed above, the other individual computer systems, prior to sending a reply with the requested data item, may be configured to perform a check for any required permission to transmit personal information, and may, responsive to determining that a required permission is not present, provide a response having data indicative that the permission required to provide the requested data has not been received. It will be appreciated that the above examples of implementation of the functionality of a comprehensive leave management system through coordination of multiple independent computer systems are merely exemplary, and that other functionality of a comprehensive leave management system may be similarly implemented.

Referring to FIG. 1, an exemplary network configuration is shown. Network 100 connects various computer systems and devices. Network 100 may be or include any type of network, including a local area network (LAN), a wide area network (WAN), an intranet, the Internet, a public switched telephone network (PSTN) or other network. Network 100 may employ any suitable data protocols.

Various devices and networks may be in communication with network 100. In embodiments, client device 170, a desktop computer system, client device 172, a notebook computer system, client device 174, a personal digital assistant, and client device 176, a smart phone, are in communication with network 100. Client devices 170, 172, 174, 176 are merely exemplary. Local area network (LAN) 160 is an exemplary network of a business or other employer. LAN 160 has in communication therewith desktop computer systems 164, 166, and file server 162.

LAN 120 may be a network of an insurance company, by way of example. Firewall unit 125 may be configured to provide data security services with respect to systems and networks, LAN 120 and the devices in communication therewith. Firewall unit 125 may be a stand alone device including one or more processors, data storage devices, and input and output connections. Server 130 may serve as a front-end web server that formats and serves web pages to client devices running browser software. In an embodiment, a processor of server 130 may execute steps of a method of prompting users for data relating to absence events, requests for employee leave, and other data employed by comprehensive leave management systems or other systems in accordance with embodiments. In an embodiment, server 130 may function as a web front-end for another device or system, such as server 150, which may execute steps of a method of administering employee absence related programs. In an embodiment, either server 130 or server 150 may serve as a single point of contact for receiving data relating to an absence event. Mainframe computer system 140 may be a system that receives data from server 150 and performs functions related to managing and tracking absence events. Data storage device 135 may be in communication with LAN 120 and be accessible by server 150, mainframe computer system 140, web server 130 and other systems, for storage of and access to data related to administration of employee leave. Data storage device 135 may store data related to employees, employers, types of leave, rules for types of leave, and other data. Workstation 145 may be in communication via LAN 120 with data storage device 135, mainframe computer system 140, server 150, web server 130, and other devices and systems, for administrative and other functions.

In embodiments, communication between server 150 and individuals, such as employees and employers, may be via a telephone network, such as a public switched telephone network, a voice over Internet protocol network, or a combination of a PSTN and VoIP network. By way of example, a fax telephone number may be configured to receive intake data for a new leave event related to two or more categories of employee leave. Prepared forms may be available for individuals to complete with intake data. The prepared forms may serve as a structured fax format by which data may be transmitted from third party fax machine 182 via telephone network 180 to insurance company fax machine 148. Insurance company fax machine 148 may be configured to create a digital image of the received fax, e.g., in an image format such as pdf, jpg or tiff, and transmit the received digital image via LAN 120 to server 150. Server 150 may be configured to extract data from the digital image, cause the data to be stored in one or more databases, and perform analytical functions on the data. For example, server 150 may classify the data according to type of leave, such as short term disability, long-term disability or family and medical leave. If the data in the received fax omits required data, contains obvious errors, or otherwise triggers a rule requiring a response, server 150 may be configured to provide an output in the form of an image file for a responsive fax and instructions to insurance company fax machine 148 to transmit a responsive fax to a telephone number corresponding to third party fax machine 182.

In an embodiment, a third party may employ voice telephone communications to an interactive voice response system (IVR) for the submission of data. Third party voice telephone 184 may be employed by a user to reach, via telephone network 180, IVR server 152. IVR server 152 may prompt the user to provide identification information via voice or keypad, and then prompt the user to provide data corresponding to required data for submission of a new claim related to employee leave, such as employer and employee data, type of leave, and other data. IVR server 152 may communicate with server 150 via LAN 120. Server 150 may receive data from IVR server 152 in a suitable format. Server 150 may be configured to analyze data received from IVR server 152 during a telephone connection between IVR server 152 and third party telephone 184 and provide instructions for IVR server 152 to generate prompts for additional information, to indicate that data has been received, or to convey other information.

In another embodiment, a system may be configured for initial claim intake to a live telephone operator 181 at a telephone 183 linked via telephone network 180 to a voice phone. The live telephone operator 181 may be at a workstation 147 in communication, such as via LAN 120, to server 150, for example. The system may be configured to generate on a screen of workstation 147 a display of questions for the live telephone operator, and a display of an input screen for receipt of data input by the live telephone operator. The workstation 147 may be configured to transmit data to server 150 for further processing. Server 150 may be configured to analyze data received from workstation 147 and provide instructions for the live telephone operator 181 to address follow up questions to the other party on the call or to recite one or more scripts including information and/or questions.

In an embodiment, a comprehensive leave management computer system may be configured to perform leave management tracking and coordination. A comprehensive leave management computer system may receive intake information and furnish the data to individual administration systems, such as workers compensation and short term disability administration systems. As an individual administration system, such as a workers compensation system, processes a claim, data regarding the claim is furnished to the comprehensive leave management computer system. The comprehensive leave management computer system may store data relating to the processing of the claim from individual administration systems. The comprehensive leave management computer system may be configured with reporting tools to provide reporting on administration of all types of leave.

In embodiments, the comprehensive leave management computer system may be configured to apply rules relating to coordination among individual leave management systems. For example, if a workers compensation claim is contested or denied, upon receipt of data indicative of the contest or denial, the comprehensive leave management computer system may transfer data relevant to the claim to a short term disability administration computer system. As workers compensation claims are generally only approved for occupational injuries, and short term disability claims are only approved for non-occupational injuries or illness, denial of a workers compensation claim as relating to a non-occupational injury indicates that the employee may have a short term disability claim. By way of further example, if a claim is being handed by the short term disability administration computer system, and a workers compensation claim for the same incident is approved, the comprehensive leave management computer system may transfer data relevant to the claim to the workers compensation system, and may provide data to the short term disability administration system to close the claim. By way of further example, if a workers compensation claim reaches a maximum duration, the comprehensive leave management computer system may transfer data relating to the claim to a long term disability administration system.

The comprehensive leave management computer system may manage communication with employees, employers, physicians and others. If data or documentation is required relating to a claim, the individual administration systems may send requests for the information to the comprehensive leave management computer system. The comprehensive leave management computer system may then conduct searches of a database maintained by the comprehensive leave management computer system. The search may include searches of databases maintained by other individual administration systems. The comprehensive leave management computer system may, if the requested information is not identified in any of the databases, formulate an automated inquiry, via any suitable method of communication, including e-mail, postal mail, fax and other methods of communication, to the employee, employer, physician or other person to obtain the requested information. The comprehensive leave management computer system may be configured to prompt an employee to place a telephone call to the employee, employer, physician or other person. Advantageously, duplicative requests for information from physicians, employees and employers may be avoided.

The comprehensive leave management computer system may also be configured to perform coordinated financial management tasks, such as running tests for accuracy as to benefits paid and owed when a single incident involves a claim in two or more individual types of leave, such as workers compensation and short term disability.

The comprehensive leave management computer system may also be configured to perform analyses of data received from individual systems to identify improper redundant payments. Such payments may be indicative of fraud. By way of example, the same employee may have received both workers compensation payments and short term disability payments for the same time period, when applicable law, regulation and/or plan contracts rule out duplicate payments.

The comprehensive leave management computer system may also be configured to apply rules to identify potential subrogation. For example, either among the questions to be answered at intake, or at a later time after submission of the claim, the comprehensive leave management computer system may include questions to identify possible responsible third parties, such as owners/operators of vehicles involved in a collision which resulted in the injury relating to a workers compensation or short term disability claim. Similarly, third parties that manufacture and maintain equipment that is involved in an injury, owners and operators of sites to which employees were assigned or dispatched at the time of an injury, may be identified either at intake or at a later time. The comprehensive leave management computer system may be configured to forward data relating to claims meeting selected criteria indicative of possible subrogation to a subrogation system or other person or system.

The comprehensive leave management computer system may be configured to administer services related to claims of multiple leave types.

The comprehensive leave management computer system may be configured to provide output signals, to store data, to print reports and otherwise to communicate data indicative of results of performance of analyses and processes. By way of example, the comprehensive leave management system may be configured to provide reports, in printed or electronic form, identifying improper duplicate payments of claims. Reports may be generated, stored in data storage devices, forwarded via e-mail, made accessible on web servers or other resources, printed in hard copy, faxed, or otherwise made available for review or stored. Reports may include data as to individual claims, individual employees, summary or complete data regarding employers, worksites, classes of employees of employers, claims suitable for subrogation, and other classifications of data. Comprehensive leave management systems may also be configured to generate instructions for payment to employees and to service providers, such as providers providing return to work services, rehabilitation services and other services; payment processing systems may be provided in communication with comprehensive leave management systems to effect payment, such as via printing and mailing of checks or by providing instructions to a bank to effect an electronic funds transfer, in accordance with instructions provided by a comprehensive leave management system.

In embodiments, a network or data processing network, such as network 100, may be employed which may include a plurality of individual networks, such as a wireless network and a landline based network, each of which may include a plurality of servers, individual workstations or personal computers. Additionally, as those skilled in the art will appreciate, one or more LANs may be included where a LAN may comprise a plurality of intelligent workstations coupled to a host processor. The networks may also include mainframe computers or servers, such as a gateway computer or application server. A gateway computer serves as a point of entry into each network. The gateway may be preferably coupled to another network by one or more communications links. The gateway may also be directly coupled to one or more workstations using a communications link. The gateway computer may also be coupled to a storage device for storing information related to employers, employees, claims and leave policies and regulations, as well as other data. Further, the gateway may be directly or indirectly coupled to one or more workstations. Those skilled in the art will appreciate that the gateway computer may be located geographically remote from the network, and similarly, the workstations may be located geographically remote from the networks and/or network servers. The client devices or workstations may connect to the wireless network using a networking protocol such as the Transmission Control Protocol/Internet Protocol ("TCP/IP") over a number of alternative connection media, such as cellular phone, radio frequency networks, satellite networks, etc. The wireless network may connect to the gateway using a network connection a such as TCP (Transmission Control Protocol) or UDP (User Datagram Protocol) over IP, X.25, Frame Relay, ISDN (Integrated Services Digital Network), PSTN (Public Switched Telephone Network), etc.

Figure 2:
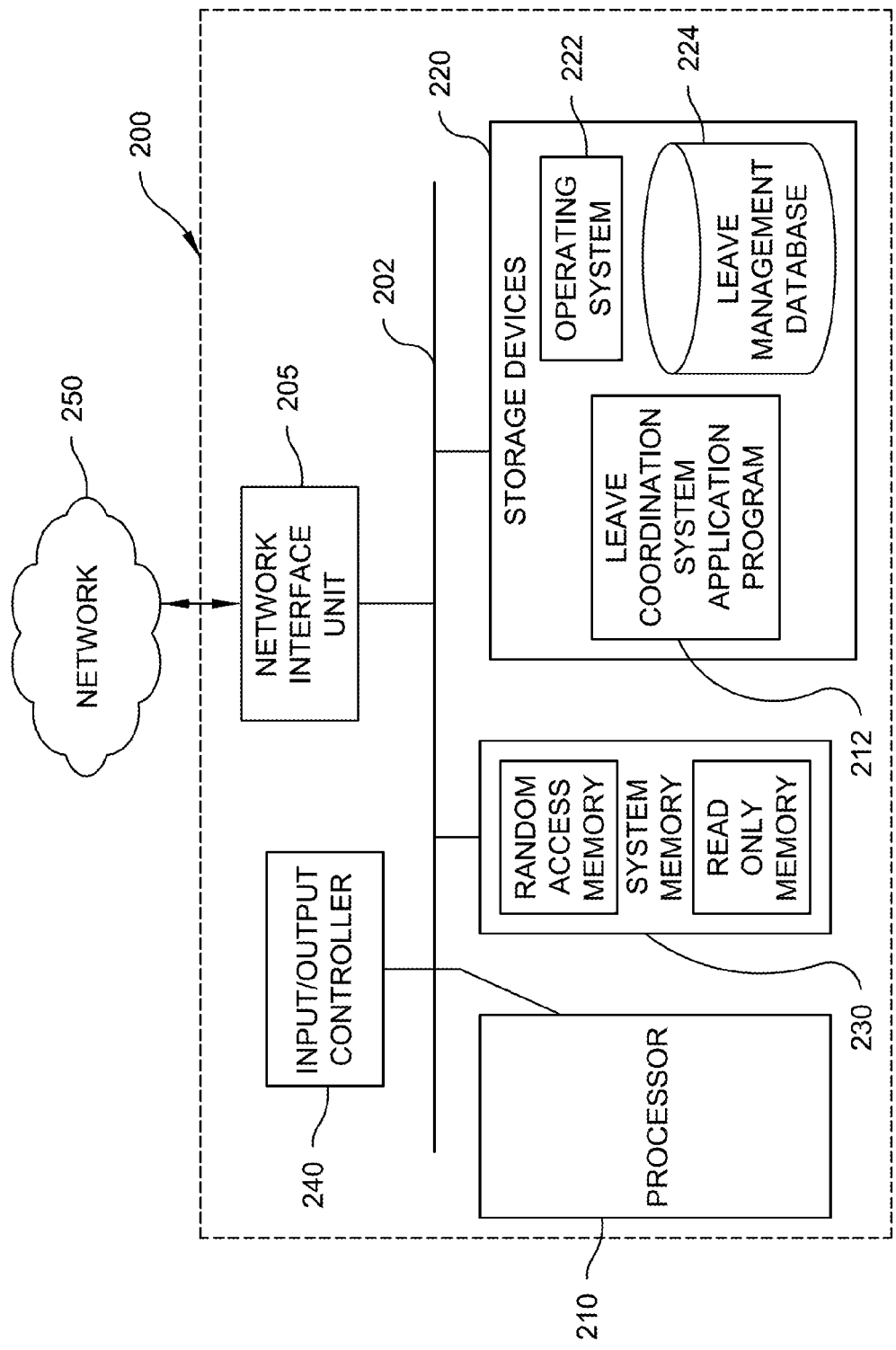
FIG. 2 is a schematic diagram of an exemplary computer system for use in the embodiments of FIG. 1.

Referring to FIG. 2, features of a system according to an embodiment are shown. An exemplary computer system 200 for use in an implementation of the invention will now be described. In computer system 200, processor 210 executes instructions contained in programs such as leave coordination system application program 212, stored in storage devices 220. Processor 210 may be a single processor, multiple processors, and/or one or more multiple core processors, by way of example. Storage devices 220 may include suitable media, such as optical or magnetic disks, fixed disks with magnetic storage (hard drives), tapes accessed by tape drives, and other storage media. Processor 210 communicates, such as through bus 202 and/or other data channels, with network interface unit 205, system memory 230, storage devices 220 and input/output controller 225. Via input/output controller 225, processor 210 may receive data from user inputs such as pointing devices, touch screens, audio inputs and keyboards, and may provide data to outputs, such as data to video drivers for formatting on displays, and data to audio devices for output as sound, and data to printers for printing in hard copy. Storage devices 220 are configured to exchange data with processor 210, and may store programs containing processor-executable instructions, and values of variables for use by such programs. Storage devices 220 may include local and network accessible mass storage devices. Storage devices 220 may include media for storing operating system 222 and mass storage devices such as leave related data storage 224 for storing data related to leave claims, such as employer data, employee data, claim data, applicable rules and values of variables for compliance with regulatory requirements, benefit data, physician data, subrogation-related data, and other data.

Leave related data storage may include data associated with Federally mandated leave, such as rules for FMLA leave, rules for leave under state law or regulation with state specific variations, such as short term disability, long term disability and workers compensation, and employer specific leave, such as sick leave, personal leave and educational leave. Leave related data storage 224 may include tables associating states, municipalities and the like, with particular types of leave mandated or available under laws and regulations of the state or municipality. Leave related data storage 224 may include data indicative of rules for each type of leave. In an embodiment, leave related data storage may include the exemplary data related to state-specific leave set forth in Table 1:

TABLE 1

State-specific leave laws:

| STATE | STATE LEAVE LAWS |
|---|---|
| Alabama | Victims of Crime |
| | Civil Air Patrol |
| Alaska | Victims of Crime |
| Arizona | Victim's Leave |
| Arkansas | Bone Marrow or Organ Donors |
| | Crime Victim/Court Witness |
| California | California Family Rights Act |
| | Pregnancy Disability Leave |
| | Parental School Leave |
| | Victims of Domestic Violence Employment Leave Act |
| | Leave for Employees of Military Spouses |
| | Crime Victims' Leave |
| | Time off for Emergency Duties |
| | Civil Air Patrol |
| | Bone Marrow / Organ Donation |
| Colorado | Adoption Leave (Optional based on employer policy) |
| | Leave for Crime Victims |

TABLE 1-continued

State-specific leave laws:

| STATE | STATE LEAVE LAWS |
|---|---|
| | Parental Involvement in K-12 Education Act |
| | Civil Air Patrol Leave of Absence |
| | Qualified Volunteer Leave of Absence |
| | Volunteer Firefighter |
| District of Columbia | Family and Medical Leave |
| | School Visitation Leave |
| Delaware | Domestic Violence Provision |
| Florida | Domestic Violence Leave Act |
| | Victims of Crime |
| Georgia | Victims of Crime |
| Hawaii | Family and Medical Leave |
| | Maternity Leave |
| | Domestic or Sexual Violence Leave Rights Leave |
| | Court Witness |
| Illinois | Victims' Economic Security and Safety Act with Domestic and Sexual Violence Victims Leave |
| | School Visitation Leave |
| | Illinois Family Military Leave Act |
| | Blood Donor - 820 ILCS 149/10 (Optional based on employer policy) |
| | Volunteer Emergency Worker Job Protection Act |
| Indiana | Military Leave Law |
| | Victim of Crime/Witness |
| | Volunteer Firefighting or Volunteer member activity |
| Iowa | Maternity Leave |
| | Victim of Crime/Court Attendance |
| Kansas | Domestic Violence or Sexual Assault |
| | Pregnancy Leave |
| Kentucky | Adoption Leave |
| | Court Appearance Leave |
| | Volunteer Firefighter/Emergency Worker |
| Louisiana | Maternity Leave |
| | Donation of Bone Marrow Leave |
| | Louisiana School and Daycare Conference and Activities Leave Act |
| Maine | Maine's Family and Medical Leave Act Leave (including Organ Donor Leave) |
| | Leave for Crime Victims |
| | Family Military Leave |
| | Volunteer Firefighter Leave |
| Maryland | Adoption Leave (Optional based on employer policy) |
| | Victim of Crime/Court Witness |
| | Civil Air Patrol Leave |
| Massachusetts | Maternity Leave |
| | Small Necessities Leave Act |
| | Victim of Crime |
| Michigan | Victim of Crime/Court Attendance |
| Minnesota | Parental Leave Act |
| | Adoption Leave (Optional based on employer policy) |
| | School Leave |
| | Donation of Bone Marrow Leave |
| | Crime Victims |
| | Family of Military Personnel |
| | Military Ceremonies |
| | Domestic Abuse Leave Act |
| | Blood Donor Leave |
| | Civil Air Patrol Leave of Absence |
| Mississippi | Victim of Crime/Witness Leave |
| Missouri | Victims of Crime |
| | Emergency Services Leave Law |
| Montana | Maternity Leave |
| | Victims of Crime |
| Nebraska | Adoption Leave (Optional based on employer policy) |
| | Family Military Leave |
| Nevada | School visitation Leave |
| | Pregnancy Leave |
| | Victim of Crime/Court Witness Leave |
| | Parental Involvement - School Conference Leave Law |
| New Hampshire | Victims of Crime |
| | Pregnancy Disability Leave |
| New Jersey | Family Leave |
| | Emergency Responders Employment Protection Act |

TABLE 1-continued

State-specific leave laws:

| STATE | STATE LEAVE LAWS |
|---|---|
| New Mexico | Domestic Violence Leave |
| New York | Adoption Leave (Optional based on employer policy) |
| | Bone Marrow Donation Leave |
| | Family Military Leave |
| | Victims of Crime/Crime Witness Leave |
| | Blood Donation |
| North Carolina | School Involvement Leave |
| | Domestic Violence/Criminal Witness/Victim Leave Law |
| North Dakota | Victims of Crime/Court Witness |
| Ohio | Pregnancy Disability Leave |
| | Criminal/Juvenile Court Leave |
| | Family Military Leave |
| Oregon | Family and Medical Leave including Pregnancy Disability |
| | Crime Victims Leave |
| | Domestic Violence and Sexual Assault Victim Leave |
| | Bone Marrow Leave |
| | Military Family Leave |
| Pennsylvania | Pregnancy, Childbirth, and Childrearing Leave (Optional based on employer policy) |
| | Victims of Crime/Witness Leave |
| | Volunteer Firefighters |
| Puerto Rico | Maternity Leave |
| Rhode Island | Parental and Family Medical Leave |
| | School Involvement Leave |
| | Crime Victims Leave |
| | Rhode Island Military Family Relief Act |
| South Carolina | Donation of Bone Marrow Leave |
| | Pregnancy Disability Law |
| | Victims of Crime/Court Witness Leave |
| | Volunteer Firefighter/Emergency Worker |
| South Dakota | Pregnancy Disability Leave |
| Tennessee | Maternity & Adoption Leave |
| | TN Vol. Firefighter Leave |
| Texas | Crime Victim/Court Witness Leave |
| Utah | Victims of Crime |
| U.S. Virgin Islands | Victims of Crime |
| Vermont | Parental and Family Leave |
| | Short-Term Family Leave |
| | Victims of Crime/Witness Leave |
| Virginia | Crime Victims Leave |
| | Court Attendance |
| Washington | Family Leave Act |
| | Pregnancy/Childbirth Leave |
| | Domestic Violence Leave |
| | Volunteer Firefighter/Emergency Worker |
| | Family Military Leave |
| West Virginia | Volunteer Firefighter/Emergency |
| Wisconsin | Family and Medical Leave |
| | Victim of Crime/Witness Leave Law |
| | Civil Air Patrol Duties |
| | Volunteer Job Protection Act |
| Wyoming | Victims of Crime/Witness Leave |

For each type of leave listed in Table 1, data stored in leave related data storage 224 may include data indicative of applicable rules. Stored data may include text for prompting a user to input data specific to each type of leave. For the leave types in Table 1 with the notation "Optional based on employer policy," the data stored in leave related data storage 224 may include a flag or other indication associated with each employer having employees in that state whether the employer's policy provides that type of leave.

In an embodiment, inputs may include user interfaces, including workstations having keyboards, touch screens, pointing devices such as mice, or other user input devices, connected via networked communications to processor 210. Network interface unit 205 may communicate via network 250 with remote sources of data, such as databases maintained by other systems, including computer systems for administering a single type of leave, such as workers compensation or short term disability, employer computer systems, employee computer systems and other devices, and with systems for implementing instructions output by processor 210. Systems for implementing instructions output by processor 210 may include systems for initiating communications with employers, employees, physicians, other service providers, and others, via printing in hard copy and mailing, via postal mailing, of communications, printing to electronic files and faxing of communications, formatting and sending e-mail communication, formatting automated telephone communications, and other systems and modes of communication. Network 250 may be or include wired or wireless local area networks and wide area networks, and over communications between networks, including over the Internet. Any suitable data and communication protocols may be employed.

Figure 3:
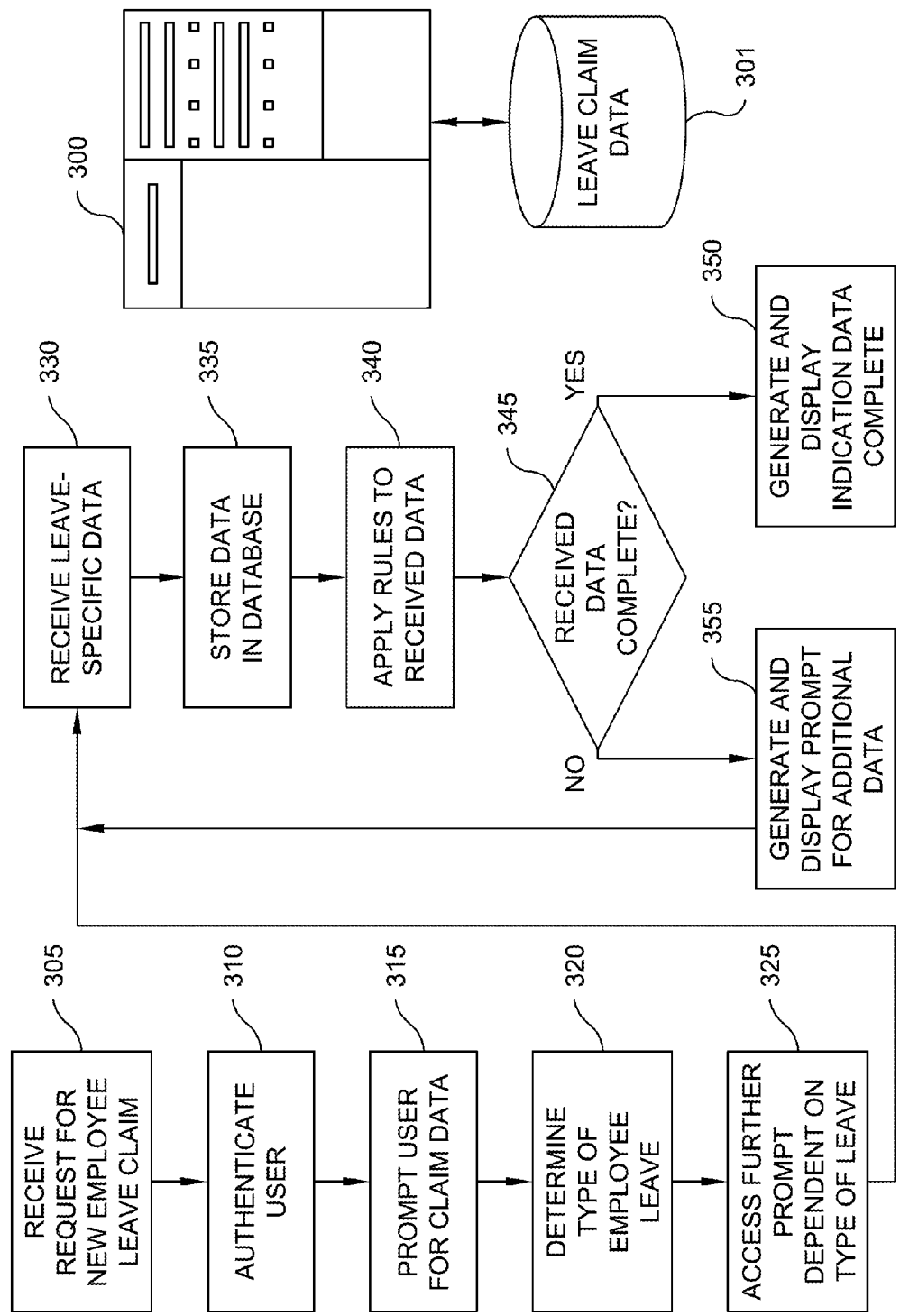
FIG. 3 is a process flow diagram illustrating steps in an embodiment of a method of the invention.

Referring now to FIG. 3, an exemplary method of claim intake will be explained. A processor, such as a processor of server 300, receives 305, via a computer communications network (such as LAN 120 of FIG. 1), from a user at a client device, data indicative of a new claim or request for leave. The processor may authenticate 310 a user, such as by prompting for credentials such as user name and password, employer name, employee identification number or name, employee social security number, or other suitable data. The processor may then provide an output signal for display on a user device a prompt 315 for the user to provide initial claim intake data. The prompt may provide a menu of reasons for the claim from which the user may select, such as injury, illness, other medical condition (e.g., pregnancy), child bonding, military services, protected volunteer activities, or other reason. The processor may receive 320 initial data in response to the prompt. The processor may access 325, dependent on the response, a further prompt to elicit more detailed information depending on the nature of the claim. For example, if the claim is an injury, the prompt may include a series of questions related to the nature of the injury and the time, place and circumstances of the injury, so that rules may be applied to categorize the claim as workers compensation or short term disability. The prompts may include requests for information as to whether the injury occurred while the claimant was on duty or clocked in, on break, or in transit to or from a job location. For example, rules may be provided to deny a claim for workers compensation if the injury did not occur during a time period when the claimant was on duty, or during a shift of the claimant or within a window of time before and after a shift of the claimant. The time, place and circumstances of the injury may also facilitate application of rules indicative of possible subrogation, such as if the injury occurred at a facility other than the employer's facility, involved a vehicle not operated by the employer, or involved machinery manufactured or maintained by an entity other than the employer. If a positive answer is received to one or more of the foregoing, the system may store an indication that the claim is a candidate for possible subrogation; rules may be provided for providing an alert to an individual to evaluate a claim for subrogation in response to the stored indication. Responses to these questions constitute leave-specific data for a leave claim based on injury. If the leave is for child bonding, the prompts may be for relationship to the child, nature of the addition of the child to the family (adoption, birth, fostering) and other data. Responses to these questions may constitute leave-specific data for a leave claim based on child bonding. By way of example, rules may be provided for denial of a leave claim based on child bonding if the relationship between the employee and the child is not as specified in applicable statutes, rules or employer policies. The processor may receive 330 leave-specific data, and store 335 the leave-specific data in a suitable database, such as database 301. The processor may apply one or more business rules 340 to the received data determine whether the data is complete 345. If the data is complete, the processor may generate and display 350 an indication that the claim data is complete. If the data is not complete, the processor may generate and display 355 a prompt for the missing information, and the process flow returns to receiving claim data 330.

Referring now to FIGS. 4A-4J, an exemplary process flow for claim intake in a system according to an embodiment will be explained. The row designations at the left hand side of FIG. 4A apply to FIGS. 4B-4E. The row designations at the left hand side of FIG. 4F apply to FIGS. 4G-4J. As explained in the short term disability/workers compensation row 401, a notice is received 402 in any suitable format, such as by submission of a paper form, electronic form, telephone call, faxed form, or other suitable format, and then a claim is set up 403 in a suitable computer system, which is referred to as the DCS/SOURCE system here. The DCS/SOURCE system then transmits 404 data relating to the claim in a suitable format to a leave management computer system, which is abbreviated to LM system in FIGS. 4A-4J and the succeeding process flow diagrams. The leave management computer system may be implemented by a comprehensive leave management computer system as discussed above.

As shown in employee/employer row 405, a claim may be initiated by an authorized representative logging on, being authenticated and then communicating through a suitable system or network (indicated here as THAW), to access 406 the leave management system. The leave management system prompts the user for suitable data, using, for example, a menu-driven system to provide a series of appropriate prompts depending on the prior data entry. The data is entered and received 407. The data may also be provided to the leave management system via a phone report 408, such as from an employer or employee to a live operator reading questions from a screen generated by the system and entering data. In an embodiment, the phone call may prompt a coordinator to begin recording a phone call 410.

Figure 4A:
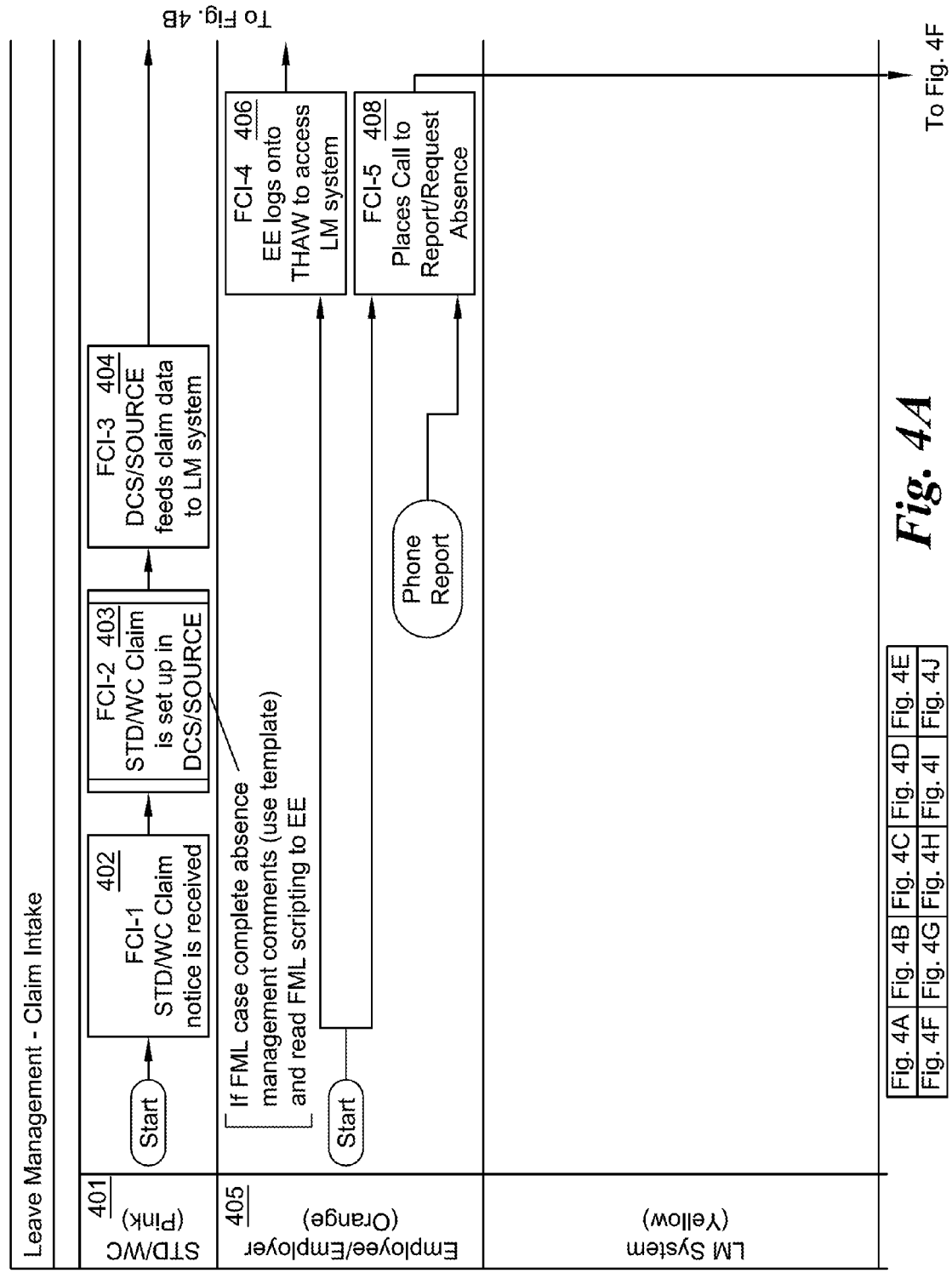
Figure 4B:
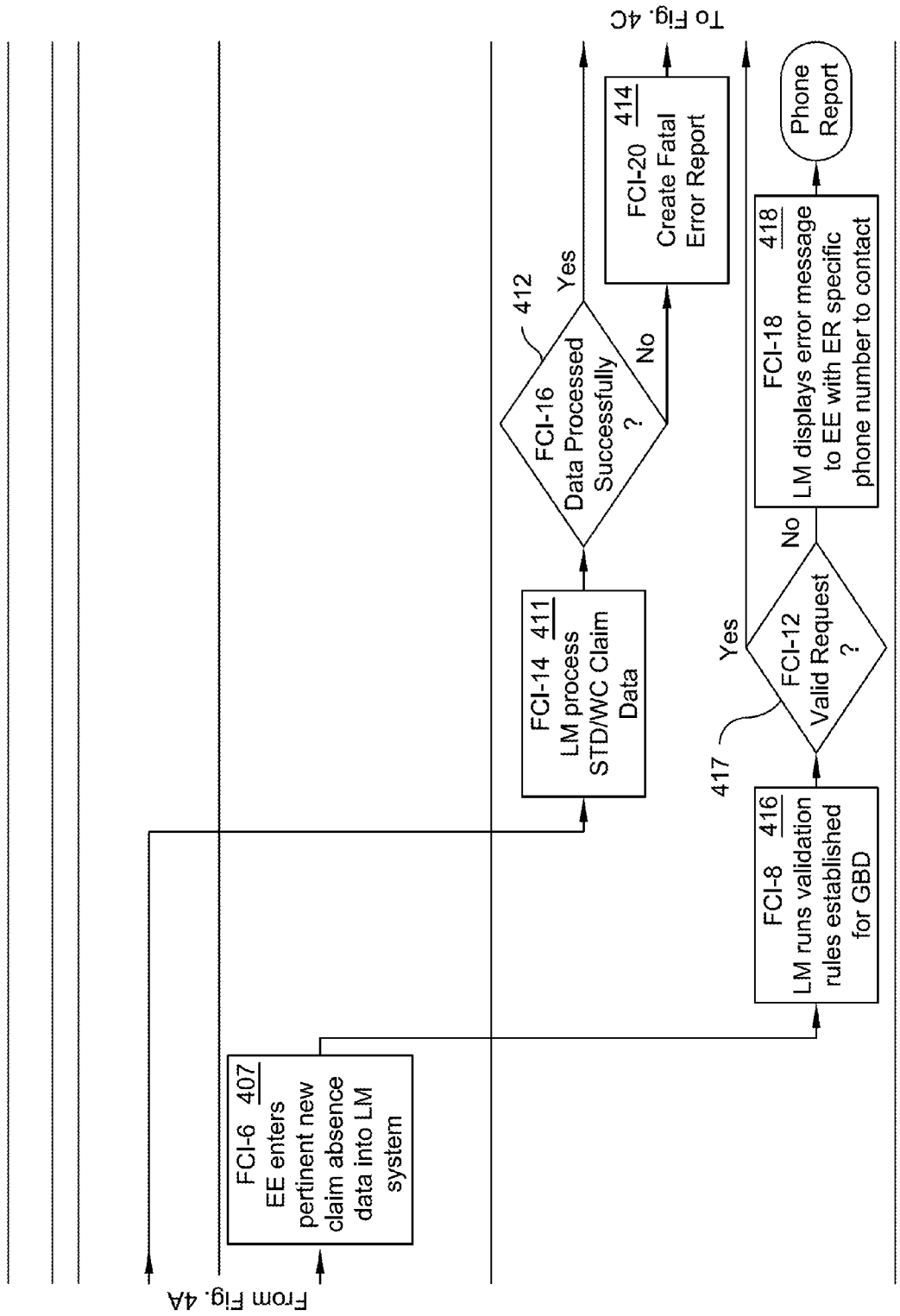
Figure 4C:
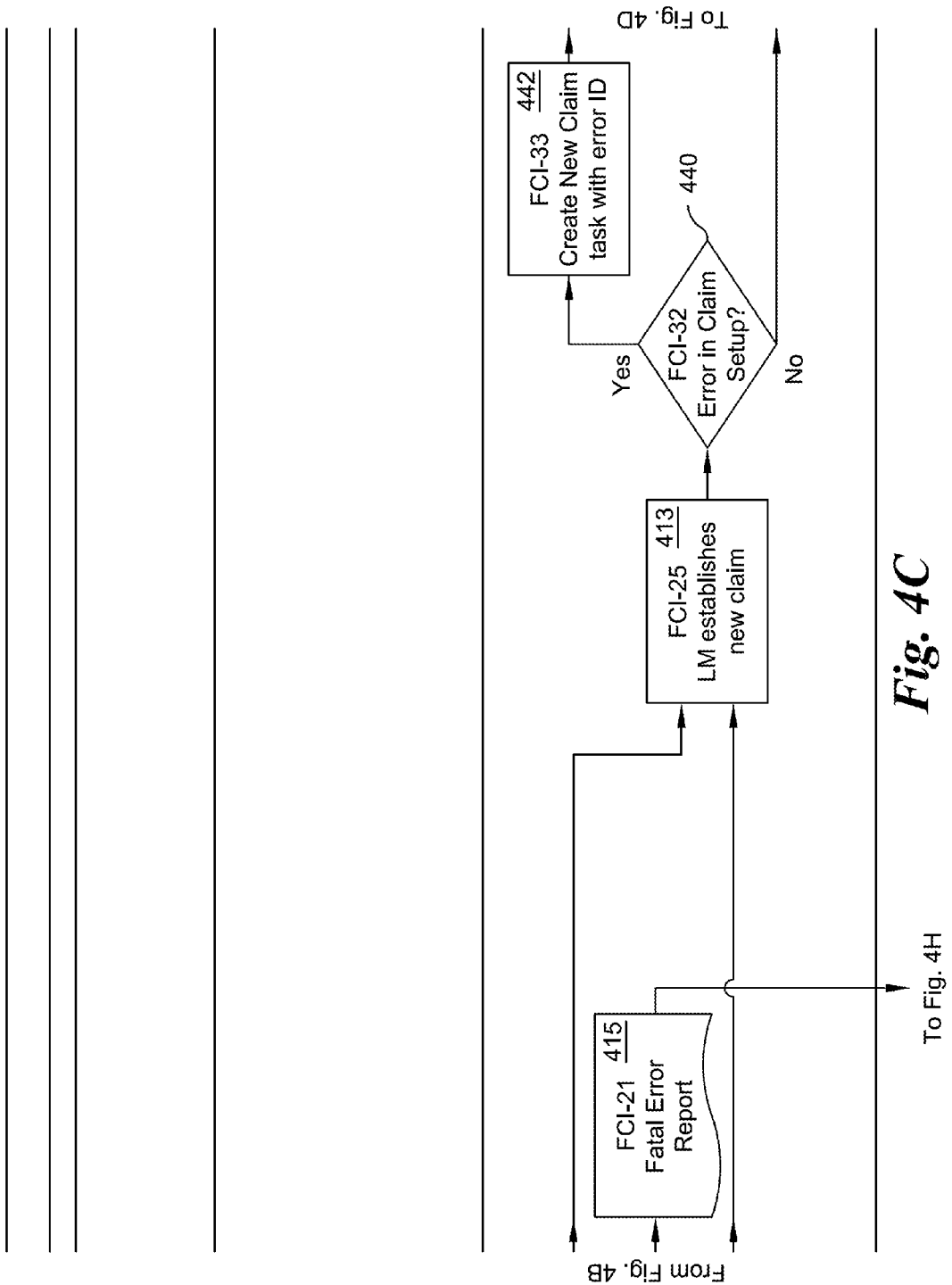
Figure 4F:
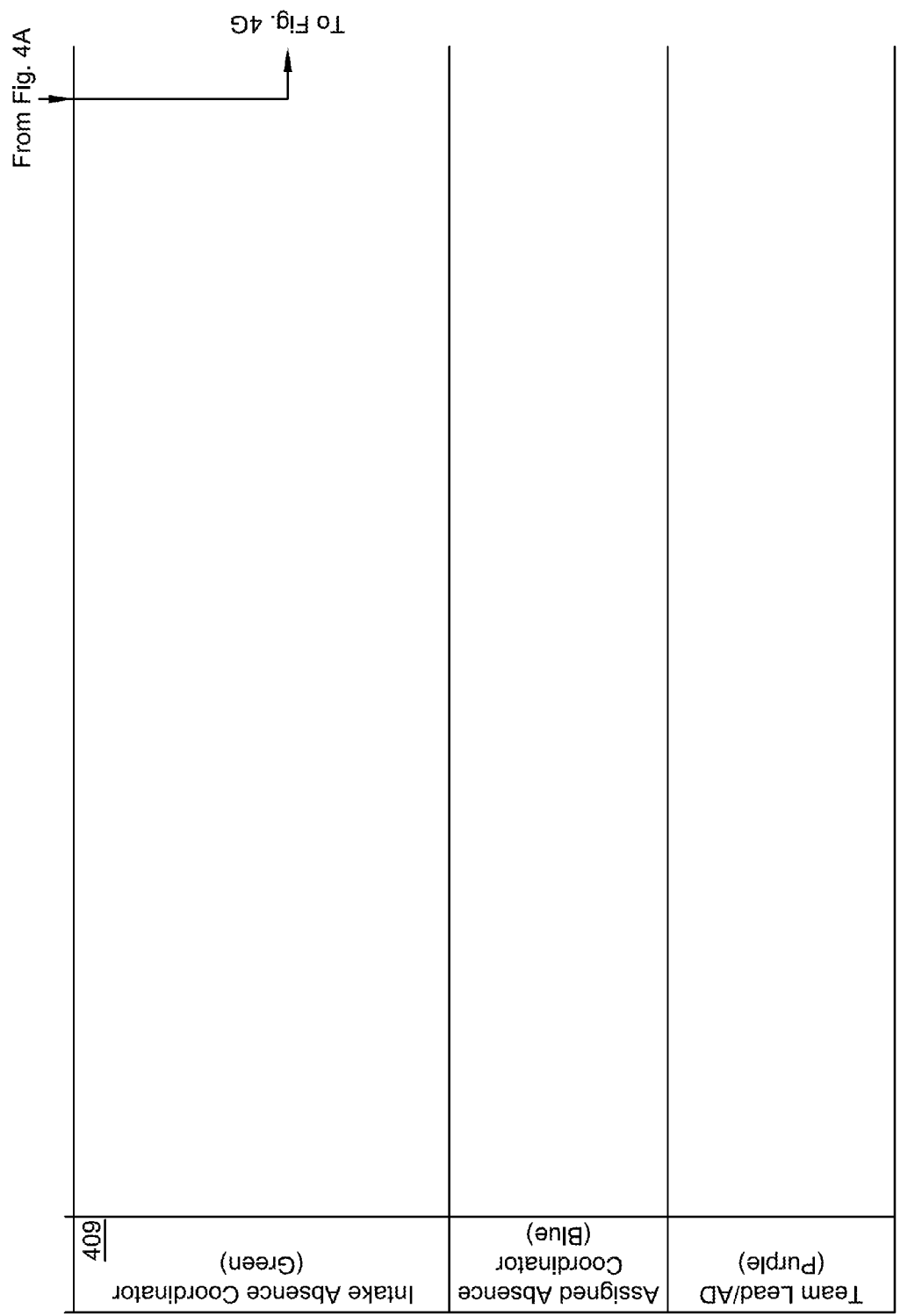

Referring now to FIG. 4B, in the case of data received by the leave management system electronically, the data is run through initial processing 411 by the LM system. Initial processing may include checking data for completeness, verification with records relating to the employer as to coverage, running rules for presence of unusual data items that are indicative of errors in data entry or fraud, and running other rules. If the data is processed successfully, such as without identification of missing data elements, with confirmation of coverage, and no identification of indications of errors or fraud then the LM system establishes 413 a new claim in its database. If the data is not processed successfully, then the system generates 414, referring now to FIG. 4C, a fatal error report 415. The fatal error report may be furnished to an individual, such as a team leader, for review and further action. As with other documents described in this application, the fatal error report document may take the form of any type of communication capable of being read by an individual, such as a printed report, an electronic image file, an e-mail, a text message or other message or document.

Continuing to refer to FIG. 4B, in the case of data received from an employee or employer login, the LM system runs 416 validation rules on the data, which may verify completeness, consistency with data in insurance company databases, and include application of rules. If the request determined by the LM system to be valid 417 based on the validation rules, the LM system establishes (referring to FIG. 4C) 413 a new claim. Referring again to FIG. 4B, if the request is not valid based on the validation rules, then an error message 418 may be generated by the system and displayed on the user device, providing a telephone number of a live operator to call. The process flow then proceeds to the phone report flow.

Figure 4G:
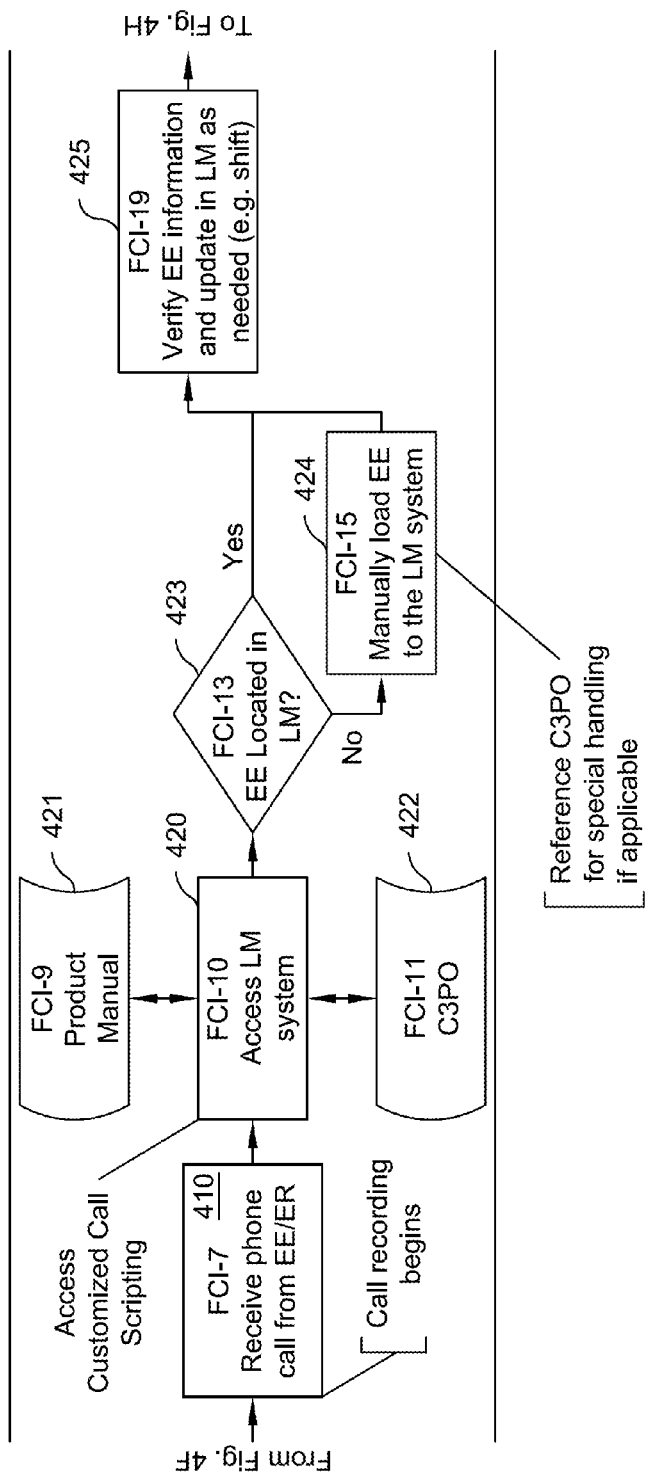
Figure 4H:
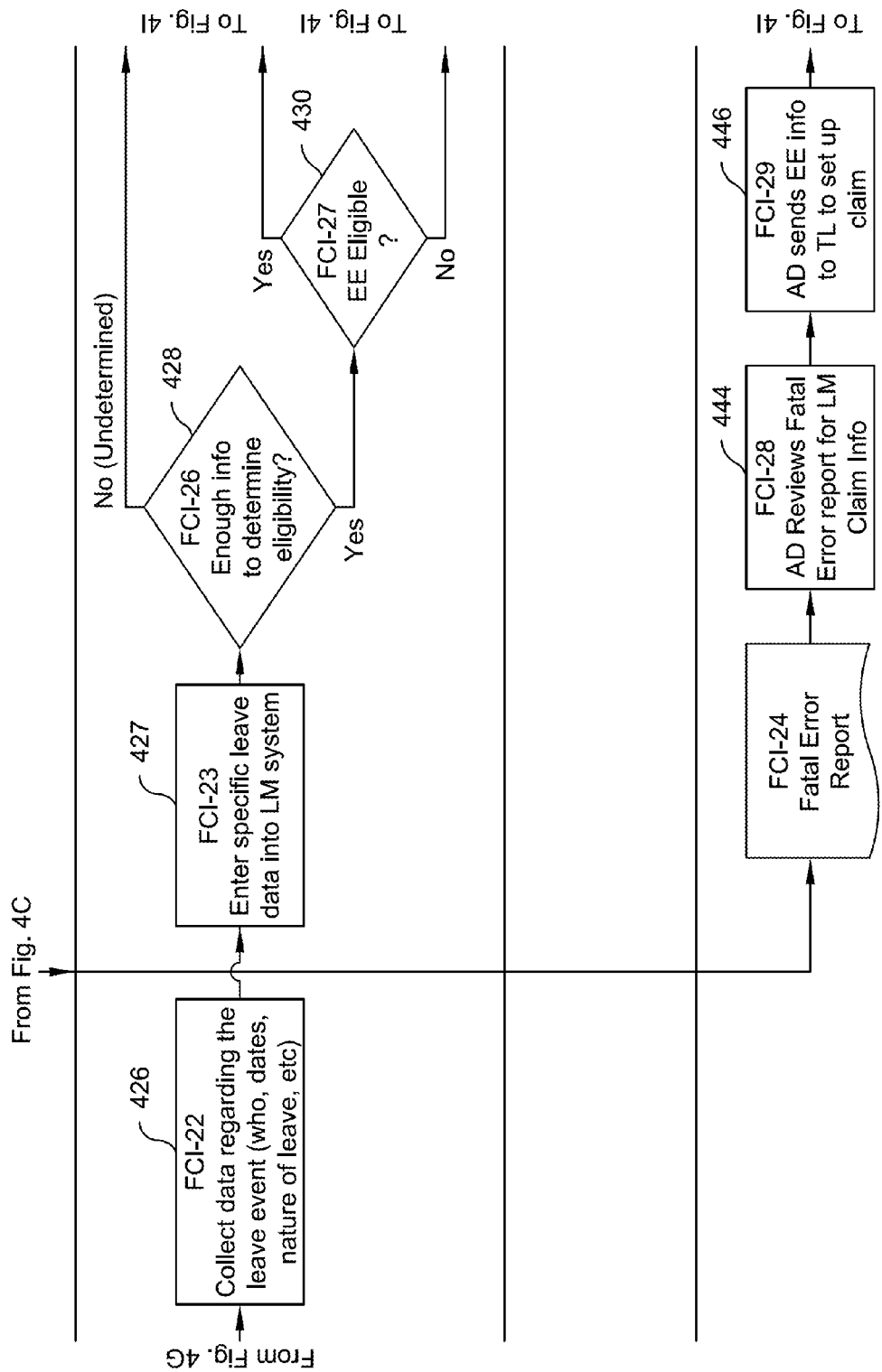
Figure 4I:
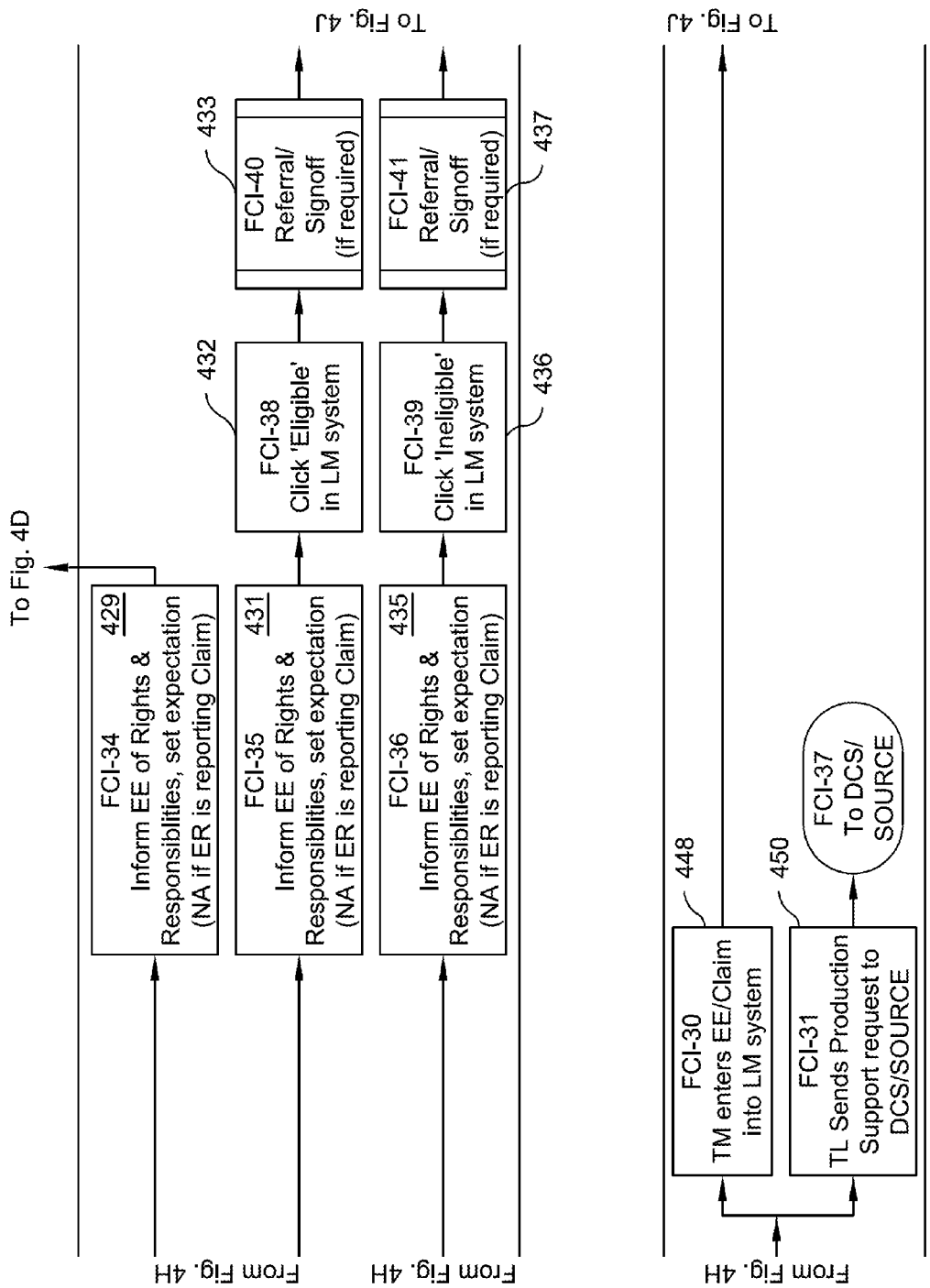
Figure 4J:
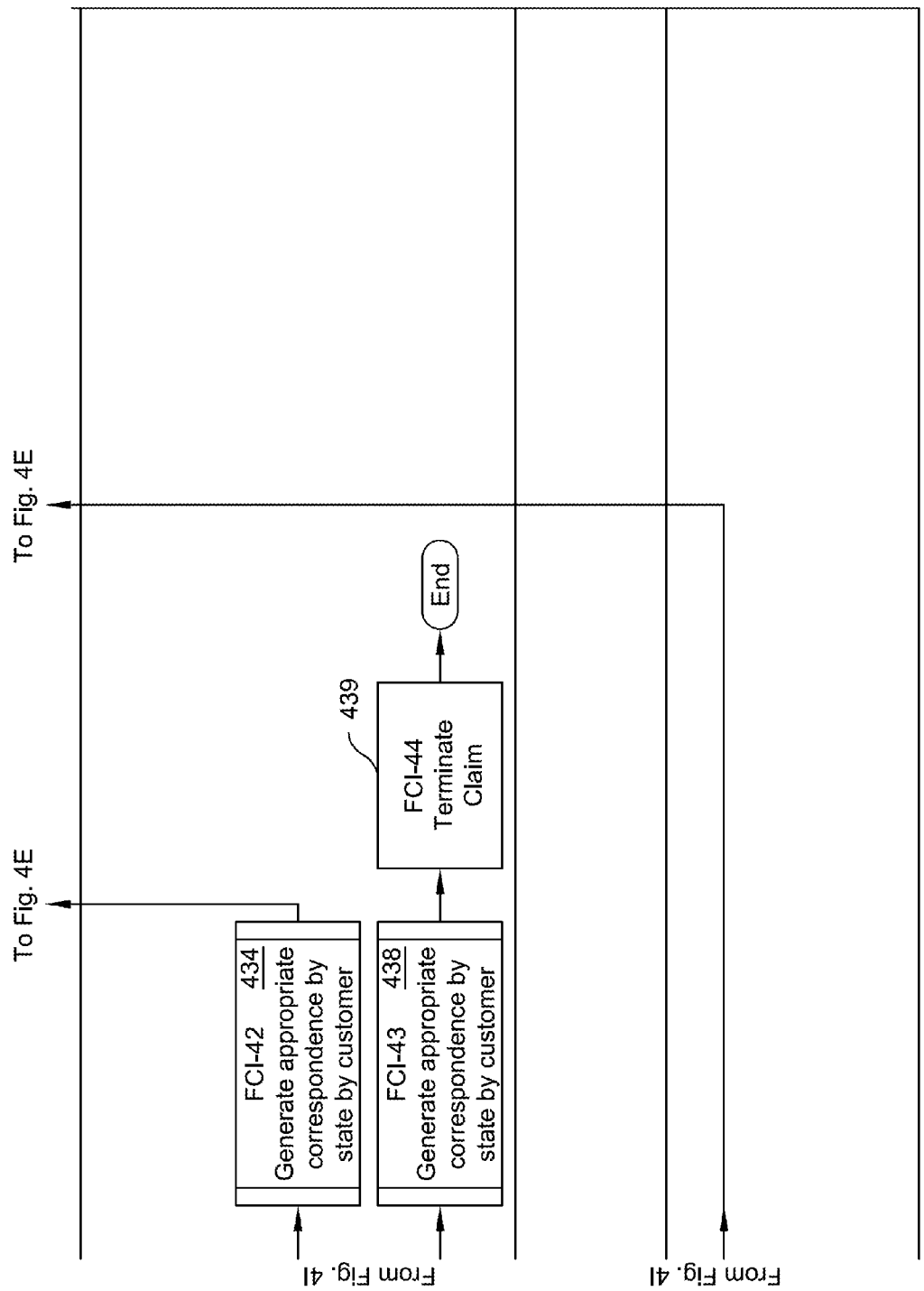

In the phone report flow, referring to FIG. 4G, the phone representative may access 420 the LM system, and use relevant product manuals 421 or other resources 422. The system may be configured to generate scripts to be read by the phone representative. The employee and employer data may be verified in the system. If the employee and employer data is not identified 423, the system may prompt the telephone operator to load the data into the system 424 or to modify the data if needed. The system runs suitable rules on the data 425 regarding the employer and employee and prompts the telephone operator for updates. Such data as an employee's shift, for example, may need to be updated. Referring to FIG. 4H, the system prompts 426 the telephone operator for data regarding the leave event. For example, the system may generate for display fillable forms prompting the user to provide data regarding the leave event, including employee identification information, commencement date of leave, reasons for leave, end date of leave if applicable, and other data. The specific data is entered by the operator into a user-accessible device and received by the system 427. The system then applies one or more rules to determine 428 whether there is sufficient data to determine eligibility of the claim for the requested leave. The rules may be specific to individual employers, jurisdictions such as states, classes of employees, or other categories. The rules may also be applied to determine whether the employee is eligible for particular benefits as a result of the leave, such as either workers compensation or short term disability payments. Referring to FIG. 4I, if there is not sufficient data, and the employee is reporting the claim, then the system may prompt 429 the telephone representative to provide rights and responsibilities information, such as by providing a text regarding the rights of an employee to seek further review of the decision to deny a claim, and responsibilities of the employee to maintain and furnish records. If there is sufficient data, and the employee is eligible 430, then, similarly, the telephone representative is prompted 431 to read rights and responsibilities data, and to input 432 on a suitable system-generated display the fact of eligibility. The system is configured to apply rules to determine and generate 433 a request for any required approval, referral or signoff. The system may, responsive to receiving data indicative of any required approvals, generate 434 appropriate correspondence to the employer and employee, depending on the type of claim, applicable state or Federal regulatory requirements, and the like. The system includes in a memory device a plurality of templates for generating correspondence, and rules, based on the type of leave, state, and other factors, for selection of the suitable template. The templates include fields that are populated with appropriate data from the system database concerning the particular leave, such as employee name, employer name, type of leave, effective date of leave, amounts of benefits, duration of leave, requirements for documentation of entitlement to continued leave beyond the duration, and the like.

If the employee is not eligible, the telephone representative is prompted 435 to read rights and responsibilities data appropriate for an employee who is not eligible, and to input 436 on a suitable system-generated display the fact of ineligibility. The system is configured to apply rules to determine and generate 437 a request for any required approval, referral or signoff on the determination of ineligibility. The system may, responsive to receiving data indicated of any required approvals, referring to FIG. 4J, generate 438 appropriate correspondence to the employer and employee, depending on the type of claim, reasons for lack of eligibility, applicable state or Federal regulatory requirements, and the like. The template correspondence, and rules, based on the type of leave, state, and other factors, for selection of the suitable template may include template correspondence for correspondence reporting the lack of eligibility. The templates include fields that are populated with appropriate data from the system database concerning the particular request, such as employee name, employer name, type of leave requested, reasons for lack of eligibility, and the like. The system then proceeds to terminate 439 the claim, shown in FIG. 4J. Referring again to FIG. 4C, the system applies rules to verify that all new claims have been properly set up. Claim set up errors may include internal inconsistencies in the data. If an error is detected, the system may select an error identification code from a table, and generate 442 a new claim task with the selected code identifying the type of error.

Referring again to FIG. 4H, if a fatal error in a claim has been detected, a task is set for an individual to review 444 the fatal error report for data relevant to the claim. The system receives the data and may provide 446 the data to the employee or employer to attempt again to set up a new claim. If a subsequent attempt to set up a claim is not successful, referring to FIG. 4I, then the system generates a request 450 for technical support. If the claim is successfully entered 448, then the system will assign the claim to an individual and assign a task to verify eligibility. The system also assigns new claims processed electronically and Properly set up claims and eligible employees result in the system providing a process flow to proceed to a verification or validation of eligibility process flow. Uncertain information causes the system to invoke an adjudicate claim process.

Figure 5B:
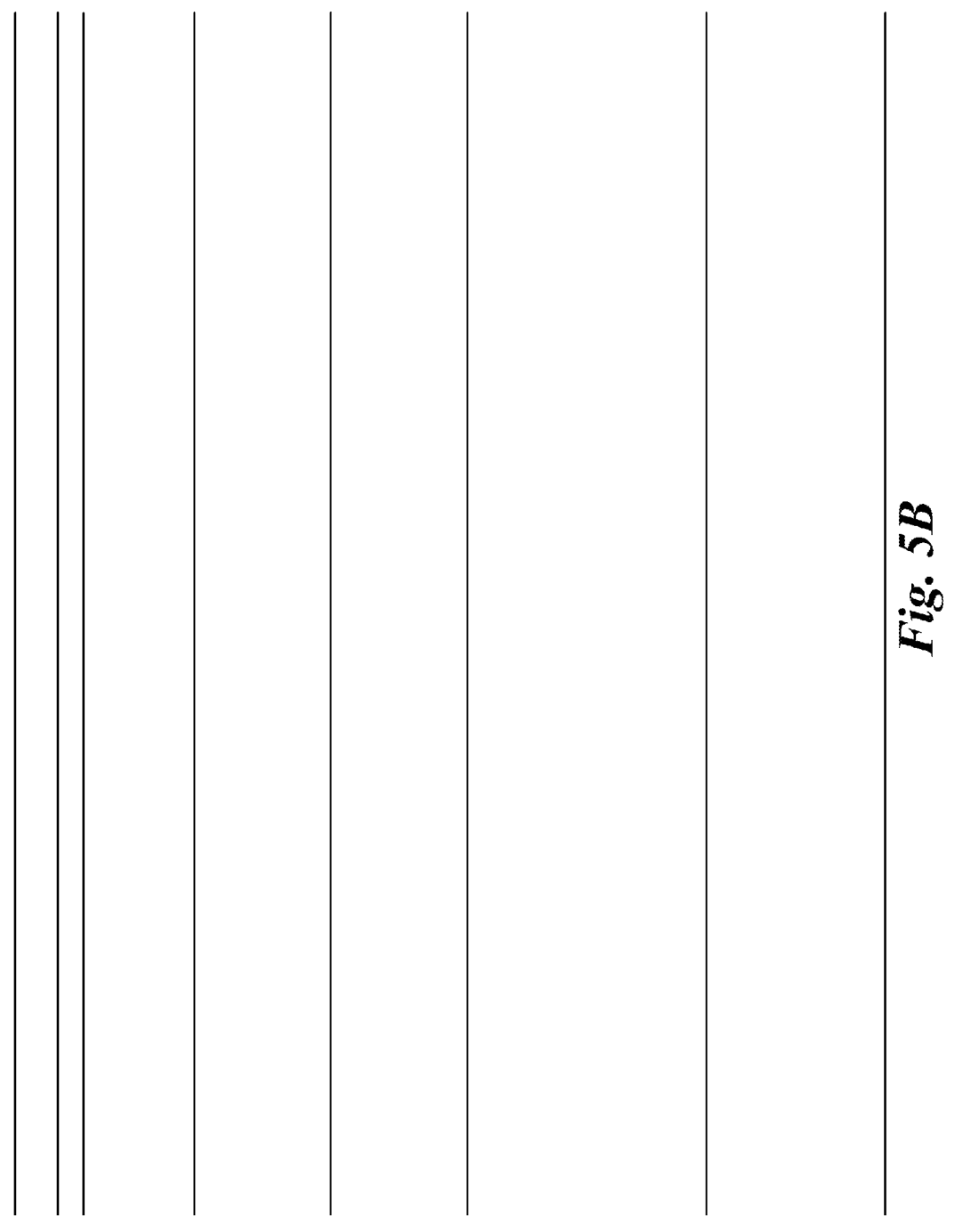
Figure 5D:
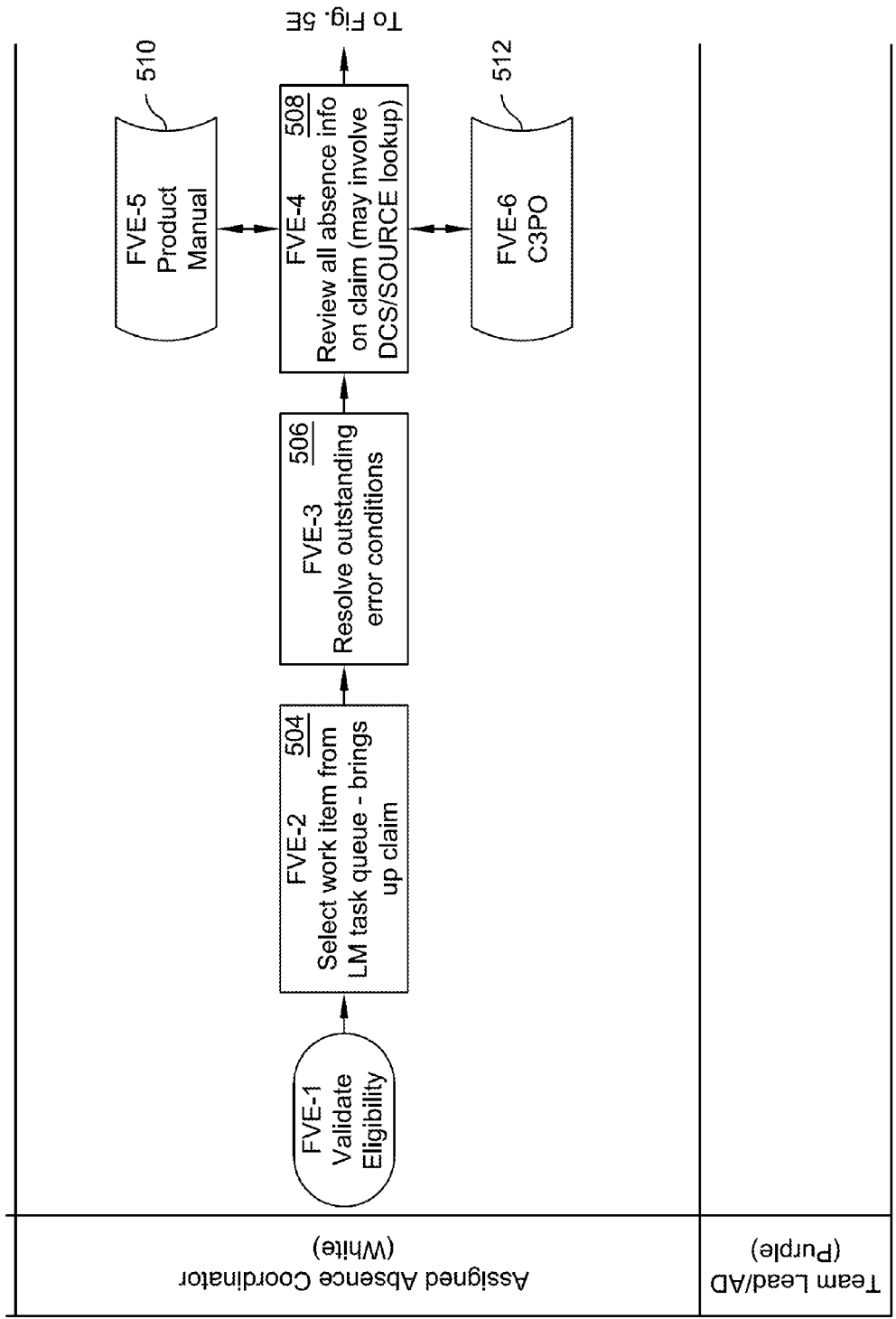
Figure 5E:
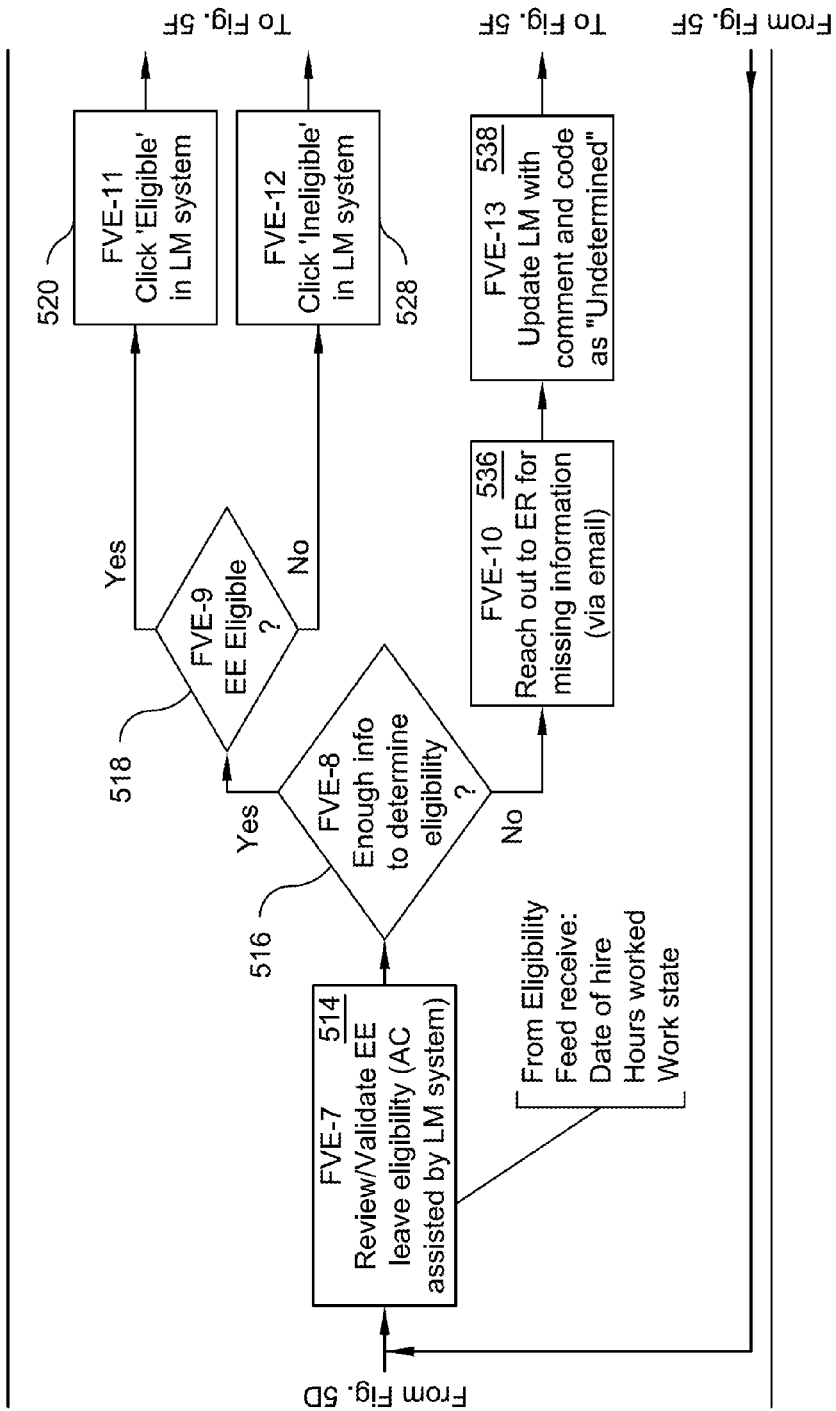

Referring to FIGS. 5A-5F, a process flow of a validation of eligibility process will be explained. The row designations at the left hand side of FIG. 5A apply to FIG. 5B-5C. The row designations at the left hand side of FIG. 5D apply to FIG. 5E-5F. The system may display a work queue on a user-accessible device to an absence coordinator, who may be an individual. The system receives a selection of a work item from the work queue, and, responsive thereto, referring to FIG. 5D, the system displays 504 information relating to the claim, including employee and employer name, type of position, type of claim, claim details such as type of injury, date of injury, location of injury and other details. The system may display data indicating errors in data. The system receives input from the individual sufficient to resolve 506 any error conditions. For example, an error condition resulting from a state of employment inconsistent with a listing of states associated with the employer may be resolved by the individual correcting the state of employment after review of records or other investigation. The system may, responsive to user requests, display all data available related to the absence 508. The system may access and make available manuals 510 and other sources of information 512. The user may add or modify data to resolve discrepancies. Referring to FIG. 5E, the system may apply rules to determine 514 whether the claim is eligible for leave. The system may be configured to prompt the user to make one or more determinations or to make an ultimate determination of eligibility. The system may also be configured to determine whether sufficient data is available for either the system or a user to make an eligibility determination.

Figure 5F:
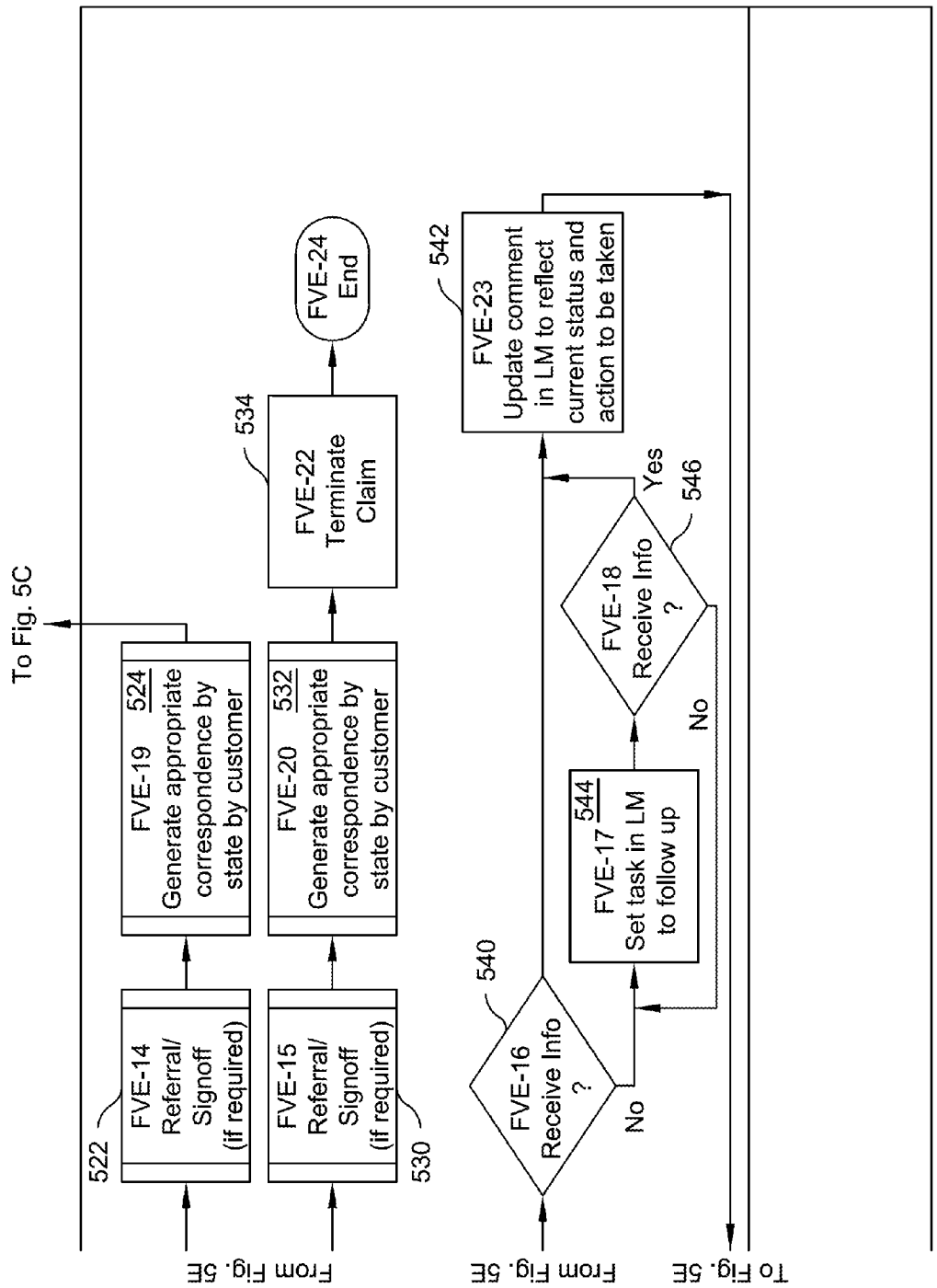

If there is sufficient data available 516, then the system determines 518, either in a fully or partially automated manner, whether the employee is eligible for the requested leave. Referring to FIG. 5E, if the determination is that the employee is eligible for the requested leave, the system prompts the user to confirm that the employee is eligible, such as by displaying a button labeled "eligible" on the display. The system receives data indicative of confirmation of eligibility when the user clicks on the button 520. Referring to FIG. 5F, the system is configured to apply rules to determine and generate 522 a request for any required approval, referral or signoff. The system may, responsive to receiving data indicative of any required approvals, generate 524 appropriate correspondence to the employer and employee, depending on the type of claim, applicable state or Federal regulatory requirements, and the like. Stored templates and associated rules, as discussed above in connection with FIGS. 4A-4J, may be used to generate the correspondence. The system may then assign an individual employee and associate a task to adjudicate the claim 526 (FIG. 5C).

If the employee is not eligible for the requested leave, the system prompts the user to confirm that the employee is not eligible, such as by displaying a button labeled "not eligible" on the display. Referring to FIG. 5E, the system receives data indicative of confirmation of eligibility when the user clicks on the button 528. Referring to FIG. 5F, the system is configured to apply rules to determine and generate 530 a request for any required approval, referral or signoff. The system may, responsive to receiving data indicative of any required approvals, generate 532 appropriate correspondence to the employer and employee, depending on the type of claim, applicable state or Federal regulatory requirements, and the like. Stored templates and associated rules, as discussed above in connection with FIGS. 4A-4J, may be used to generate the correspondence. The system will then terminate 534 the claim and conclude the process flow.

If there is not sufficient data available for an eligibility determination, then a query to an employer, a treating physician, or another individual may be required. Referring to FIG. 5E, the system may be configured to generate 536 a communication, such as an e-mail, to the appropriate contact at the employer, or to a treating physician identified by the employee. Templates for e-mails may be stored in a memory device, and rules may be stored in a memory device for selection of an appropriate one of the templates to populate with claim specific information in order to generate the correspondence. Rules may be applied to determine whether privacy consents have been obtained if a physician is to be contacted; if the consents have not been obtained, then a communication may be generated to the employee to provide the required consents. Upon receipt of the consent, then a communication to the physician may be generated by the system. Alternatively, the system may generate a prompt to a user to contact the physician; the prompt may include contact information for the physician and the particular questions to be answered or documents to be provided. In an embodiment, the system may be configured to prompt the user to prepare and send the communication, and to receive an indication from the user that the communication has been sent. The system data related to the claim may be updated 538 with a comment, such as the date and identity of the addressee of the communication, and an "undetermined" code or status assigned to the claim. Referring to FIG. 5F, the system may check periodically, or may prompt the user to indicate, whether the requested information has been received 540. If the information is received, the system automatically, or by receipt of user input, updates 542 the comment in the database associated with the status and action to be taken for the claim. Responsive to receiving the requested data, the system returns the process flow to review and validate leave eligibility, as described above in connection with block 514, for example. The system may be configured, if required information is not received, to associate a task with an individual to follow up 544 to obtain the data, and again to check the system or prompt a user to check 546 for the required information.

Figure 6A:
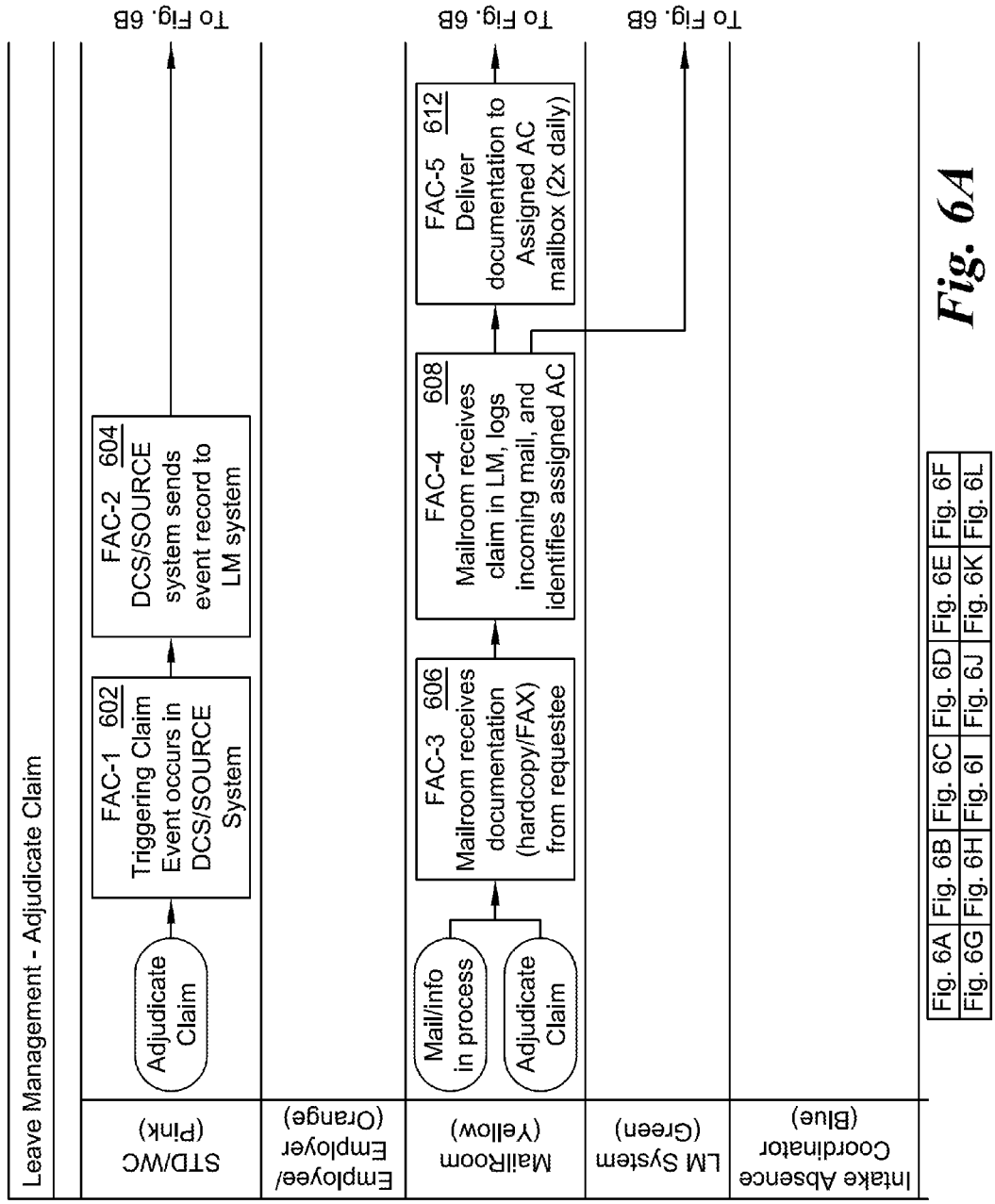
Figure 6B:
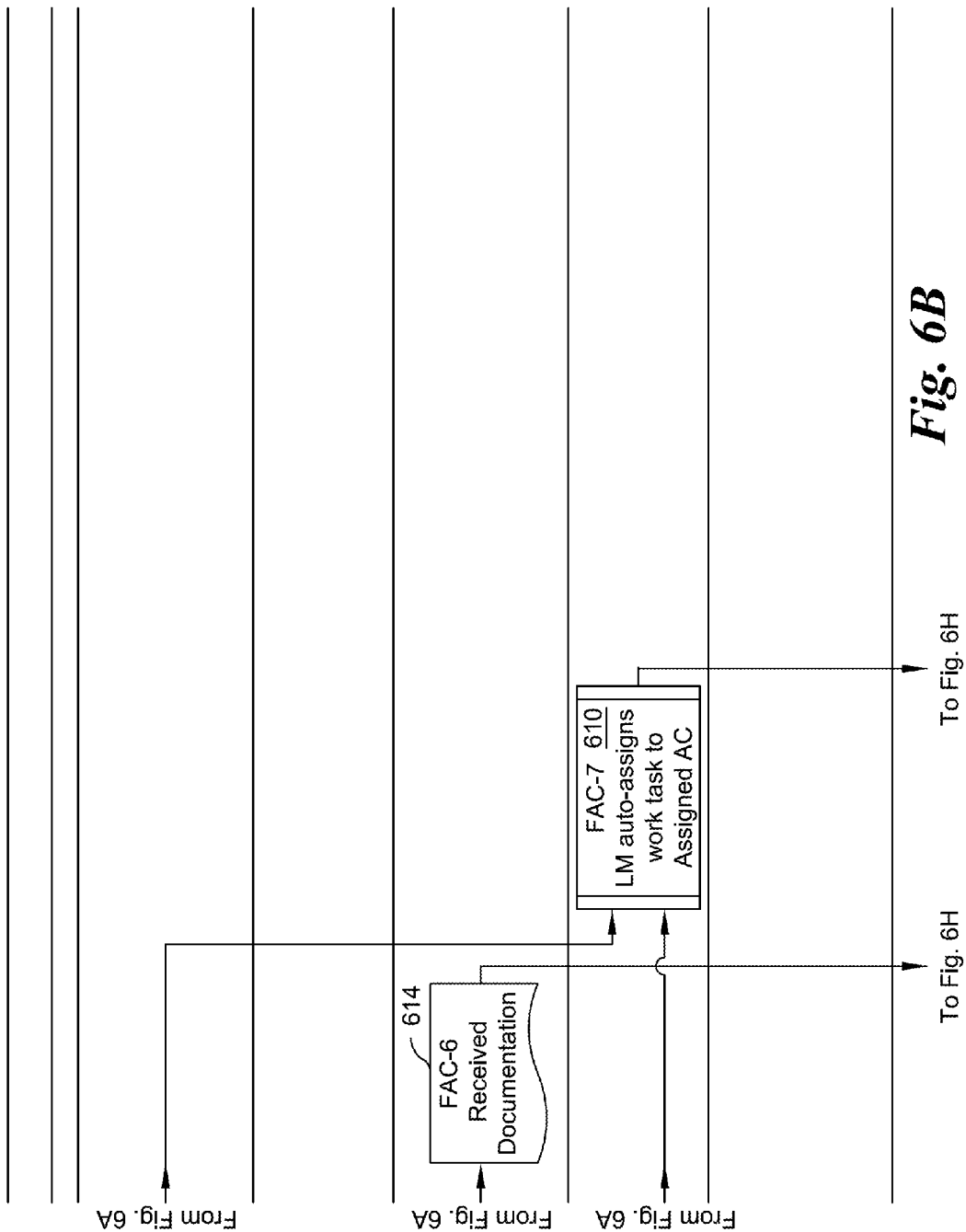
Figure 6C:
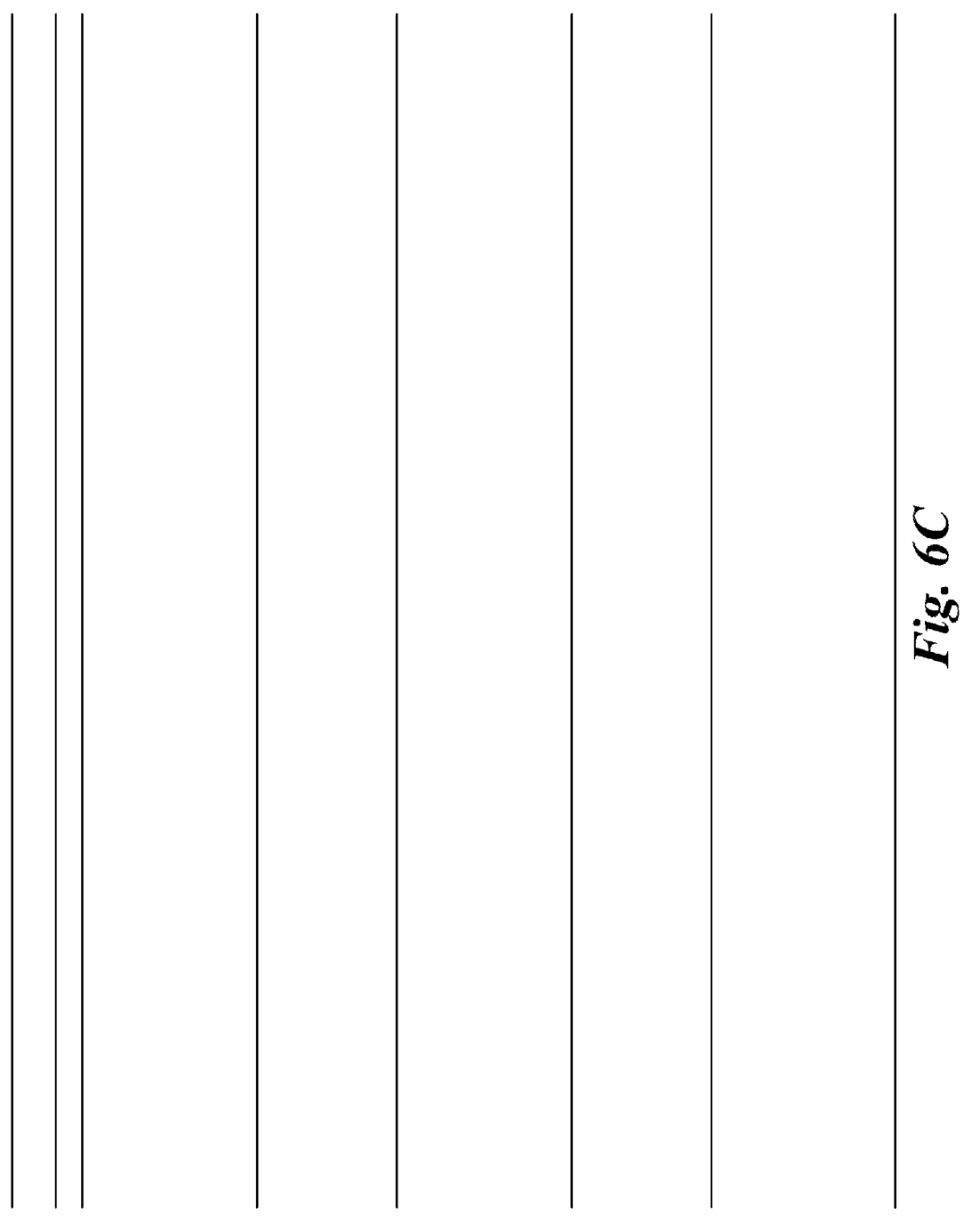
Figure 6D:
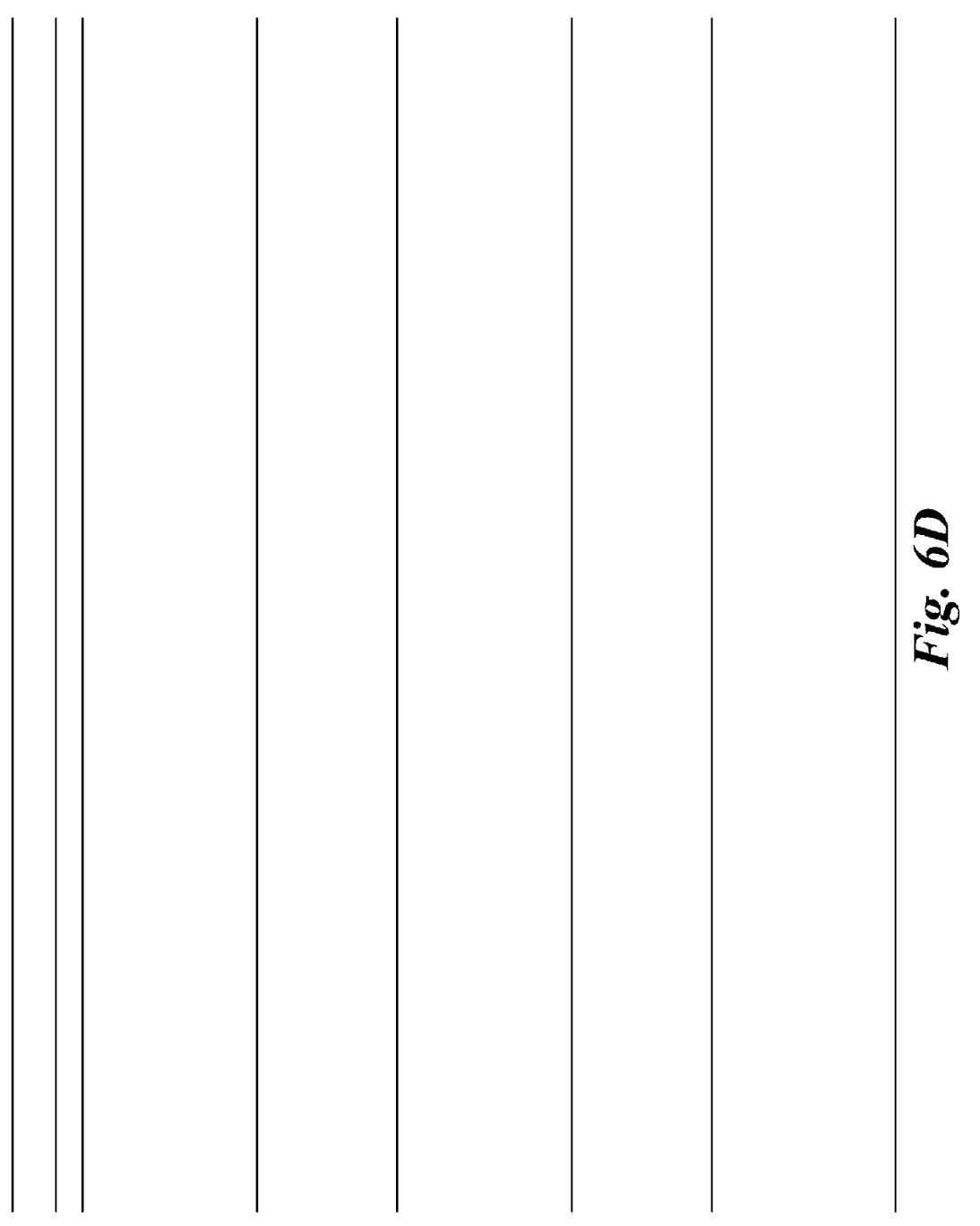
Figure 6E:
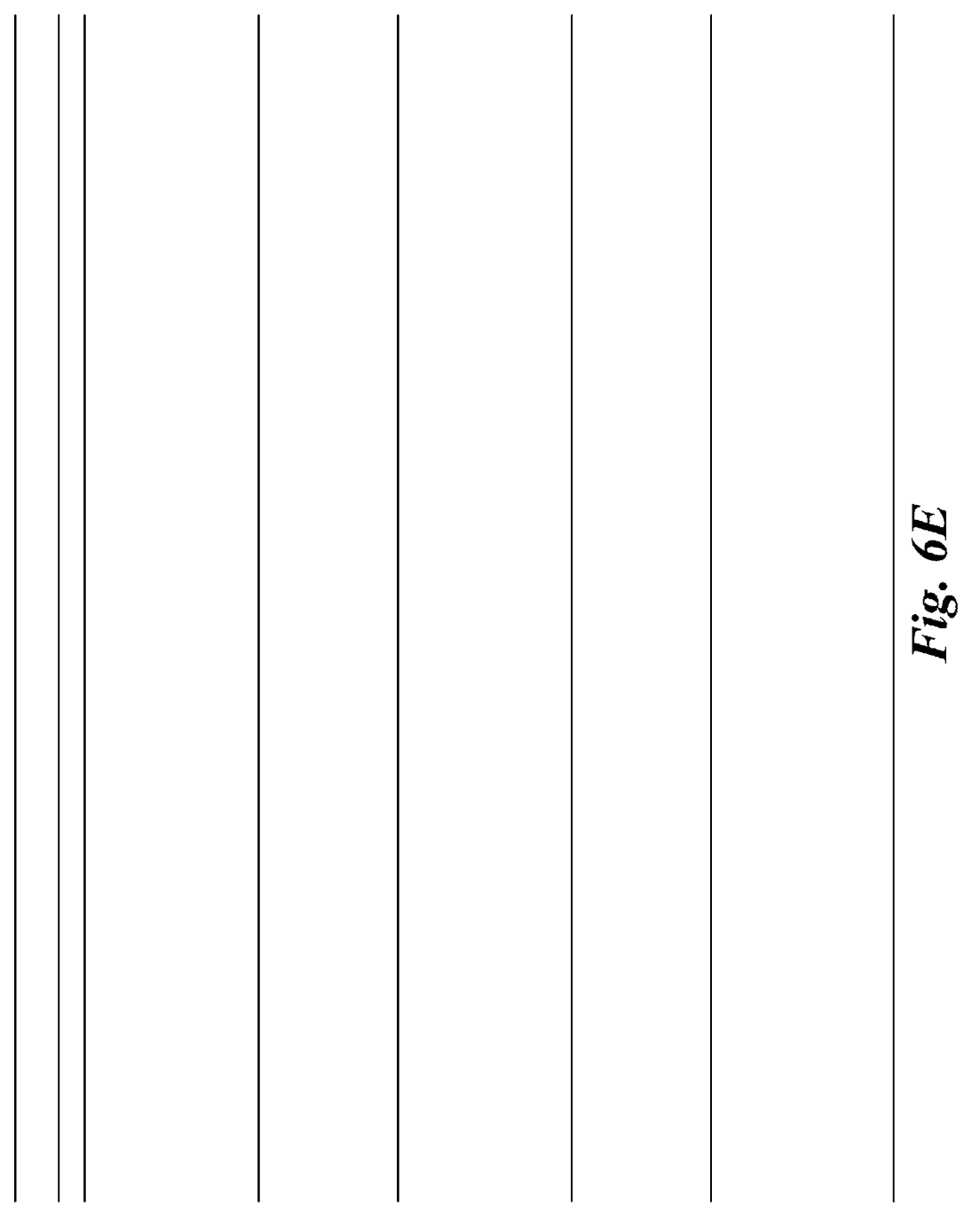
Figure 6F:
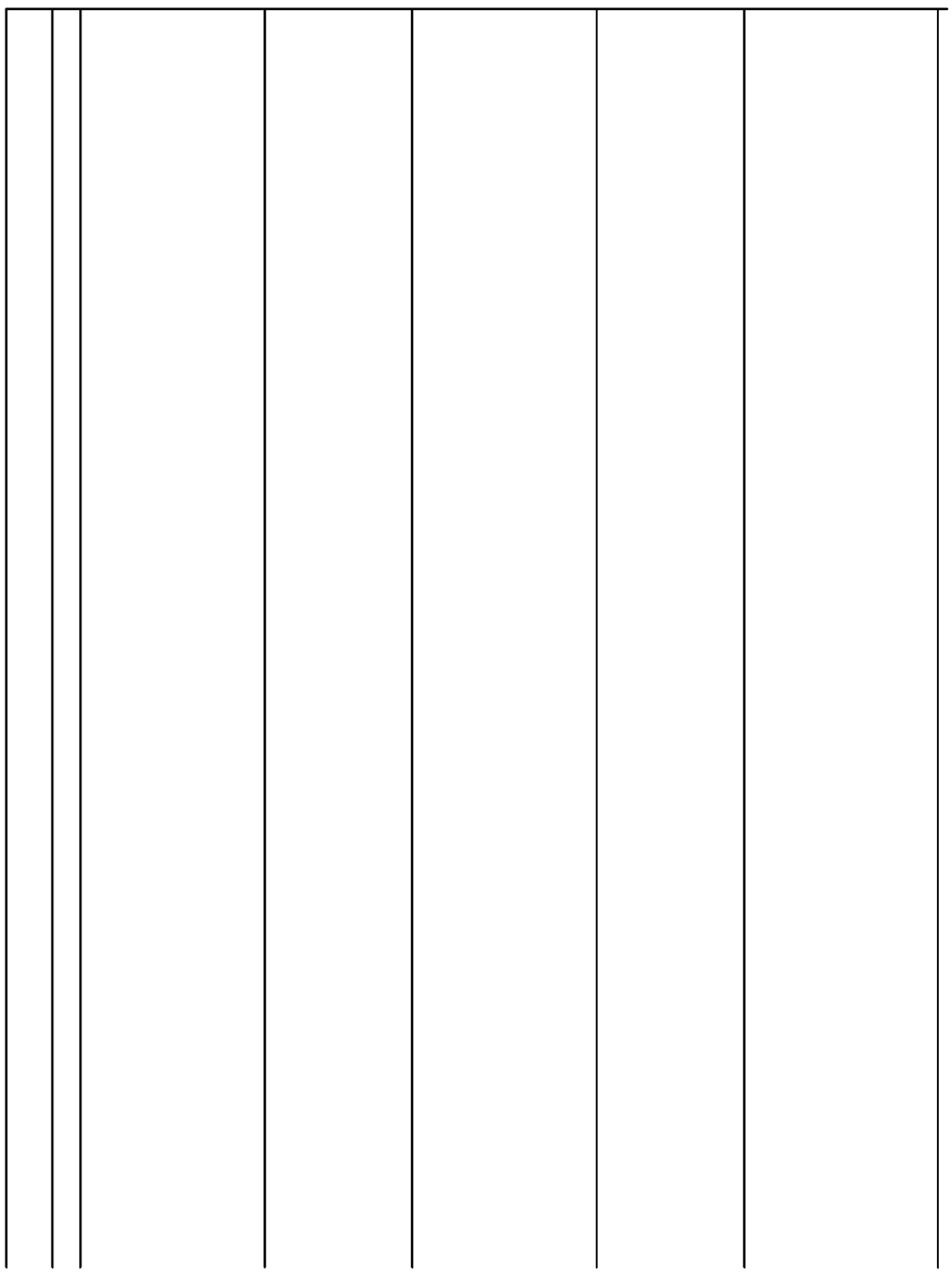
Figure 6H:
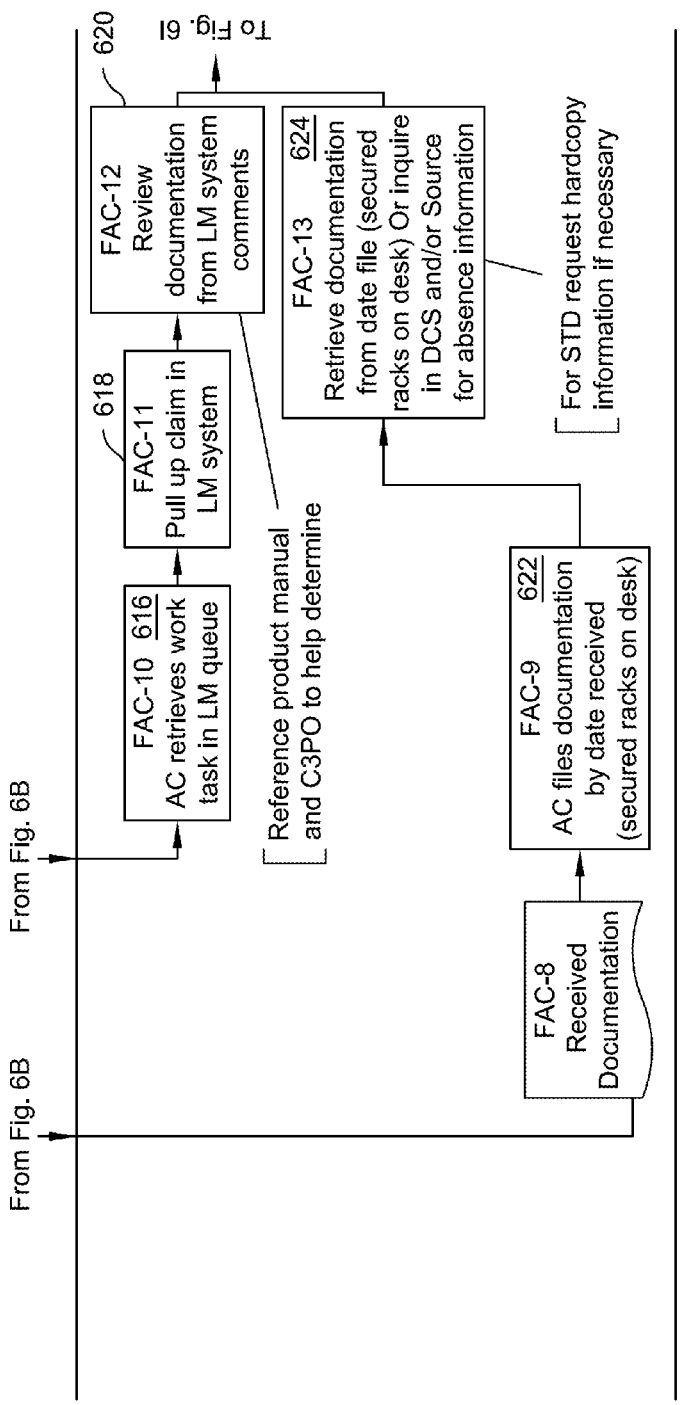
Figure 6I:
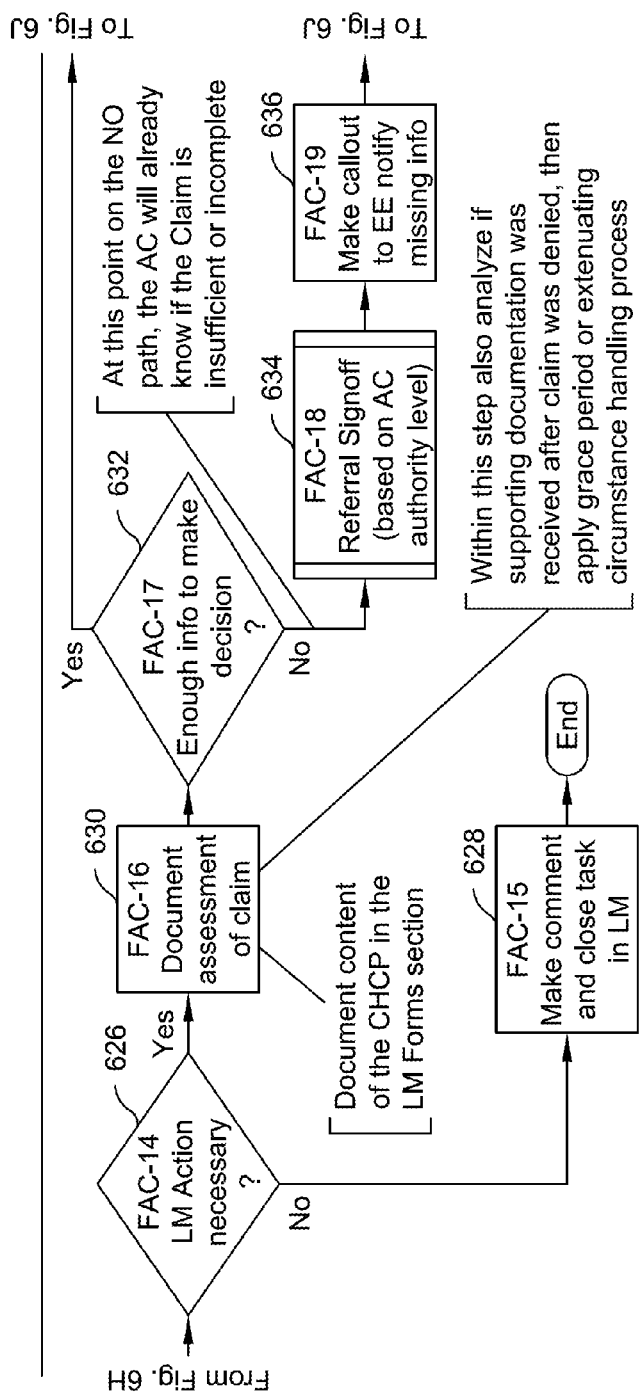

Referring generally to FIGS. 6A through 6L, a process flow of an adjudication process is shown. The row designations at the left hand side of FIG. 6A apply to FIGS. 6B-6F. The row designations at the left hand side of FIG. 6G apply to FIGS. 6H-6L. Referring to FIG. 6A, a rule may be flagged 602 in the DCS/SOURCE system indicating a claim has been started. The DCS/SOURCE system may forward 604 data related to the claim to the comprehensive leave management system. In some cases, the process flow may begin with receipt 606 in a physical mail room of hardcopy or fax documentation for a claim that is already present in the system and is awaiting documentation. A user at the mail room may access the system, which identifies the claim and determines 608 an individual, who may be termed an "absence coordinator," assigned to adjudicate. In either case, referring to FIG. 6B, the system assigns 610 a task to an appropriate individual. The mail room user may send 612 the documentation 614 to the assigned individual. Referring to FIG. 6H, the system provides 616 a work queue to a user, who selects the case from the work queue, responsive to which the system presents 618 claim data to the user for review 620 by the user, who may have access to manuals and other information. The user may also have received and associated with an appropriate physical and/or electronic file 622 the papers received via the mailroom. If the documentation has been scanned or otherwise rendered into electronic form, the system may present the documentation for review 624 by the user. Referring to FIG. 6I, the system may apply a suitable set of rules to the documentation and information and determine 626 whether leave management action is required. No action may be required if, for example, the data indicates that an employee or an employee's physician have failed to respond to requests for required information after a certain time period, and/or after a certain number of requests. The rules may provide for optional or mandatory extensions of time or prompt the user to identify extenuating circumstances if documentation has not yet been received or was received after a predetermined time period had expired. If no action is needed, the system may record in association with a claim a comment indicating why no action is needed 628 and close the claim. Alternatively, the user may provide a comment via a user-accessible device, which comment is then stored by the system and associated by the system with the claim.

Figure 6J:
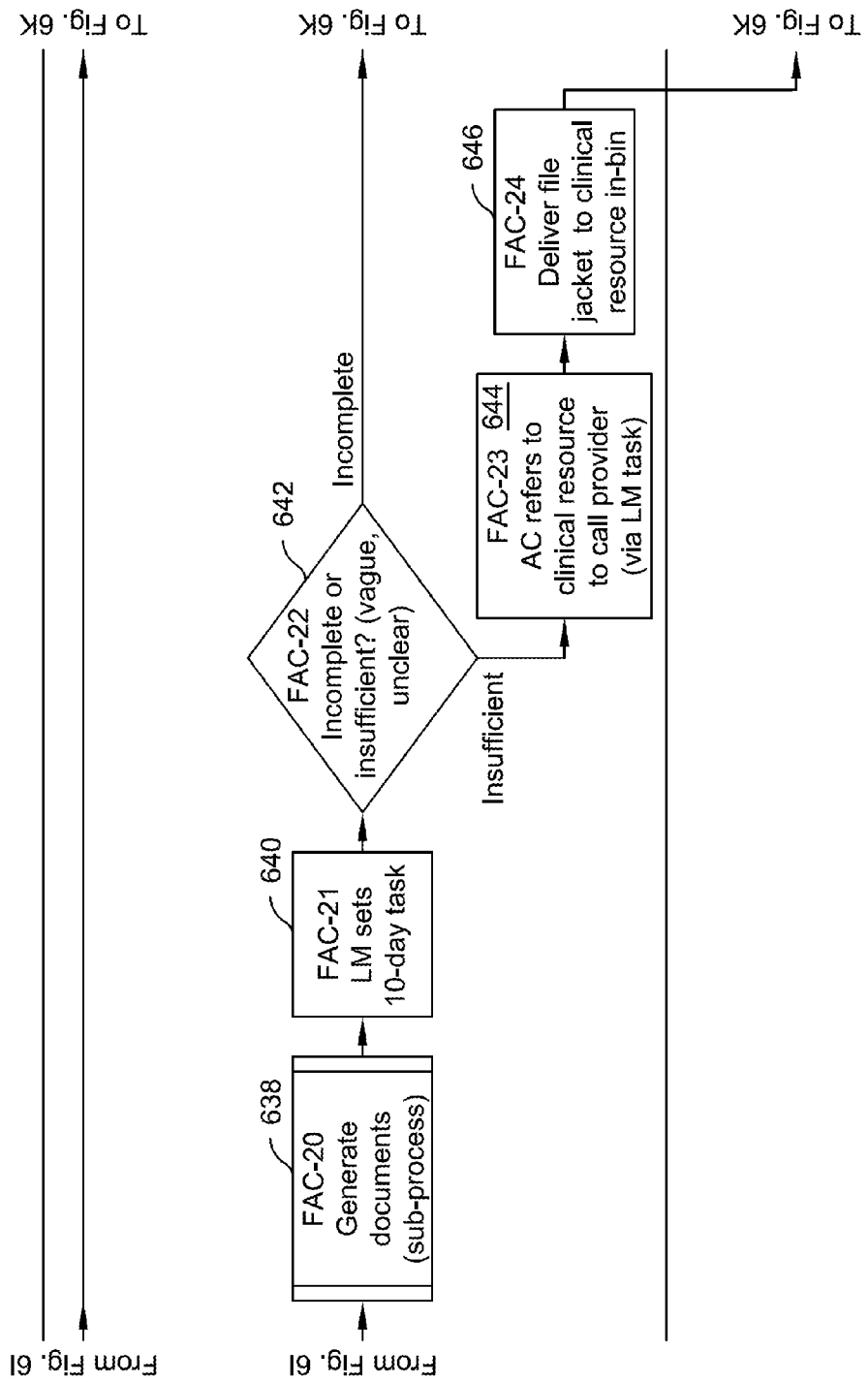
Figure 6K:
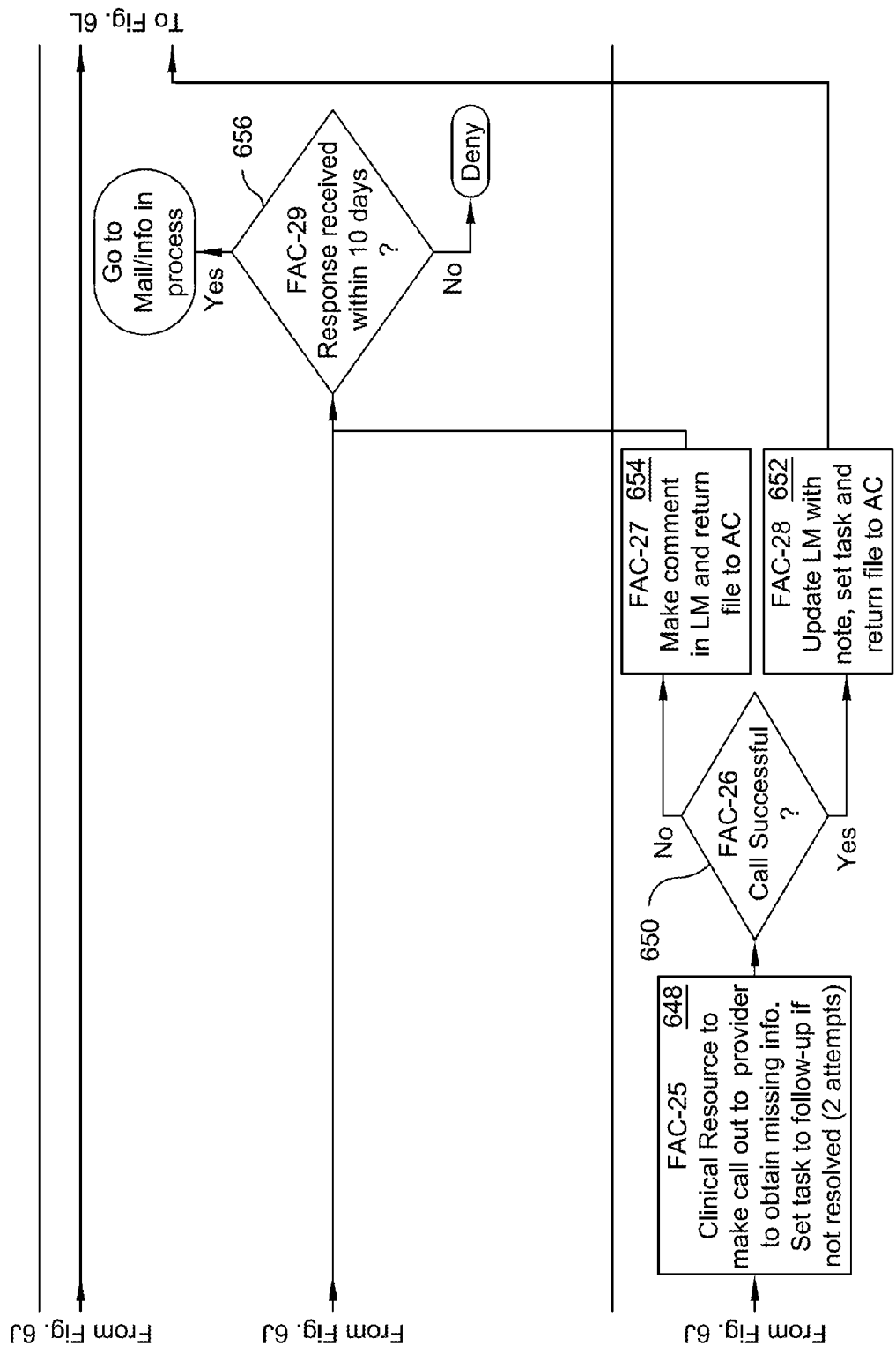

If leave management action is determined by the system applying the rules to be needed, the system may prompt the user to document 630 the user's assessment of whether the claim includes sufficient information for a decision and, if so, the nature of the decision. Responsive to a determination or receipt of data indicative that the claim does not include 632 sufficient information for a decision, the system may determine 634 whether referral to another person or signoff by another person is required, and send a request for the signoff or approval if required. The system then either contacts 636 the employer or prompts the user to contact the employer. Referring to FIG. 6J, the system then generates 638 appropriate documents from templates. The documents may include letters to the employer or employee specifying the required information and a time limit for response. The system generates 640 a time limit, such as 10 days, for further information to be provided. The system then determines 642, or receives from a user in response to a prompt, whether the information is incomplete, i.e., one or more required items is missing, or whether the information is insufficient, i.e., a response has been provided for each required data item or field, but at least one of those responses is vague, unclear or not fully responsive. If the information is insufficient, then, the system may prompt 644 a clinical resource, such as a nurse, or prompt the user to contact the clinical resource, to obtain clear information. The system may set a task associated with the clinical resource. The system may deliver 646 the file information to the clinical resource, or may prompt the user to do so. Referring to FIG. 6K, the system may prompt 648 the clinical resource to make a certain number of follow up contacts, such as by phone, e-mail or other technique. If the call or other contact by the clinical resource is successful 650, by obtaining sufficient information to respond to all required questions or data items, then, referring to FIG. 6K, the system is updated 652 with information input by the clinical resource, and a task is set for the file to be returned to a user, such as an absence coordinator, to make a decision. If the call or other contact by the clinical resource is not successful, by failing to obtain sufficient information, then the system similarly returns the file to an absence coordinator and sets a task 654 for the absence coordinator to request information in writing. If information is missing, rather than involve a clinical resource, the system similarly tasks the absence coordinator to request information in writing. If the requested information is not received 656 within a required time period, such as 10 days, then the process flow proceeds to a denial of the claim. If the information is received, then the mail/information in process flow may be performed by the system.

Figure 6L:
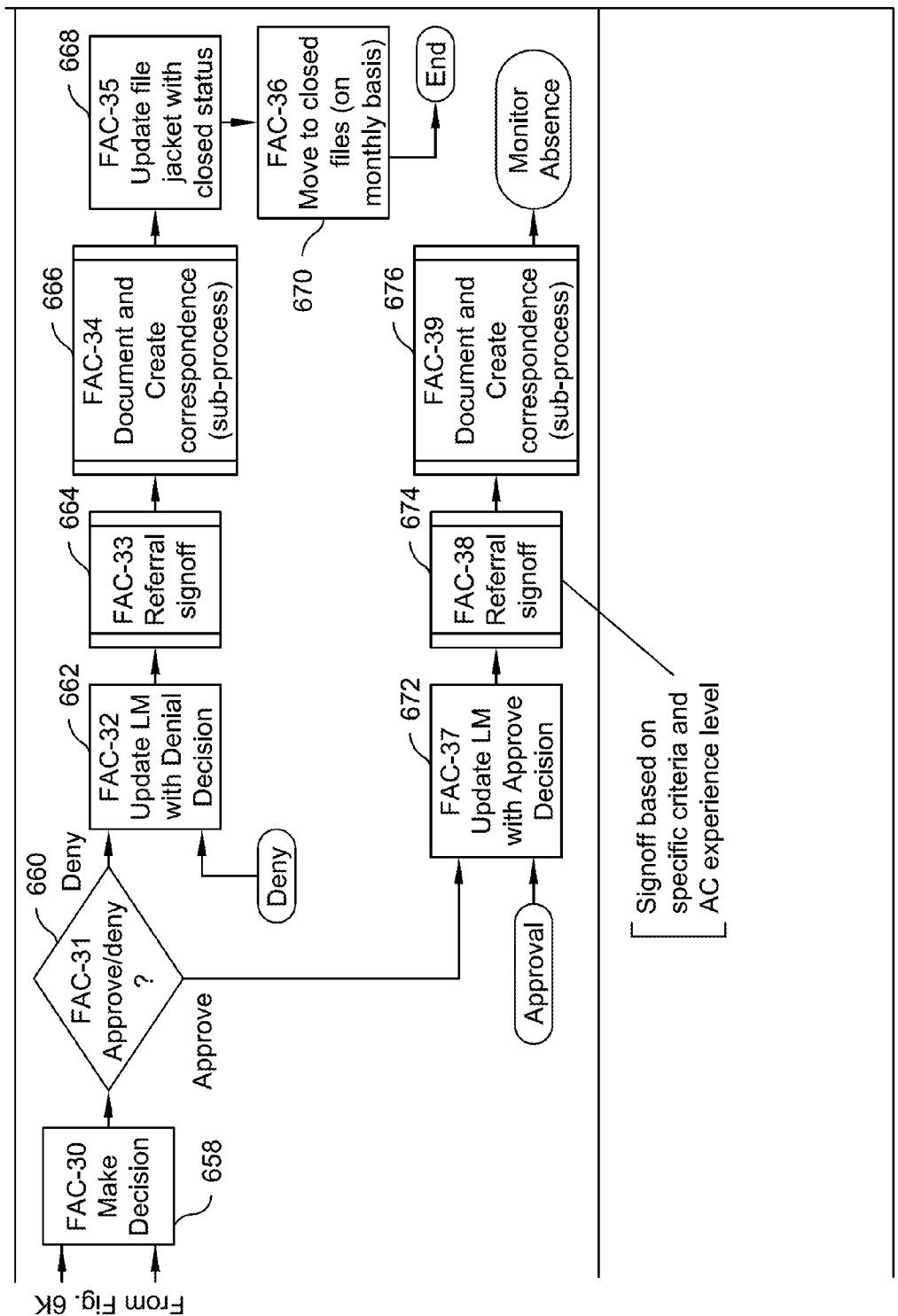

The approval/denial decision, based on additional information received as a result of the contact by the clinical resource, may be performed, referring to FIG. 6L, by an absence coordinator or determined 658 by the system. Responsive to a denial decision 660, the system is updated with data indicative of a denial decision 662, and the system prompts 664 any required user for referral or signoff. Responsive to receipt of data indicative of any required approval or signoff, the system generates 666 correspondence indicative of denial. The system may prompt 668 the user to mark physical files as closed, and prompt 670 the user to move physical files to a closed file location.

Responsive to an approval decision, the system is updated 672 to reflect approval; the system generates 674 prompts to any individuals whose approval or signoff is required. The system, responsive to receipt of required approval or signoff, generates 676 suitable correspondence. The process flow will then proceed to the monitor absence process flow.

Referring generally to FIGS. 7A through 7F, an exemplary process flow of a monitor absence process is shown. The row designations at the left hand side of FIG. 7A apply to FIG. 7B-7C. The row designations at the left hand side of FIG. 7D apply to FIG. 7E-7F. Two separate process flows are employed, based on whether the absence is continuous, such as for a short term disability that requires complete absence from work for a period of time, or intermittent, such as for a short term disability that permits a partial return to work for a period of time. For the intermittent absence, a group with definitions as to end date, preconditions, such as medical symptoms, and other conditions, may be specified, and each report or request may be evaluated according to the group definitions. For continuous absences, the process flow proceeds with exhaustion of the benefit period, a return to work, or an extension of the continuous period.

Figure 7A:
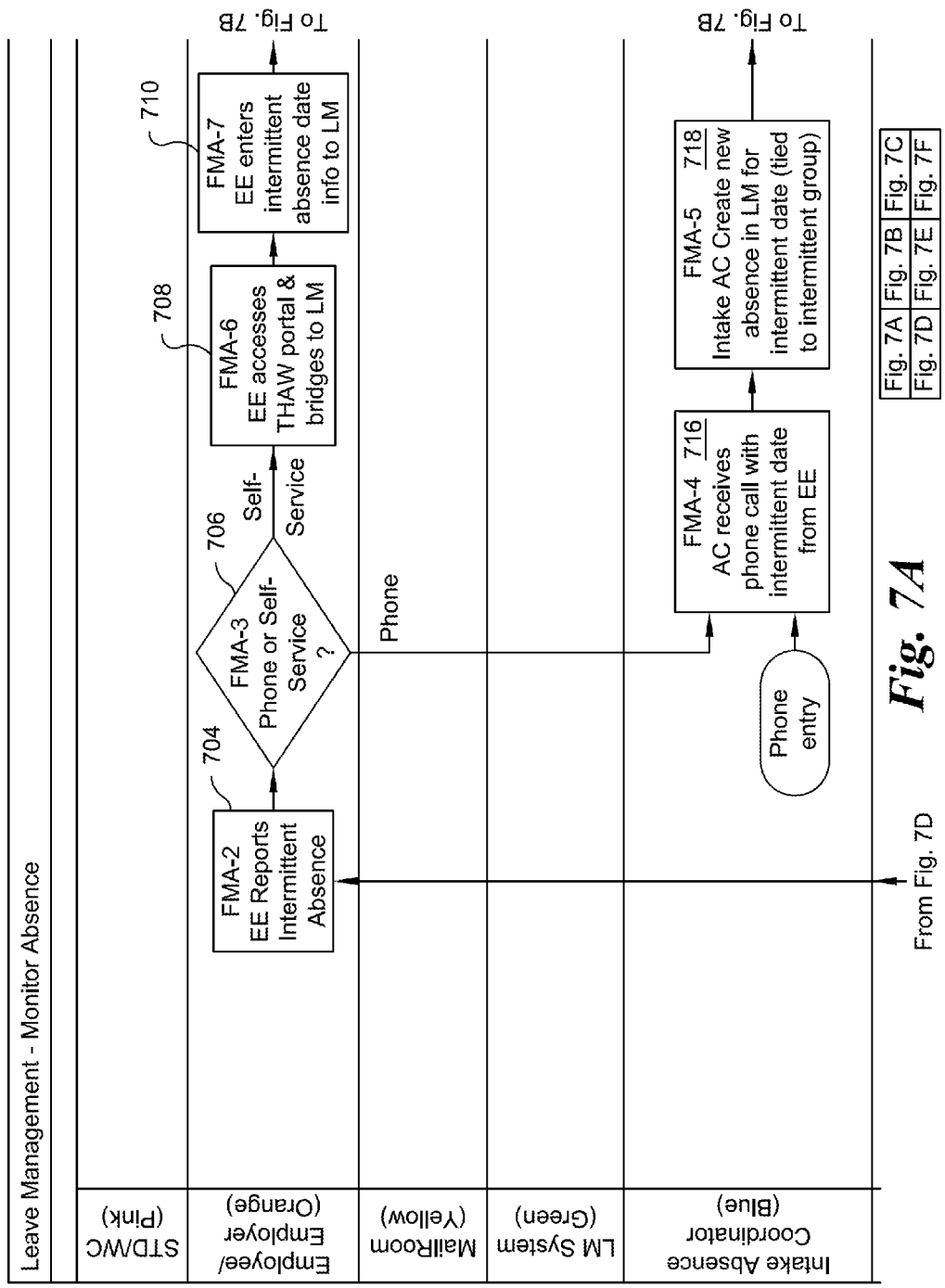
Figure 7B:
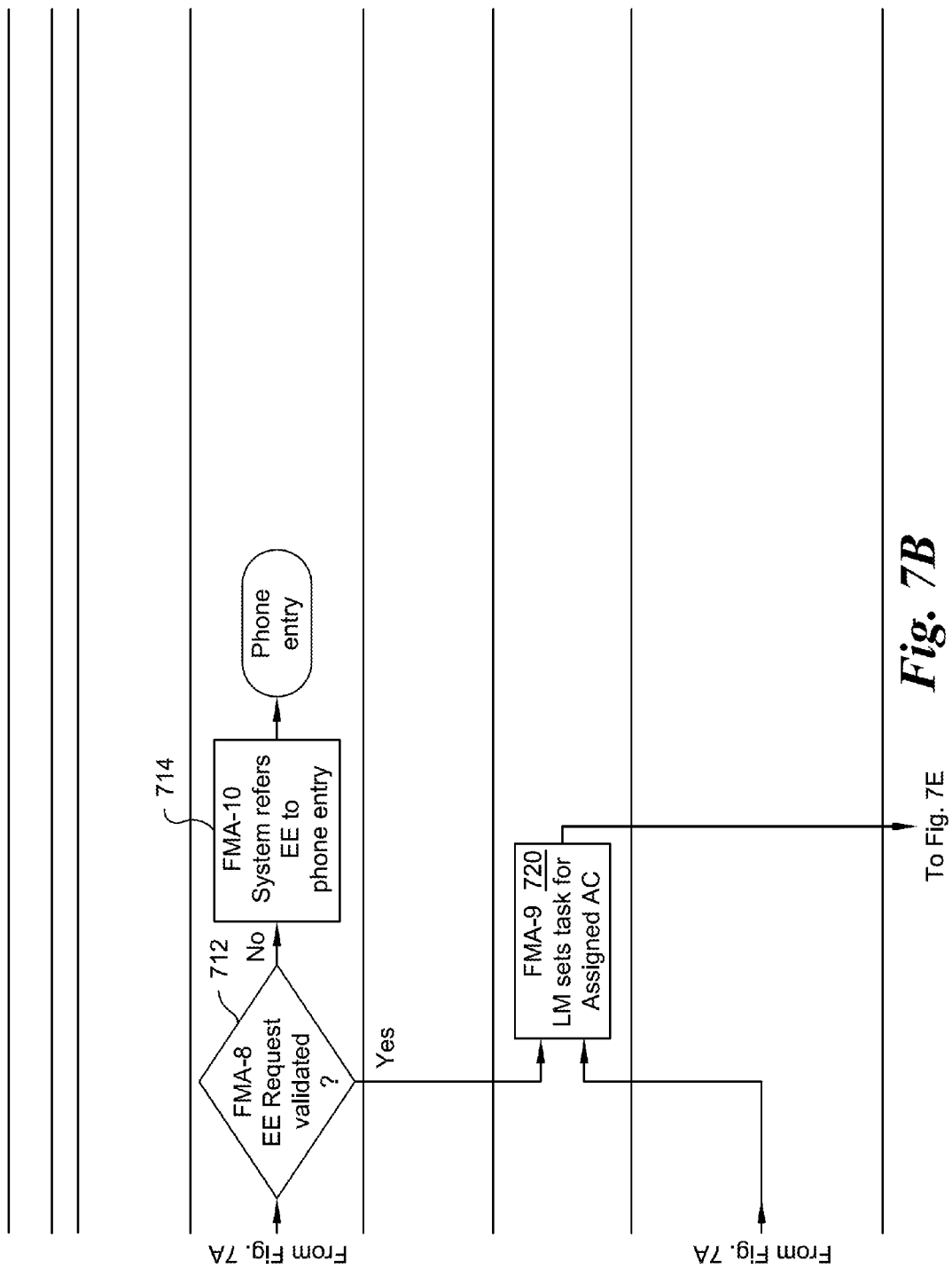
Figure 7C:
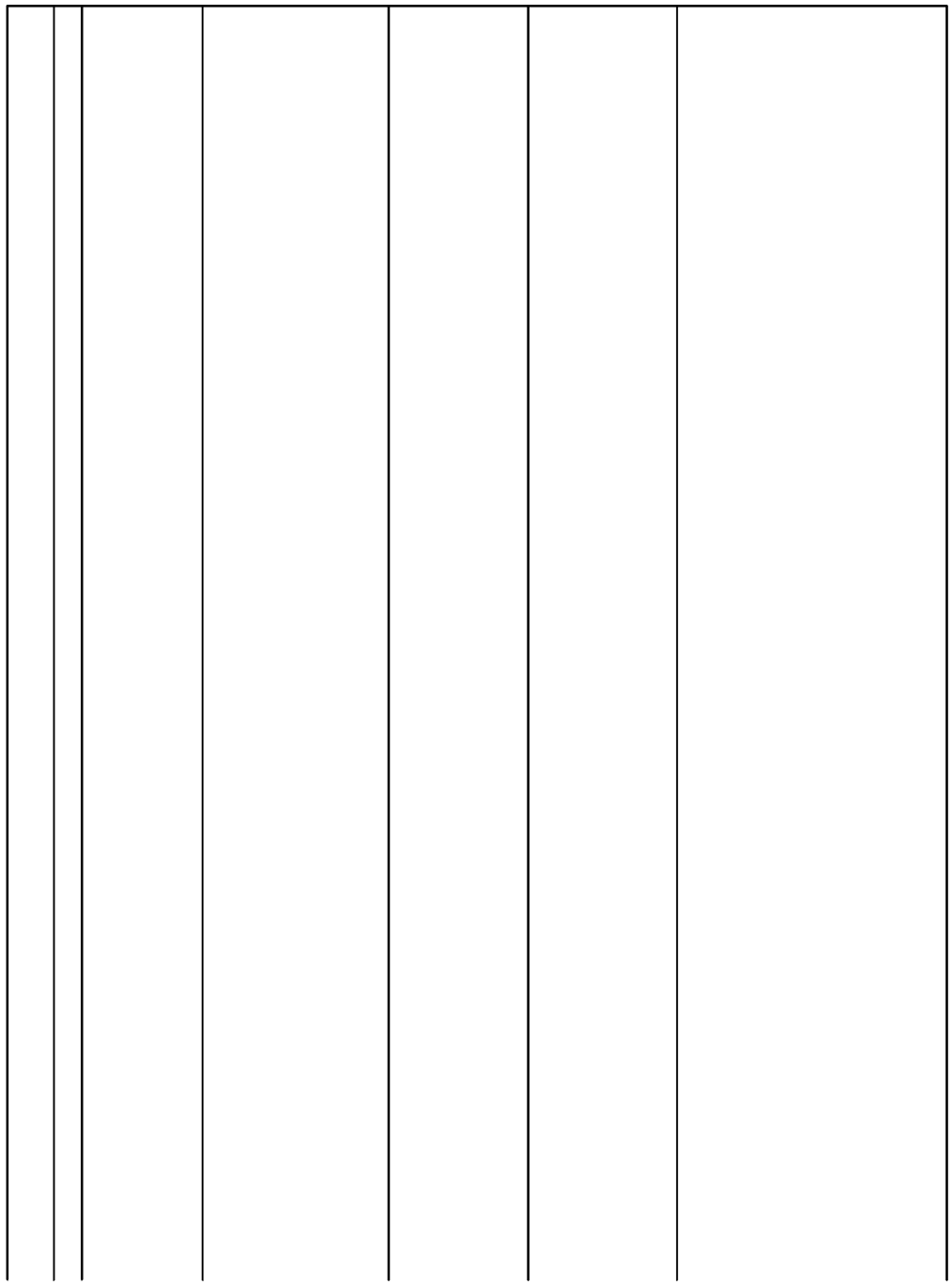

If the condition is intermittent 702, then the employee may, referring to FIG. 7A, report 704 the intermittent absence via phone or self-service 706 from a user-accessible device. If self-service 706, the employee is connected 708 to the leave management system, prompted to provide intermittent absence date information, and the date information is received 710. Referring to FIG. 7B, if the request is not validated 712 by the system, then the system displays a screen to prompt 714 the user to provide the information by phone. If phone, referring to FIG. 7A, the absence coordinator receives 716 a phone call from the employee, and the system receives 718 input to create a new absence for the intermittent date. The absence is tied to an intermittent group, such as to other absences having the same underlying cause. For example, as a result of a medical condition, a group of absences of not more than 6, each not more than one week in duration, over a time period of six months, may have been approved for an employee. Referring to FIG. 7B, the system then sets 720 a task for the absence coordinator to investigate and approve or deny. The task is part of a work queue, and, referring to FIG. 7E, is selected 722 by the absence coordinator. The request is reviewed 724 by the absence coordinator or by the system for timeliness and consistency with existing intermittent leave group approval. Responsive to determining, referring to FIG. 7F, that the request is not timely 726, the request is denied. Suitable correspondence may then be generated. Responsive to determining that the request is timely, the request is evaluated to determine if it is medically supported. By way of example, the employee may be required to provide documentation of self-reported, physician reported or other medical professional reported condition, symptoms, rehabilitation or other treatment, or other information, for the system or an absence coordinator to determine that the leave is medically supported. If the request is not medically supported, the process may move to the extension process flow shown in FIG. 7E. If the request is determined to be medically supported, then the process flow moves to the approval process flow.

Figure 7D:
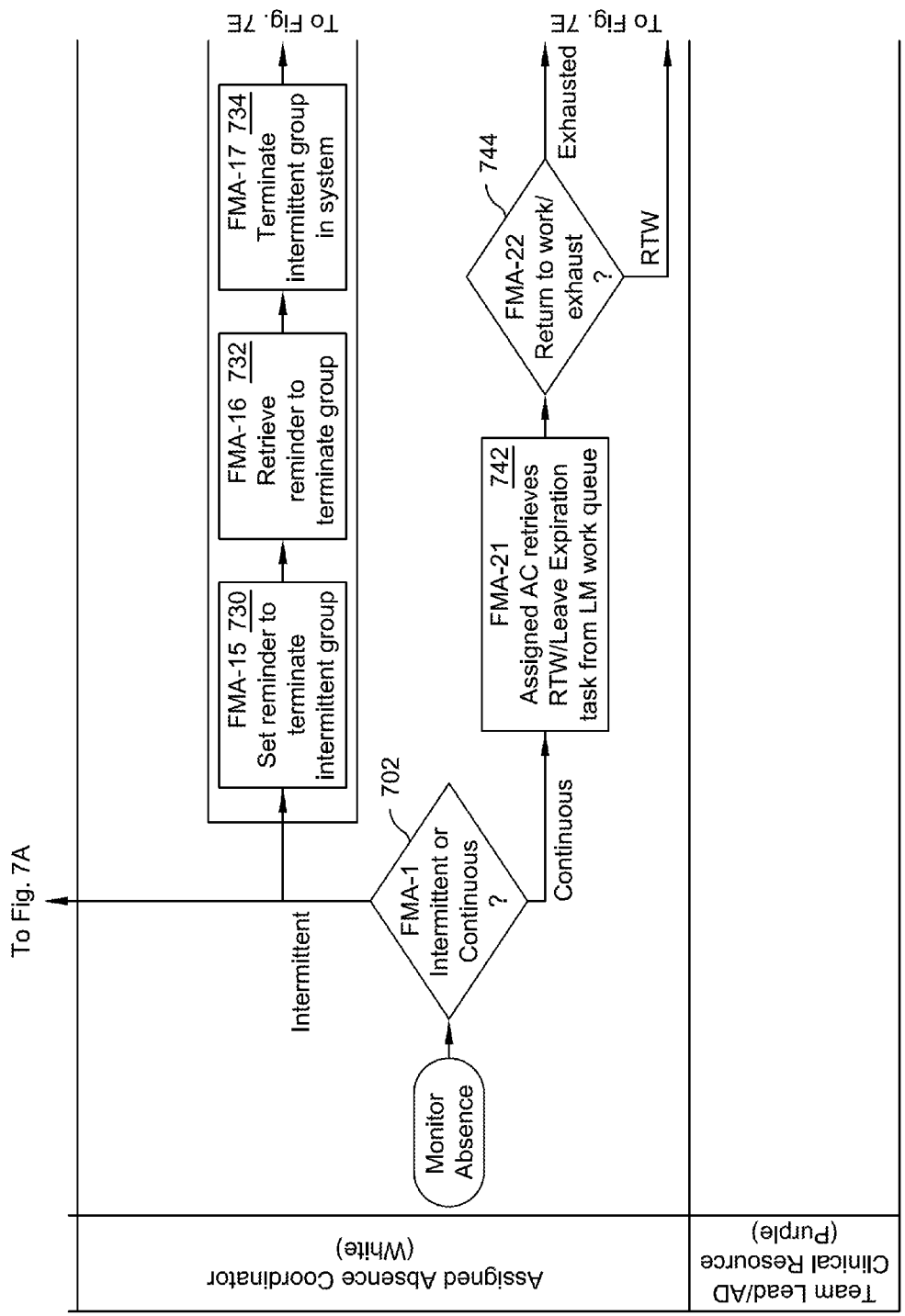
Figure 7F:
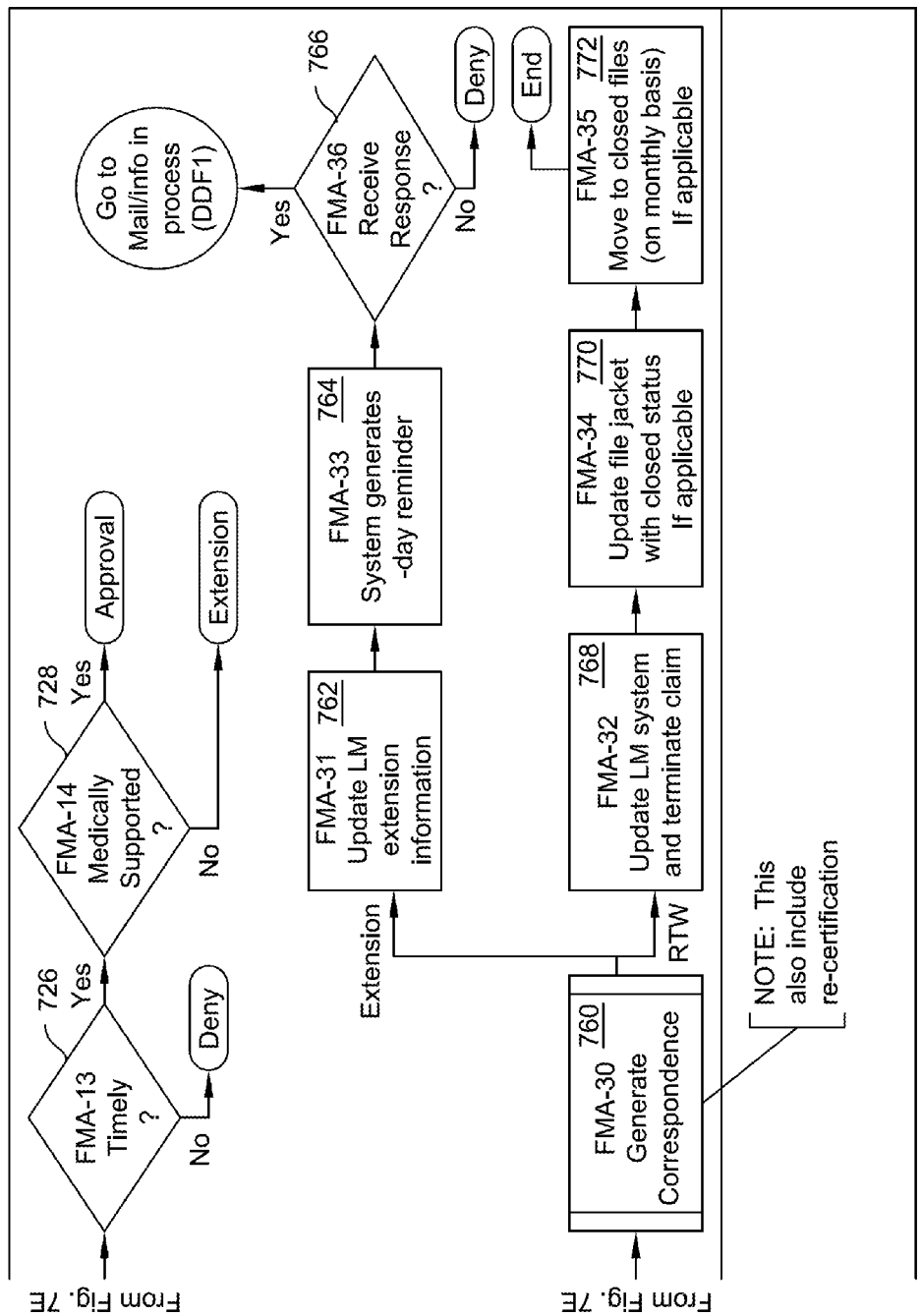

The intermittent absence process flow may also include, referring to FIG. 7D, a process including the steps of setting 730 a reminder to terminate an intermittent group after a certain period of time, retrieving 732 by the system the reminder to terminate after a time period, if the time period has expired, terminating 734 the intermittent group, referring to FIG. 7E, generating 736 a close out reminder to appropriate individuals, updating 738 the file to closed status and generating a prompt 740 to move the closed physical file to a physical file location for closed files. Thus, if a group of absences approved for not more than six months after a date of injury is approved, the group may be closed out after the six month period has elapsed, independent of whether the individual absences have been requested or approved.

The continuous absence process flow may include, referring to FIG. 7D, prompting by the system of the assigned absence coordinator to retrieve 742 a return to work/leave expiration task from a system work queue. If leave is exhausted 744 but no return to work assistance is indicated, referring to FIG. 7E, then the system terminates 746 the claim, prompts (referring to FIG. 7B) the user 748 to mark the file jacket as closed and to move 750 the closed file to a closed file location.

Referring again to FIG. 7E, if return to work is appropriate, then the absence coordinator is prompted 752 to contact, such as by a phone call, the employee to determine if the employee has returned to work. If the system receives data indicative that the employee cannot be reached 754, then the system treats the matter as a requested extension. If the employee is reached, then the system prompts the user to indicate whether 756 the employee is returning to work or receiving an extension. The system checks for an prompts for any required approvals or signoffs 758. Responsive to receipt of signoffs or approval, the system generates required correspondence. If an extension is requested, referring to FIG. 7F, the system receives updated extension information 762, the system generates 764 a reminder after the extension period is expired, and, if a response is received 766, then the mail/info process is initiated, and otherwise the extension is recorded as denied and the process is terminated.

If a return to work process is indicated, then the system is appropriately updated and the claim terminated 768; the user is prompted to update the file jacket 770, and to move 772 the file to a closed file location.

It will be appreciated that other steps, including coordination with services such as medical rehabilitation services for absence due to injury, or employee assistance programs for absence under family medical leave, may be included in the monitor absence process flow.

Figure 8A:
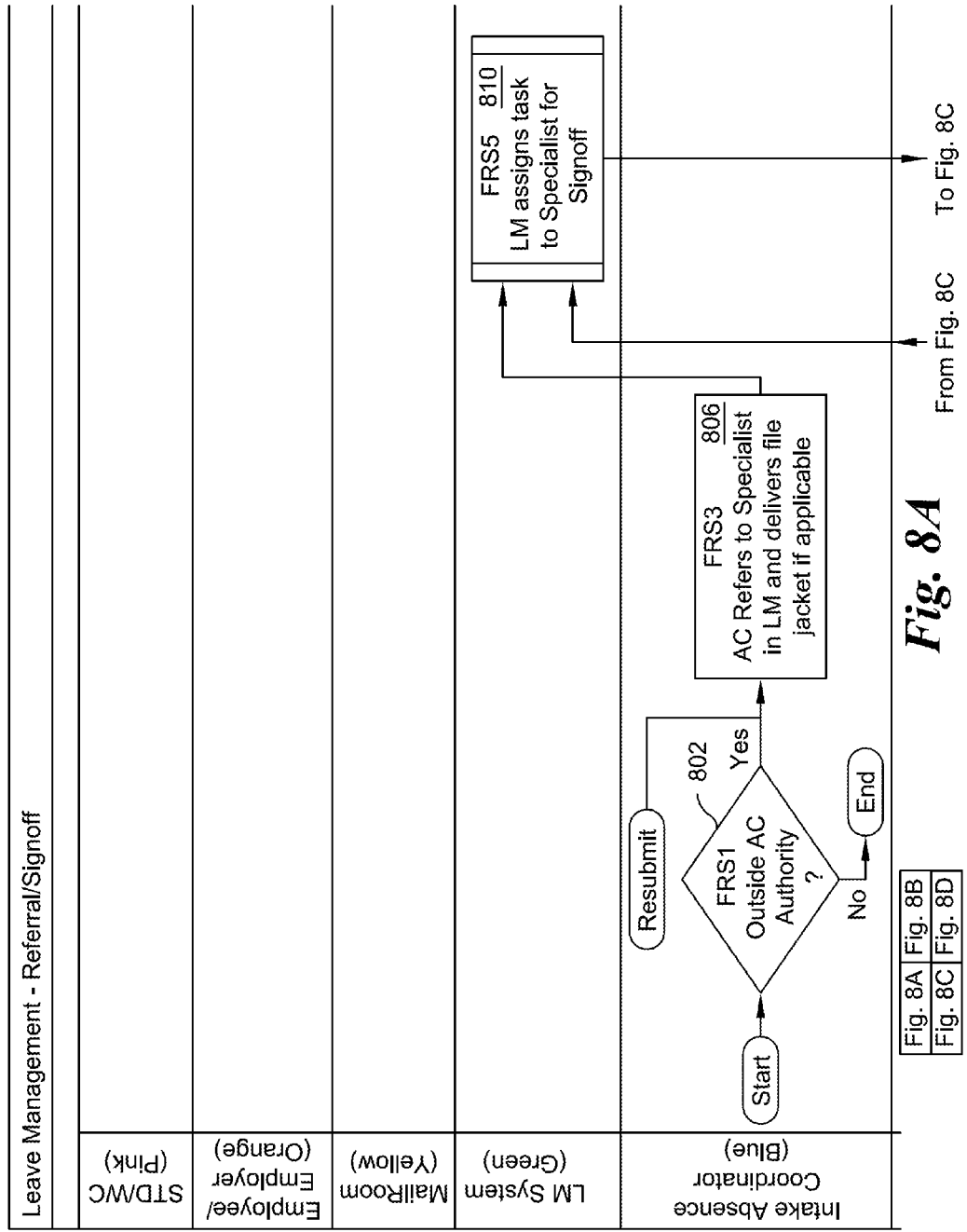
FIGS. 8A-8D show an exemplary process flow diagram of a method in an embodiment of the invention.
Figure 8B:
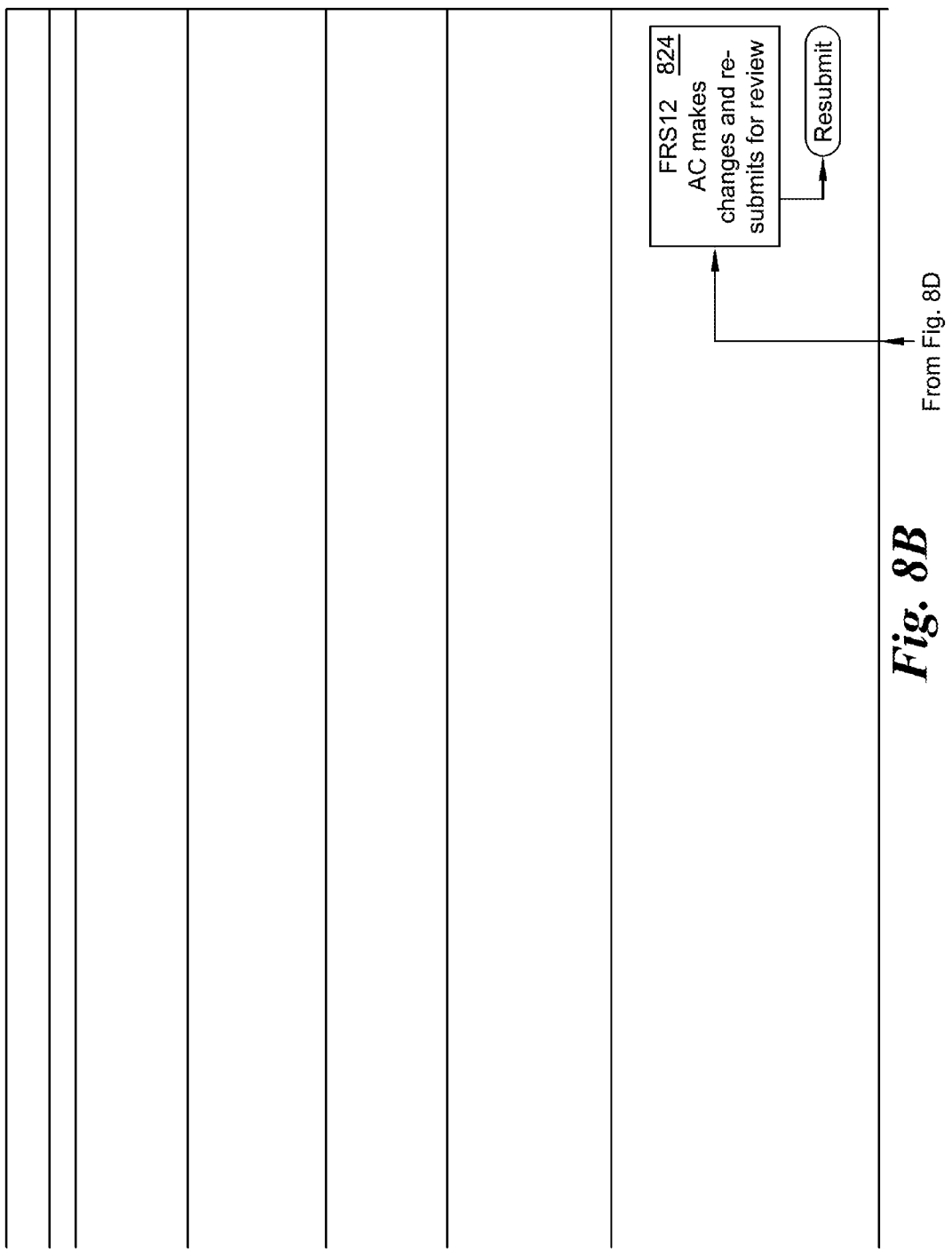
Figure 8C:
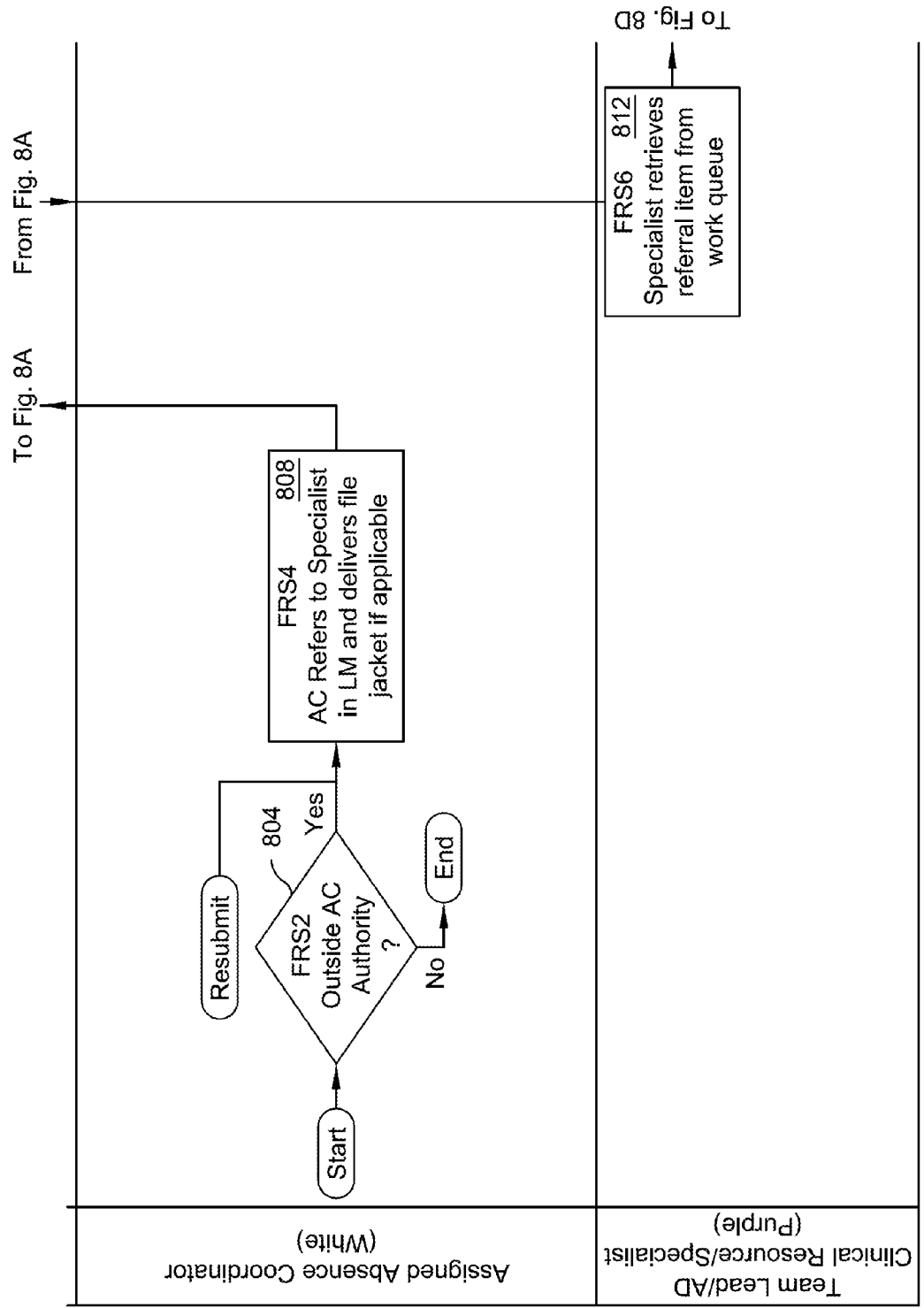
Figure 8D:
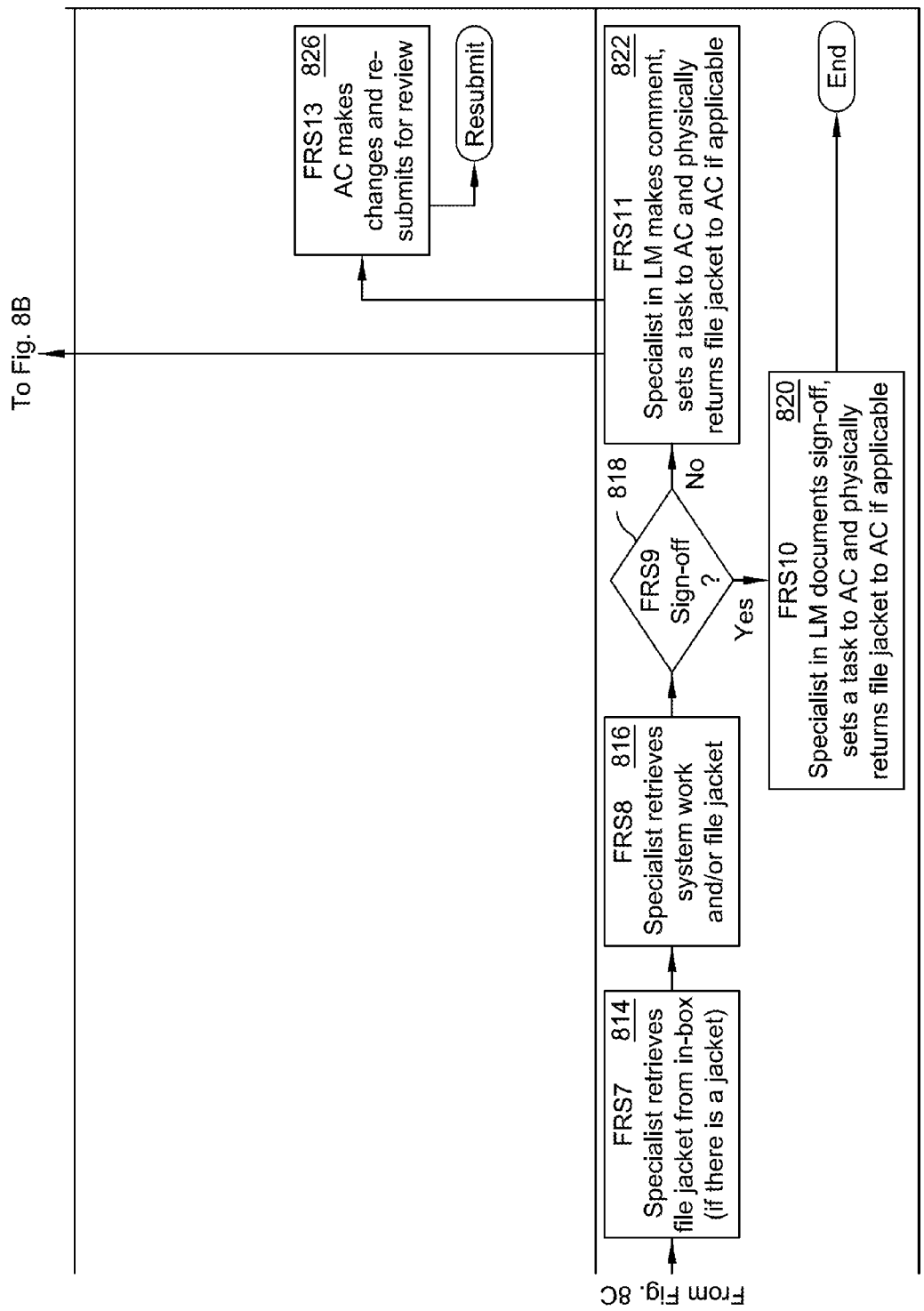

Referring to FIGS. 8A to 8D, an exemplary process flow for obtaining referral and signoff approvals is shown. The row designations at the left hand side of FIG. 8A apply to FIG. 8B. The row designations at the left hand side of FIG. 8C apply to FIG. 8D. In general, if the system has a flag or other data indicating sign off or referral approval is required 802, 804, for given activity, the absence coordinator refers the file to an individual specialist, and deliver the relevant file jacket 806, 808. The system can assign a review and approval task 810 to a specialist, and the system adds the task to the work queue of the specialist. Referring to FIG. 8C, the task is retrieved 812 from the work queue by the specialist; referring to FIG. 8D, the file is retrieved 814 by the specialist. The specialist reviews 816 the system information or physical jacket. If the specialist approves 818, the system may document the approval 820, set a task for the absence coordinator and return the physical file jacket. If there is no sign off, then the specialist may provide 822 a comment in the system, and similarly set a task for the absence coordinator, return the file jacket, and the absence coordinator then makes any needed changes 824, 826 and resubmits the case for review.

Figure 9A:
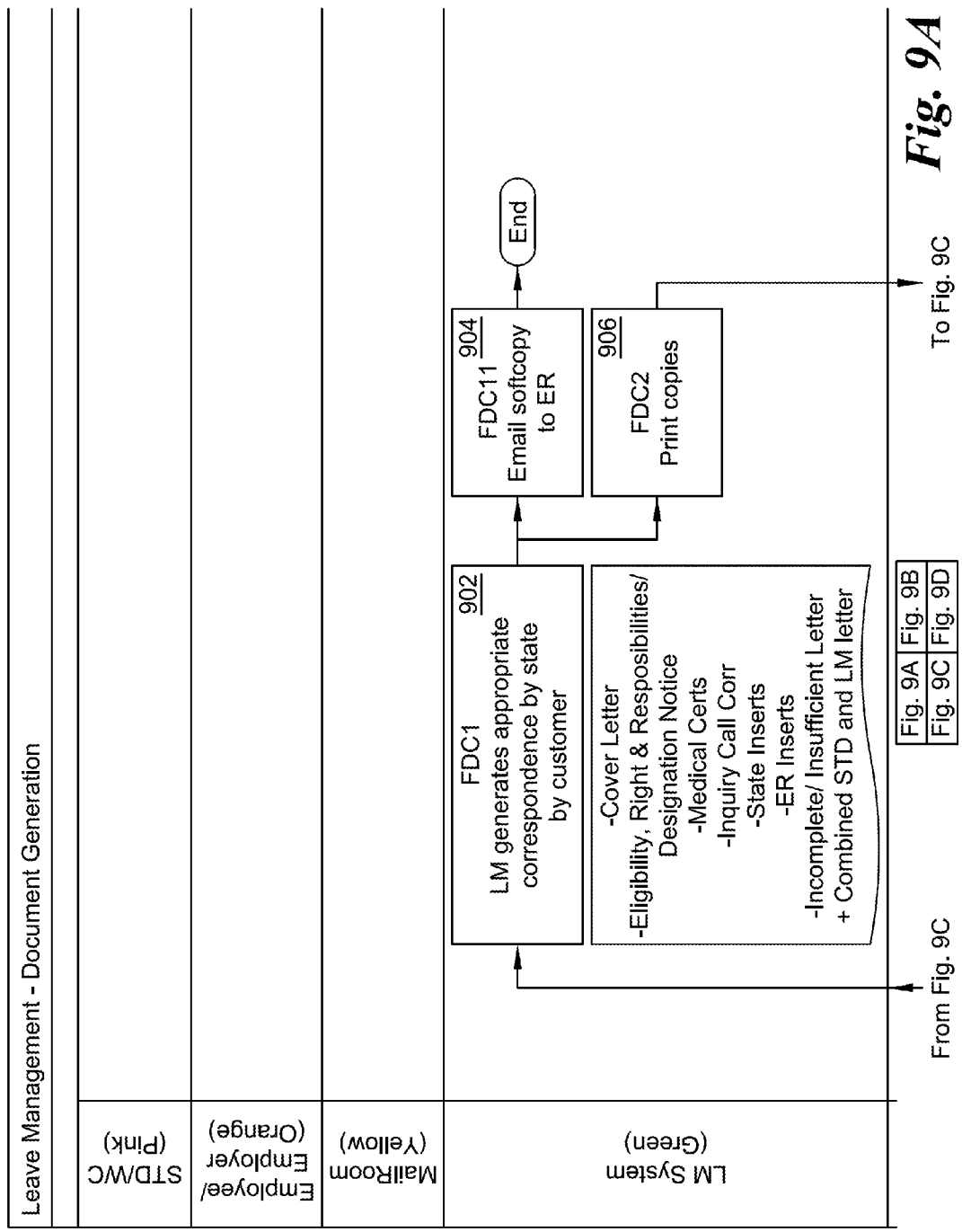
Figure 9C:
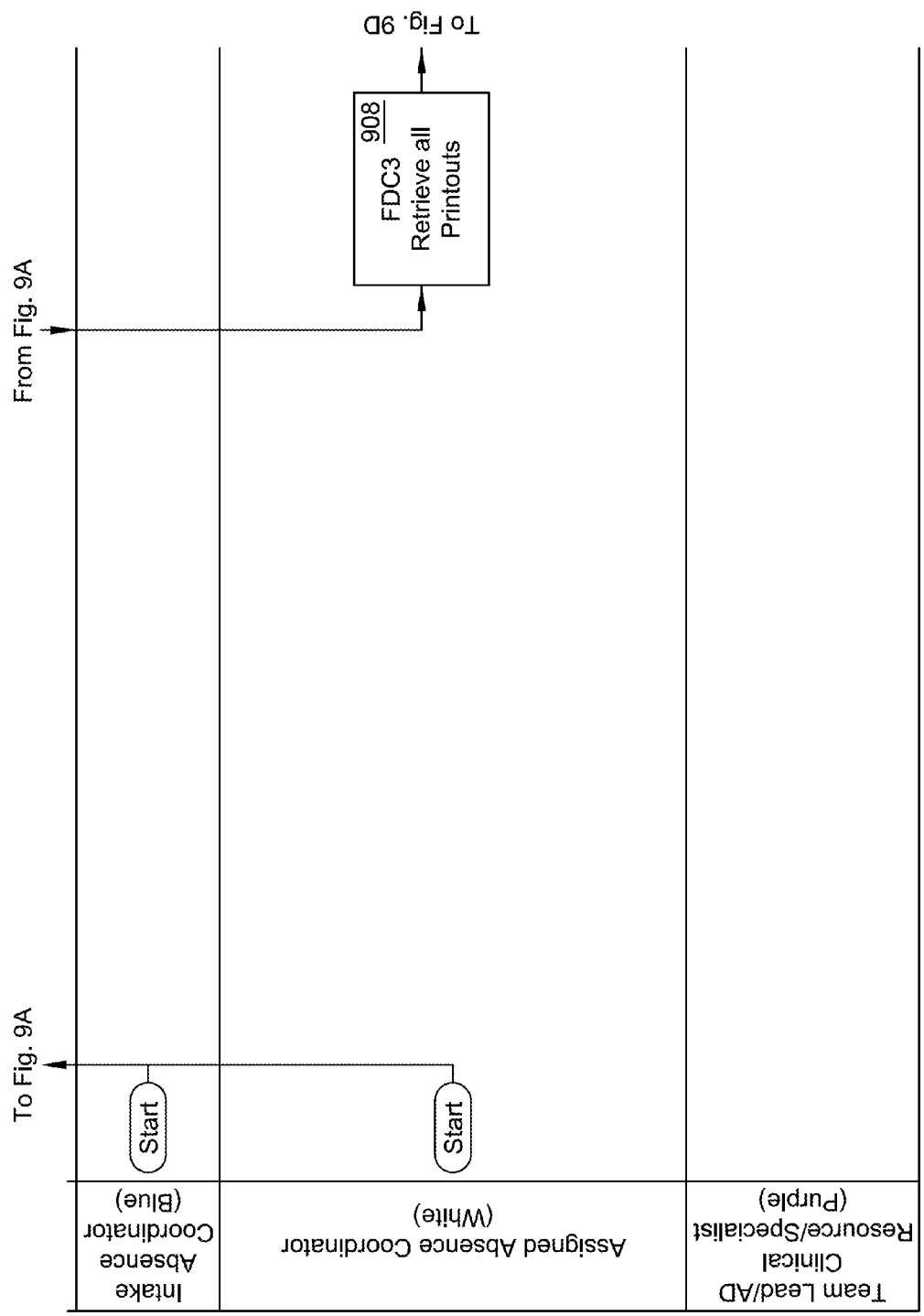
Figure 9D:
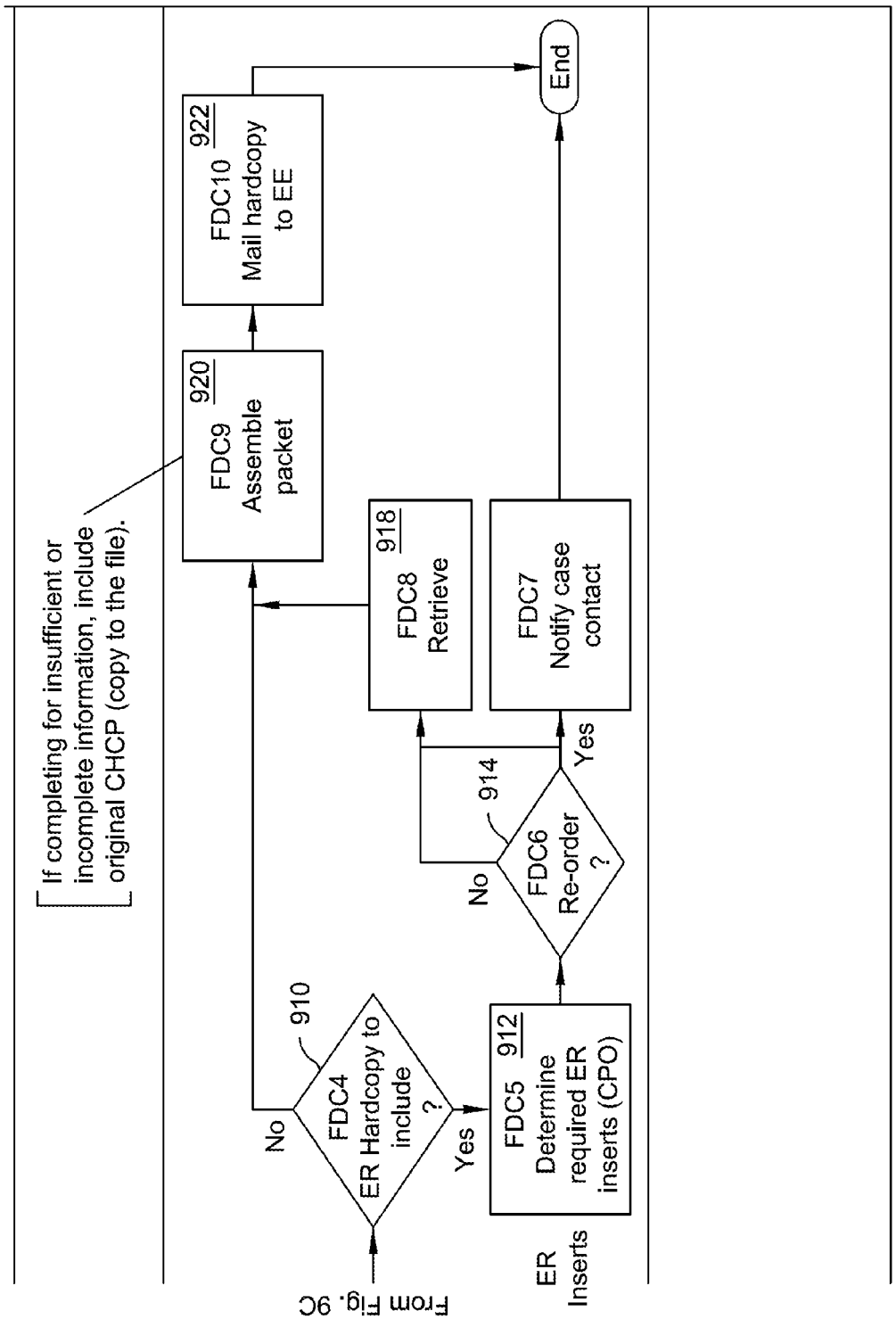

Referring to FIGS. 9A to 9D, an exemplary process flow for generation of electronic and paper documents is shown. The row designations at the left hand side of FIG. 9A apply to FIG. 9B. The row designations at the left hand side of FIG. 9C apply to FIG. 9D. The system generates 902 appropriate correspondence. Examples of information and types of letters that may be generated include a cover letter; letter indicating denial or approval of eligibility; rights and responsibilities/designation notice required by applicable law or regulation; medical certification related correspondence; correspondence responsive to an inquiry call; inserts with text required to be communicated to the employee under applicable law, regulation or employer policy; and letter providing notice that a claim is incomplete or insufficient. The correspondence may be e-mailed 904 or printed 906. Referring to FIG. 9C, if the correspondence is printed, the absence coordinator retrieves the printouts 908. Referring to FIG. 9D, if the employer is to receive hardcopy 910, then the system may provide 912 the required employer inserts. The system prompts for an indication to reorder 914 inserts, to prompt the absence coordinator to check the supply of inserts. If reorder is needed, a case contact is notified 916. If no reorder is needed, the inserts are retrieved 918. The packet is assembled 920 and mailed in hard copy to the employee 922.

Figure 10D:
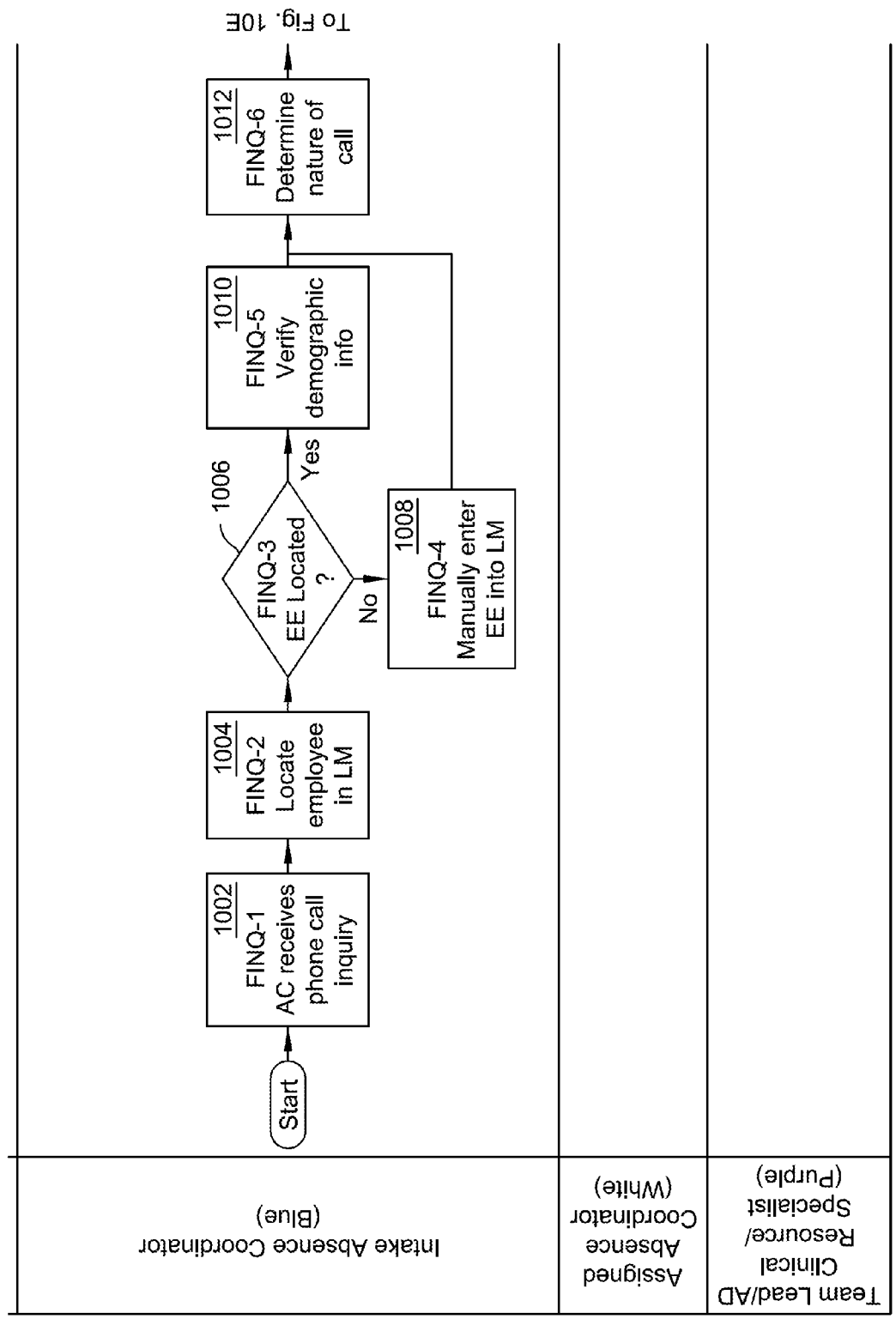
Figure 10E:
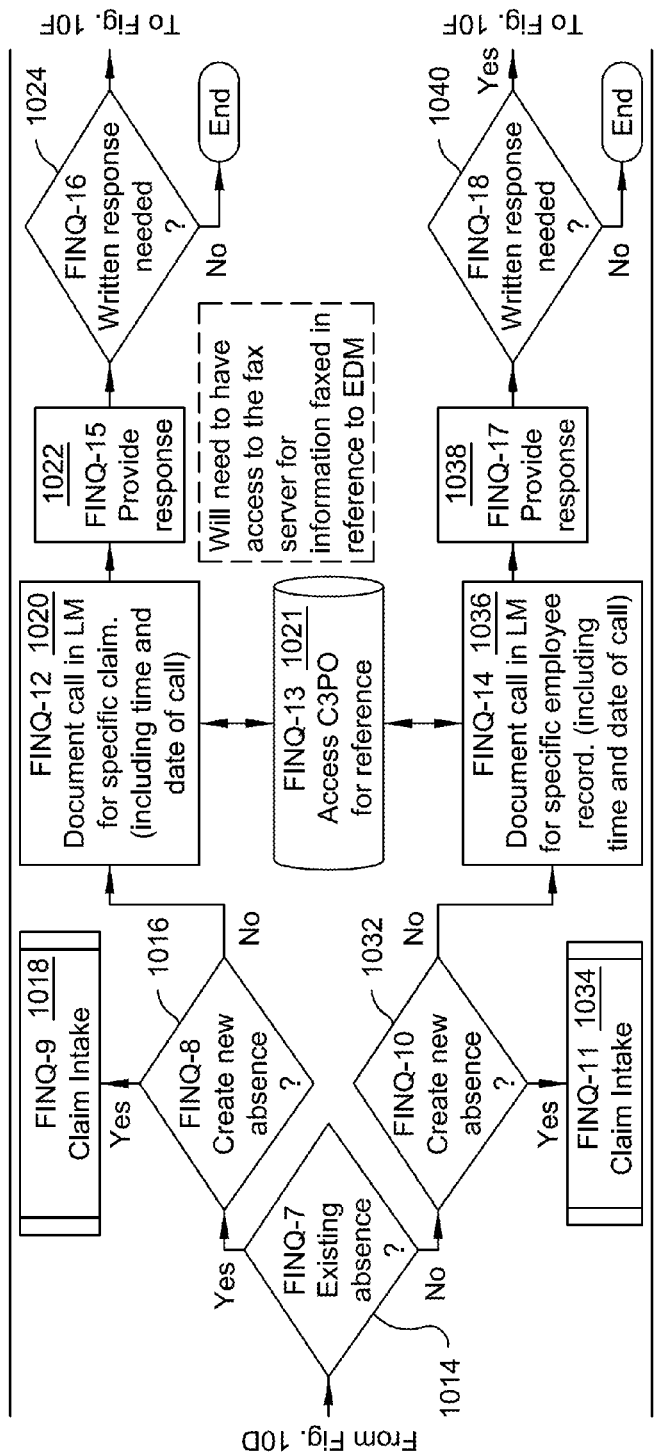

Referring to FIGS. 10A to 10F, an exemplary process flow for response to an inquiry from an employee or employer is shown. The row designations at the left hand side of FIG. 10A apply to FIG. 10B-10C. The row designations at the left hand side of FIG. 10D apply to FIG. 10E-10F. Referring to FIG. 10D, an absence coordinator receives 1002 a call and searches in the leave management computer system for the employee 1004. If the employee is not located by the system in response to the search query 1006, the absence coordinator inputs 1008 the employee information into the system; otherwise, the employee's demographic information is verified 1010 and updated if needed. The absence coordinator may determine 1012 the nature of the call, i.e., referring to FIG. 10E, whether 1014 the call relates to a current absence. If the call does not relate to a current absence, the system may determine, or the absence coordinator may determine, whether a new absence record is to be created 1016. If a new absence is required then the process flow proceeds 1018 to a new claim intake process, as explained above with reference to FIG. 4A. If no new absence is to be created, referring to FIG. 10E, the user is prompted to document the call for a specific claim 1020. Data to be inputted may include time and date of the call and reasons for the call. The system makes a database 1022 available for reference during the call, such as to access data concerning an existing absence. The user or the system determines 1022 a response. If the system determines that a written response 1024 is needed, the system generates, referring to FIG. 10E, correspondence 1026. If rules indicate, referring to FIG. 10F, a packet is to be resent 1028 with requested information, then a reminder is set 1030, with a time period set for response in accordance with rules stored in the system. For example, the inquiry may relate to an existing absence as to which the employee was required to provide information. The process is transferred to the mail/information process.

Figure 10F:
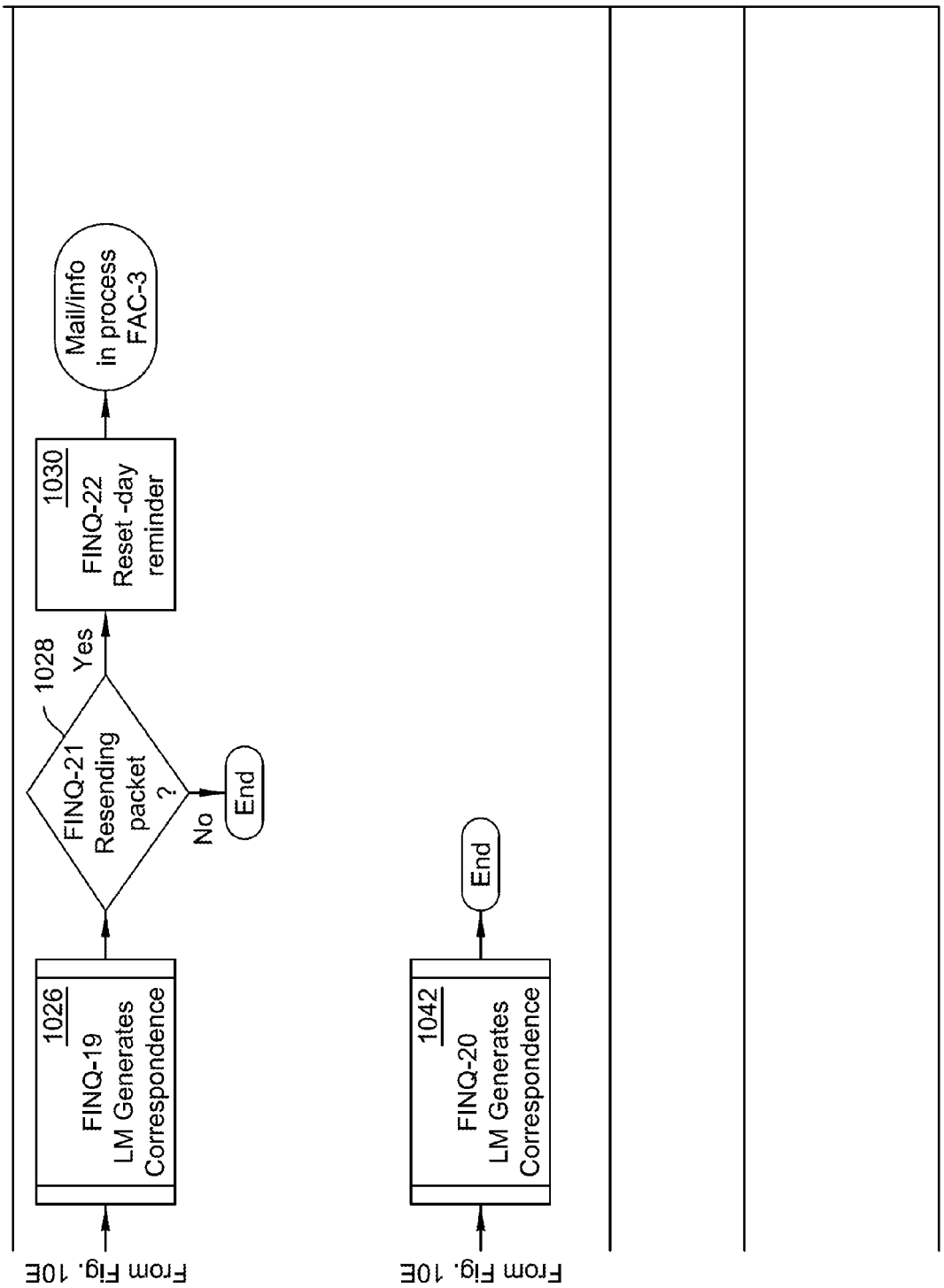

Referring again to FIG. 10E, if the call does not 1014 relate to an existing absence, then the system or the user determine whether a new absence is required 1032. If a new absence is required, the process flow proceeds to the claim intake process 1034, as described above with respect to FIG. 4A. If no new absence is required, the system prompts for documentation of the call to be associated with records for the specific employee 1036. A database 1022 may be accessed for records related to the employee who made the inquiry or to whom the inquiry relates. A response is provided 1038 by the absence coordinator or the system. If rules indicate that a written response is required 1040, the system generates suitable correspondence 1042 (FIG. 10F).

Exemplary reporting capabilities of a leave management system according to an embodiment will now be explained. A system may be configured to determine, for a given employer, analysis of leave experience over a time period, such as one year, a period of months, or a period of years, data including: a frequency of absence under each plan providing for leave, including demographic information regarding users (age, gender, job classification, location, tenure), overlap between plans; changes in absence over time; comparison of absence rates against benchmarks for other businesses in the same industry. The data may also include an average duration of absence, in general and on a per plan basis, with changes in duration over time, comparison of duration benchmarks for other businesses in the same industry, identification of outliers or other drivers of longer durations. The data may also include claim severity and/or plan costs for each plan, including changes in severity over time and compared against expected severity, comparison of severity against industry benchmarks, and identification of outliers and/or drivers of higher claim costs.

Figure 11:
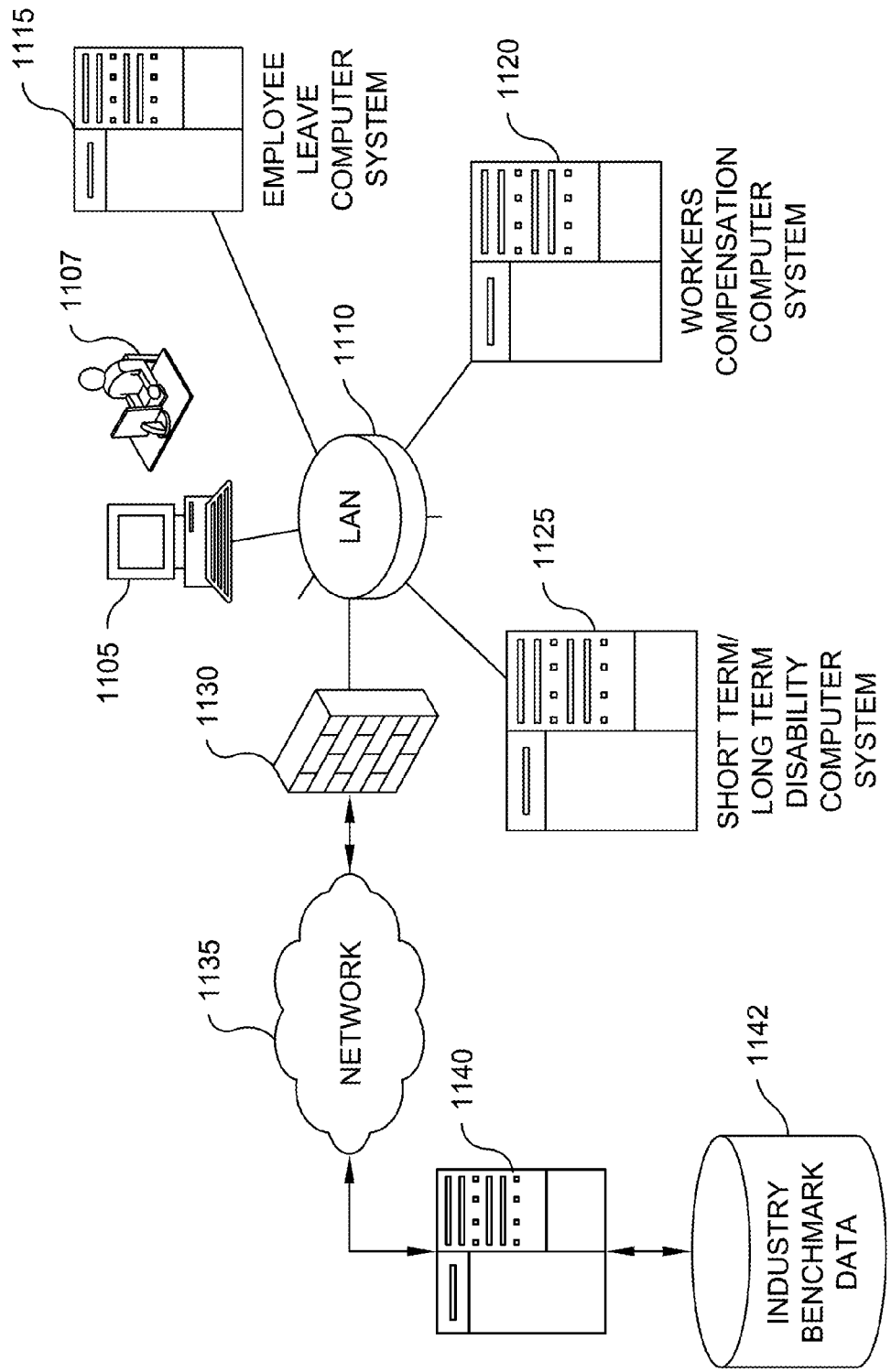
FIG. 11 is a schematic diagram of exemplary network components for a computer system configured for generation of reports

Referring to FIG. 11, in an embodiment, a computer system 1105, such as an insurance company computer system, may be operated by an analyst 1107. Computer system 1105 may include a processor and memory devices having computer-readable media with computer programs having processor executable instructions thereon, which, when executed by a processor, may permit analyst 1107 to input instructions for the processor to access data from other insurance company computer systems, such as employee leave computer system 1115, workers compensation computer system 1120 and short term/long term disability computer system 1125. Employee leave computer system 1115 may be configured to receive, analyze, process and store data relating to leave mandated by applicable law or regulation or employer policies, such as family medical leave, and other policies. Workers compensation computer system 1120 may be configured to receive, analyze, process and store data relating to workers compensation policies of employers insured by the insurance company. Short term/long term disability computer system 1125 may be configured to receive, analyze, process and store data relating to short term disability coverage and long term disability coverage of employers insured by the insurance company.

Computer system 1105 may also be configured to access, via firewall device 1130 and one or more networks, which may include Internet 1135, one or more servers 1140 controlling access to databases storing industry benchmark data 1142. Analyst 1107 may cause computer system 1105 to retrieve data from industry benchmark database 1142.

Figure 12C:
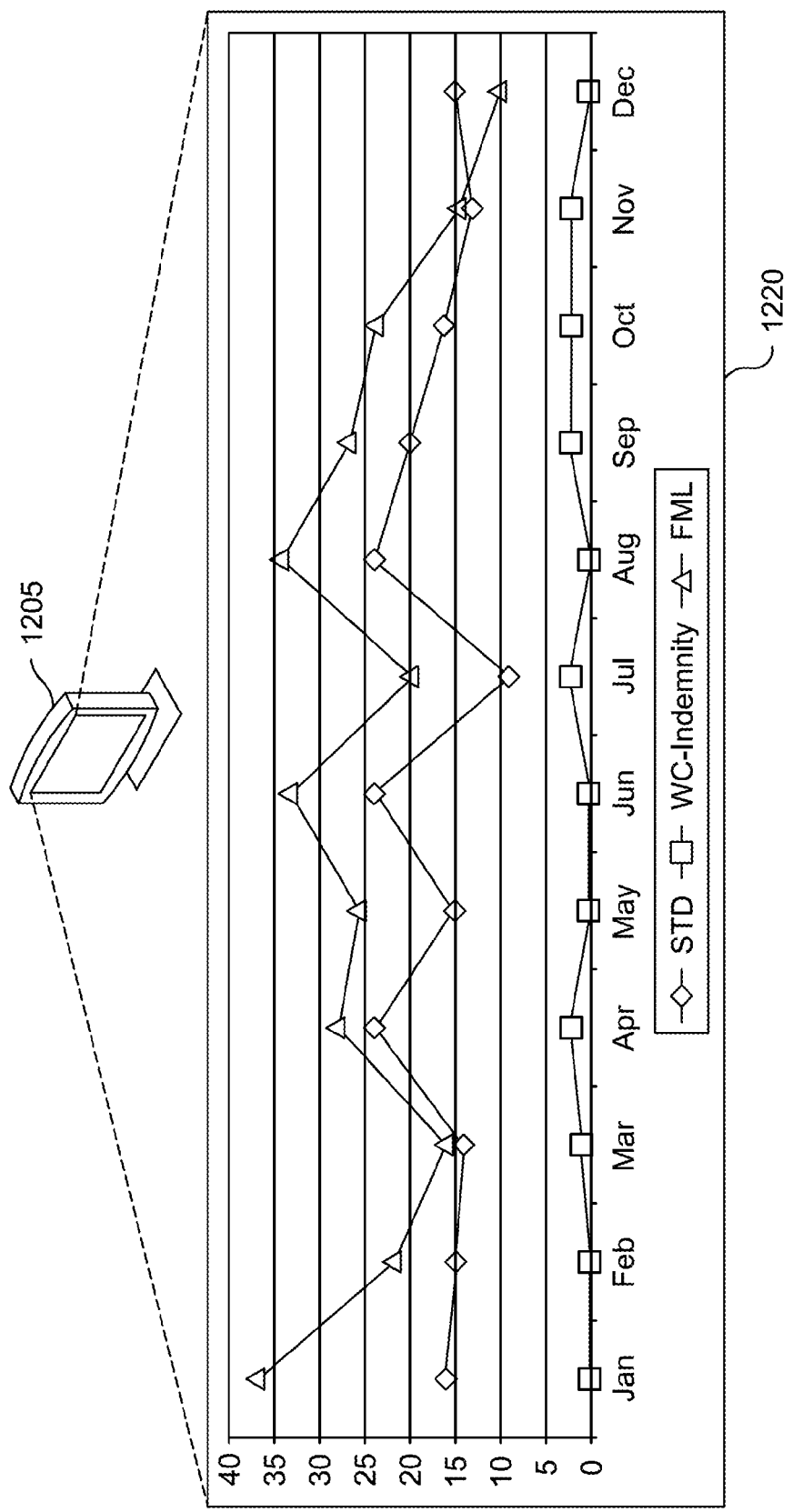

Computer system 1105 may retrieve data, perform analyses of the data, and displays on screens and/or on printouts, with tables and graphs, such as those shown in FIGS. 12A-12E. In embodiments, program code may be provided for computer system to perform these tasks without an operator. In embodiments, analyst 1107 may cause the computer system to perform these tasks. Referring to FIG. 12A, a computer system has displayed on exemplary monitor 1205 summary table 1210, using sample data, reporting leave by lost days and average claim cost for different types of leave, and comparisons with industry benchmarks in a number of categories, including lost days per a given number of full time equivalents, average costs per claim and per full time equivalents, and other data. The categories and comparisons are merely exemplary.

Referring to FIG. 12B, a computer system has displayed on exemplary monitor 1205 a summary table 1215, using sample data, showing employee leave data for three locations (7-S, 3-O, 1-B), and categorized by type of leave, i.e., Family and Medical Leave (FML), short term disability (STD), long term disability (LTD), workers compensation—indemnity and workers compensation—medical. The displayed data includes total claims, total lost days, average duration of the claim and total cost. The table may be modified to include other data, such as median lost days and median and average cost.

Referring to FIG. 12C, a computer system has displayed on exemplary monitor 1205 graph 1220, using sample data, of numbers of new short term disability, workers compensation—indemnity, and family and medical leave claims, by month, for a one year period. Employers may note month to month variations in numbers of claims. The monthly time period is merely exemplary, and values of numbers of claims for other time periods, such as weeks and calendar quarters, may be provided. The types of claims selected are also merely exemplary.

Figure 12D:
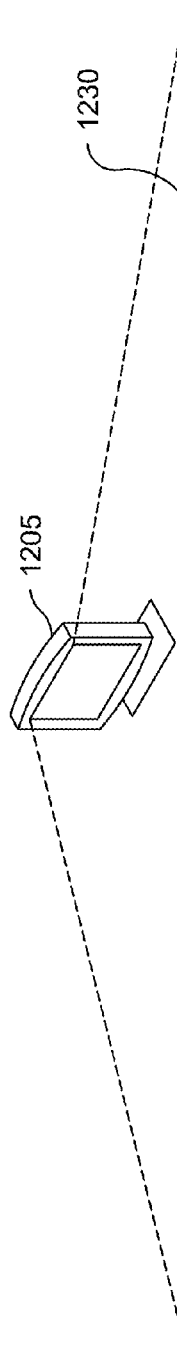

Referring to FIG. 12D, a computer system has displayed on exemplary monitor 1205 a table 1230, using sample data, of leave claims by loss unit for a certain time period. Each loss unit represents employees grouped together, such as by location or job description. The number of new claims, the percentage of all claims represented by claims from the loss unit, the average duration of a claim, the total benefits paid, the percentage of total benefits, and the average cost of each closed claim are shown for each loss unit. This table permits an employer to identify loss units that represent disproportionate leave expenses for investigation and remedial action.

Referring to FIG. 12E, a computer system has displayed on exemplary monitor 1205 a pie chart 1240 displaying relative numbers of absence claims filed by employees in three ranges of tenure with the employer. This chart is useful to the employer in identifying whether new employees account for a disproportionate share of claims.

Numerous other presentations of data are possible. For example, employees may be grouped by multiple characteristics (e.g., two or more of location, loss unit, tenure and job description). Comparisons of rates of claims and rates of expenses to industry benchmarks may be displayed, such as compared to percentiles of employers in the same industry. Data may be presented in graphical form, tabular form, and combinations of the two.

Figure 13A:
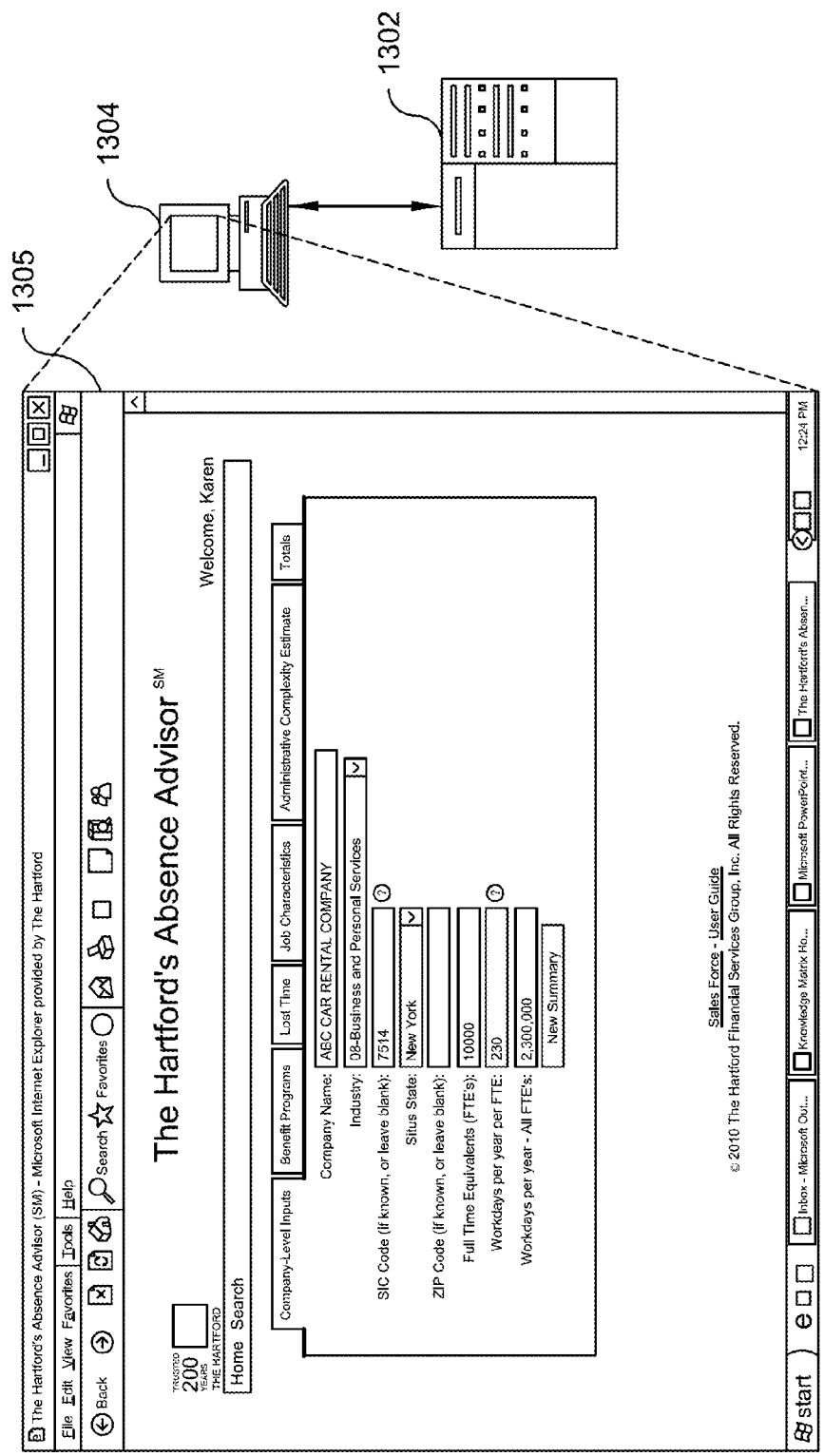
Figure 13B:
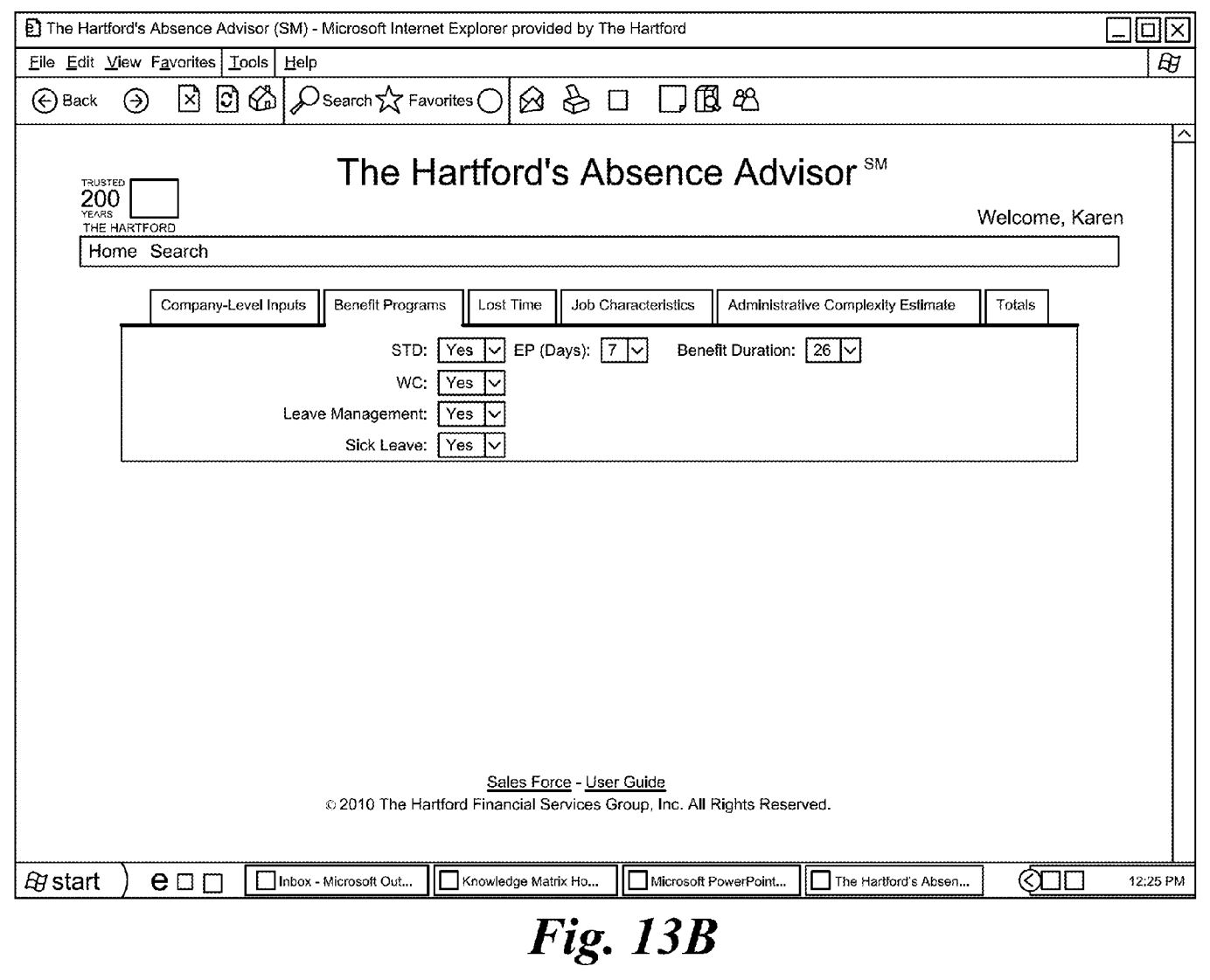
Figure 13C:
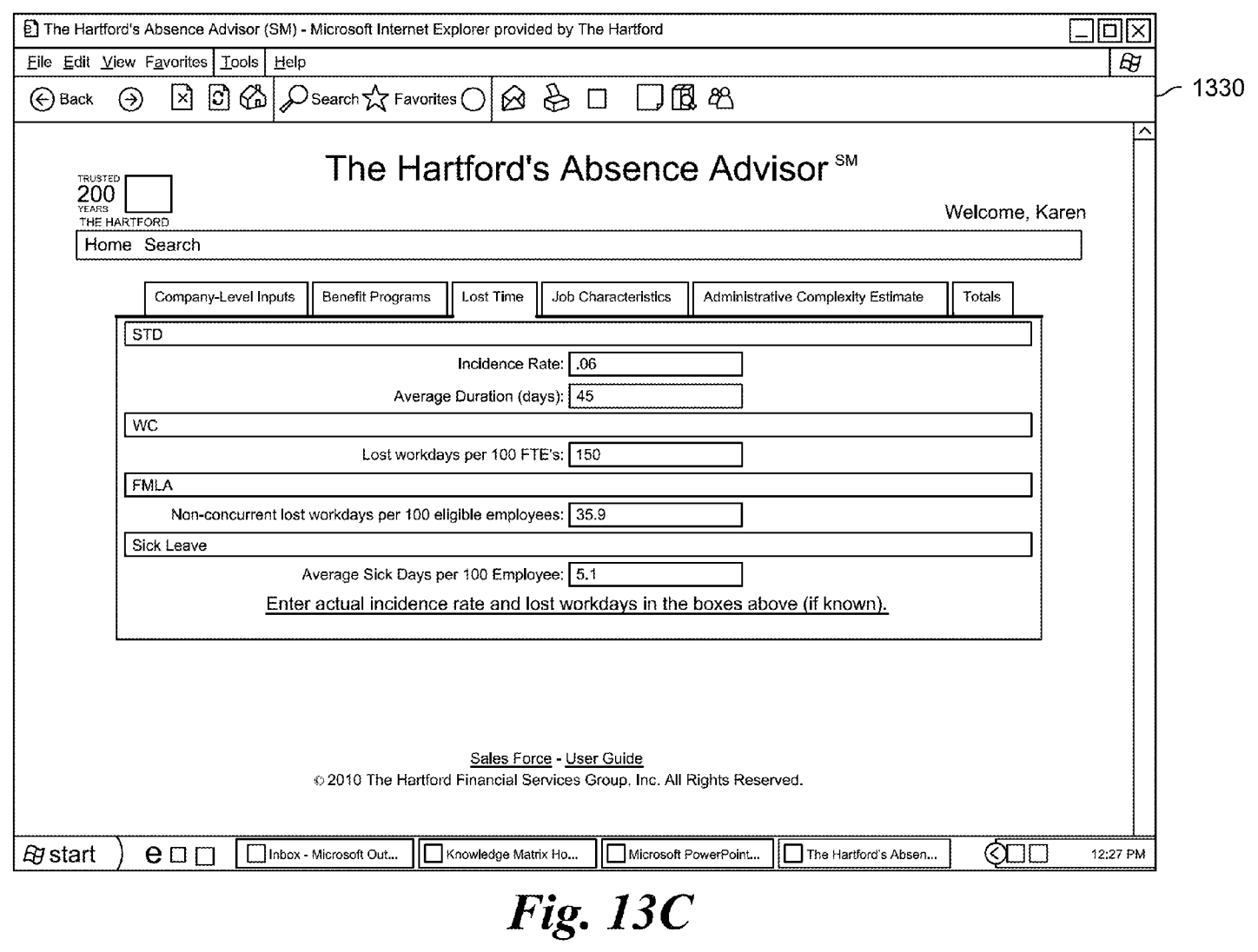

In an embodiment, a method and system is provided for receiving employer data as to employee census, business type, and benefit programs, and, based on the received employee census data, providing estimated data relating to one or more of absence rates, loss of productivity, and estimated savings, based on implementing a comprehensive leave management program. This embodiment may be referred to as a productivity model for leave management, as the method and system estimates productivity gains associated with implementation of comprehensive leave management methods and systems. In an embodiment, a method and system for providing estimated data relating to the above may be implemented in a client-server environment. Referring to FIG. 13A, a server-based program has caused a processor of server 1302 to generate display 1305 in a browser window running on client device 1304 in communication, such as via a network, with server 1302. Display 1305 may be generated responsive to user selection of the "Company-Level Inputs" tab. Display 1305 prompts a user to supply data identifying an employer, such as employer name, employer industry, employer business, such as by SIC (standard industrial classification) code, geographic data, such as state and zip code, number of FTE (full time equivalent) employees, and hours per FTE. The browser transmits the entered data to the server-based system, which receives the entered data and may calculate and provide an output signal having data causing the browser to display a total number of workdays per year for the employer. Referring to FIG. 13B, the server-based program, responsive to user selection of the tab marked "Benefit Programs," has caused a server processor to generate display 1320 in a browser window. Display 1320 prompts a user to supply data relating to benefit programs of an employer. The data may include whether the employer offers short term disability, and if so a length of the elimination period in days, and the maximum duration of benefits under short term disability in days. The display also prompts a user to identify whether the employer is responsible for workers compensation, whether the employer already has a leave management program, and whether sick leave is offered. The data is transmitted by the browser to the server. Referring to FIG. 13C, responsive to user selection of the "Lost Time" tab, the server processor may generate display 1330, which prompts a user to input data relating to an employer's experience with certain leave types, and in this example with respect to short term disability, long term disability, Family and Medical Leave Act and sick leave. Exemplary data includes incident rate and average duration for short term disability, average lost days per 100 full time equivalents for long term disability, non current lost workdays per 100 eligible employees for FMLA, and average sick days per employee for sick leave. The user may enter the data in the display, or choose to have the system employ industry data for the employer's business type and SIC code.

Figure 13D:
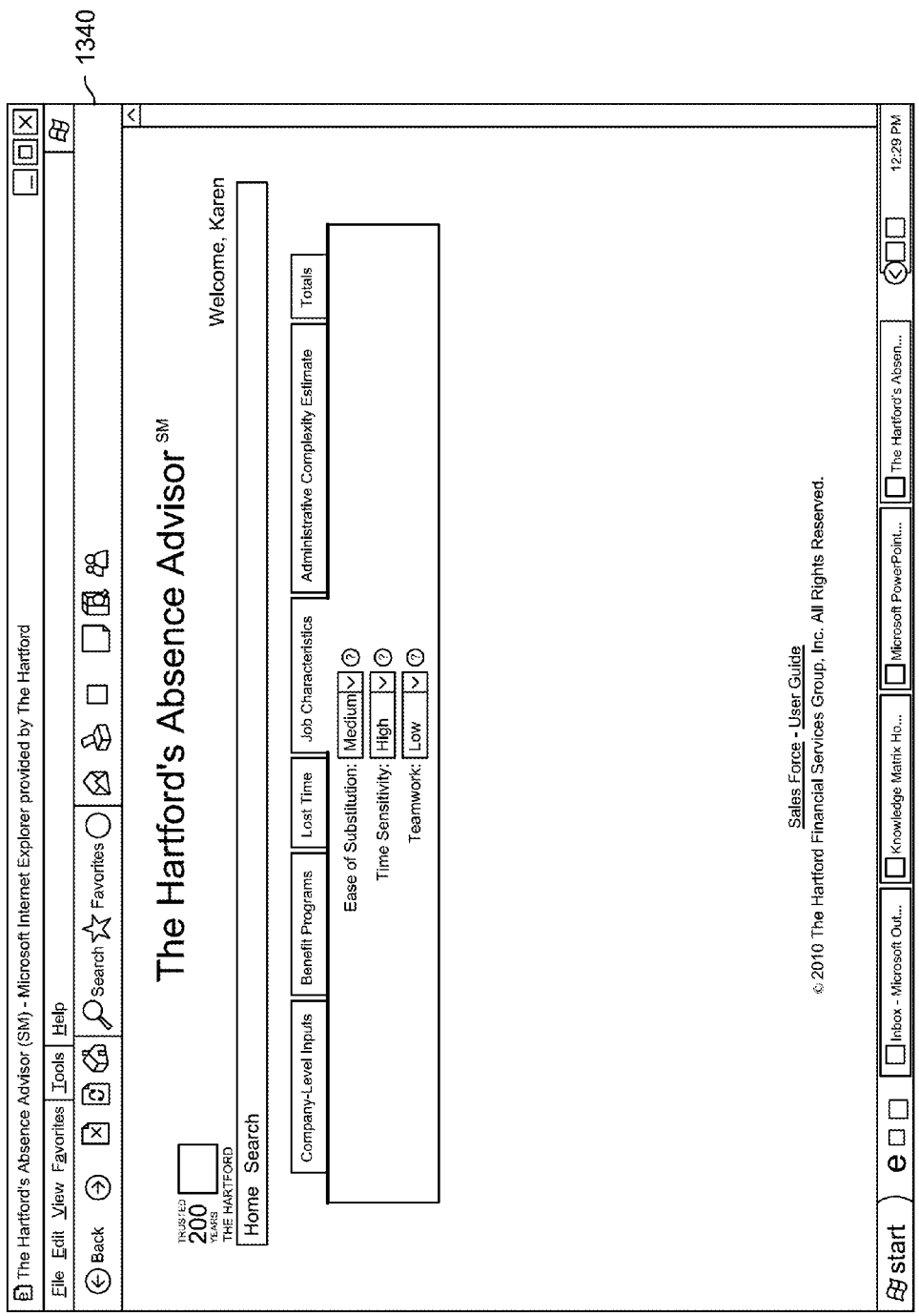

Referring to FIG. 13D, responsive to user selection of the "Job Characteristics" tab, the server processor may generate display 1340, which prompts the user to provide certain data relating to characteristics of the positions, which characteristics are related to loss of productivity due to absences. The listed exemplary characteristics are ease of substitution, time sensitivity and teamwork. In general, a higher value of ease of substitution means that the tasks of an absent employee can readily be performed by another employee, and thus a higher value of ease of substitution is correlated with decrease in productivity losses in an algorithm employed by the system to determine productivity losses resulting from absences. In general, higher values of time sensitivity and teamwork mean that an absence results in greater loss of productivity. The system may provide drop down menus for selection of verbal, numerical or other values of the characteristics.

Figure 13E:
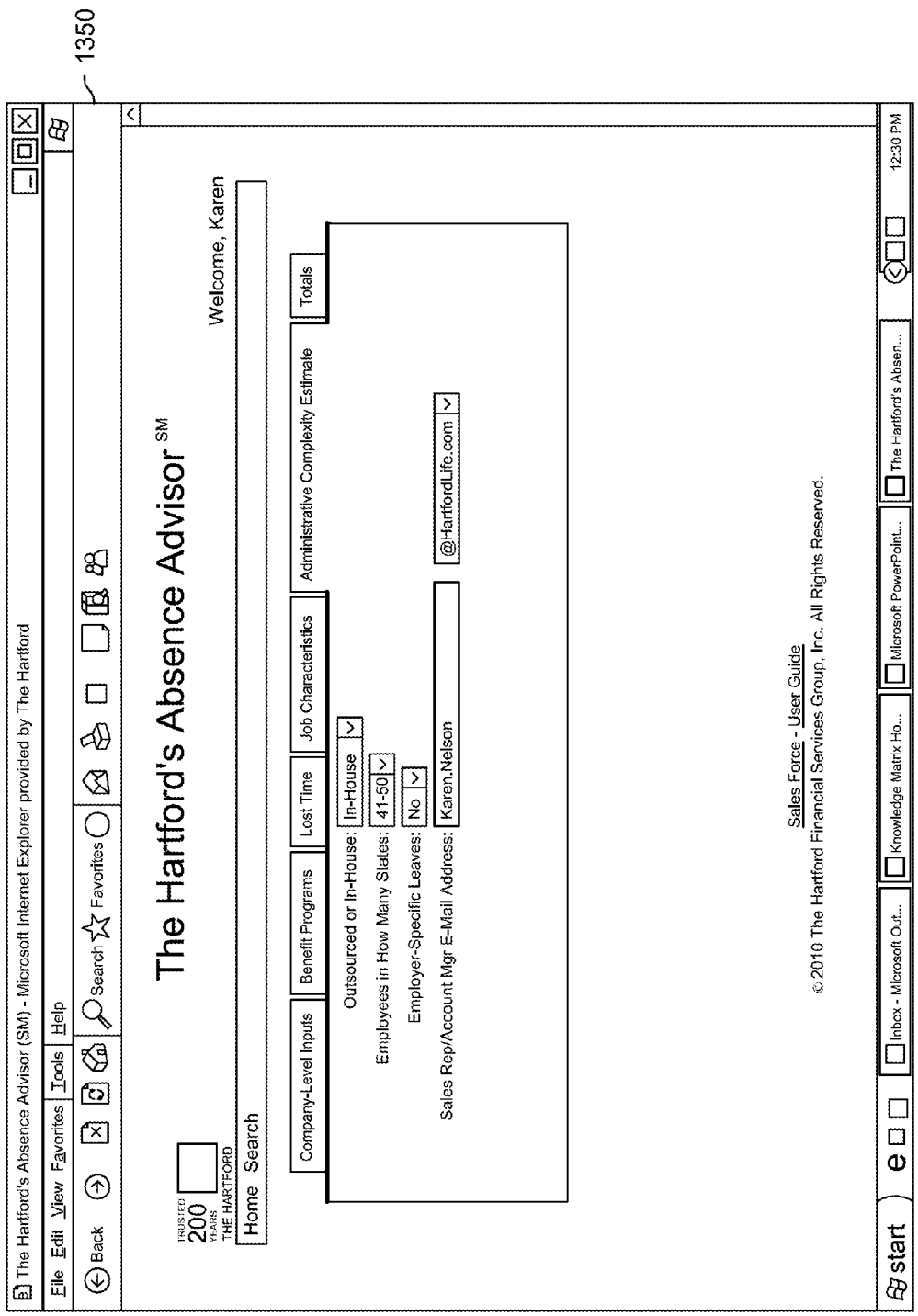

Referring to FIG. 13E, responsive to user selection of the "Administrative Complexity Estimate" tab, the server processor may generate display 1350, which prompts the user to provide data for features that are related to complexity of the administration of leaves for the employer. The data include whether leave management is outsourced by the employer or performed in-house by employees, the number of states in which the employer has facilities with employees, and whether the employer has types of leave that are specific to that employer, in addition to leaves required under applicable law and regulation. In general, the greater the complexity, the greater the potential cost reduction associated with a program for management of leaves.

Referring to FIG. 13F, the server process has generated display 1360, which estimates the lost productivity and anticipated savings based on implementing a program for management of leaves. The estimated savings, based on algorithms using the data provided by the user and industry data, may be presented as a savings in terms of average cost of full time equivalent employees, and in number of workdays. Estimated and actual data for lost workdays and rate of absence by leave type of shown. An administrative complexity level score is shown, based on responses to questions or on industry averages. Additional data on lost workdays and absence rates is shown by numbers of lost workdays and by rate of absence; this data is broken out by type of leave. The rate of absence and lost workdays may be derived from user-furnished data, or may be calculated from user-input data. An absence multiplier value is determined using an algorithm in which factors may include the values of teamwork, time sensitivity and ease of substitution. The absence value multiplier provides an indication of the effect of an absence on productivity. In general, as the values of teamwork and time sensitivity increase, the value of the absence multiplier is increased. As the value of ease of substitution increases, the value of the absence multiplier decreases.

Referring to FIG. 14, another exemplary embodiment of a system 1400 of the present invention is shown. System 1400 includes a comprehensive leave management server 1410 which includes one or more engines or modules which may be utilized to perform one or more steps or functions of the present invention. The term "module," as used herein, includes computer hardware, including processors and memory devices, having loaded program code causing the processor and other devices to perform particular functions. In an embodiment, the present invention is implemented as one or more modules of a computer software program in combination with one or more components of hardware. Such software programs will be used, for example, when an employer or employee initiates a claim, or makes an inquiry or other request, when another computer system furnishes data to a comprehensive leave management system, when rules implemented by the comprehensive leave management system cause the system to initiate communications, and comprises part of the processing done on the server side of the network. In embodiments, the program will be used in an Internet environment, where the server is a Web server and the inquiry or other request is formatted using HTTP (or HTTPS). Alternatively, the server may be in a corporate intranet, extranet, or any other type of network. Use of the term "Internet" herein, when discussing processing associated with the user's inquiry or request, includes these other network environments, unless otherwise stated. Additionally, a graphical user interface or leave management processing module may be implemented as an intelligent hardware component incorporating circuitry comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. One or more functions of a web client or other module may be implemented as application software in the form of a set of processor-executable instructions stored in a memory of a client device, such as smart phone 1454, and capable of being accessed and executed by a processor of the client device.

Referring still to FIG. 14, server 1410 includes a data capture or input/output module 1412, a communications module 1414, a dynamic display generation or graphical user interface module 1416, a data module 1418, and a data validation module 1420.

Data module 1418 is in further communication with a number of databases such as claim data database 1430, employer data database 1432, industry claim data database 1434, and absence law and policy data database 1436. Databases may include both internal and/or external/third party databases. By way of example, external databases may include employer databases for access to employee data, and databases of individual leave management systems, such as workers compensation administration systems and short term disability administration systems. Server 1410 may be configured for bulk upload of data for leave management, such as data relating to individual claimants, such as name, address, birth date, service years, job description, type of claim, date of claim, description of claim, and dates of leave, from databases and spreadsheets on client device 1452 to a database associated with the server. One or more modules may be configured to perform data validation steps prior to storing bulk uploaded data. Server 1410 may further be configured to permit bulk download of data, such as claim data and analyses of claim data, to a client device.

In operation, server 1410 is in communication with client devices, such as computer 1452 or smartphone 1454 via a network 1450, which facilitates interaction with server 1410, using, by way of example, one or more graphical user interfaces. As used herein, devices, such as client devices 1452, 1454 may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Referring still to FIG. 14, utilizing client devices 1452, 1454, an employer may initiate new claims for intake, review the status of claims, and upload reports and analyses, such as the table displayed at 1456. An employee may also use client devices 1452, 1454 to access server 1410 and to obtain data concerning the employee's claims and documents related to the claims. One or more of the above modules, such as graphical user interface module 1416, data module 1418 and data validation module 1420 may also be implemented in combinations of software and hardware for execution by various types of computer processors coupled to such hardware.

Referring to FIG. 15, a high level view of an environment for implementation of a method and system for comprehensive employee leave management is illustrated. Businesses of various types that have employees are shown. The exemplary businesses include a retail store 1510 having employees 1511, factory 1520 having employees 1521, and office-based business 1530 having employees 1531. The retail store 1510, factory 1520 and office-based business 1530 will each have varying rules for various types of employee leave. Comprehensive leave management system server 1550 permits client devices operated by individual employers and officers and other representatives of the businesses, and employees of the businesses, to initiate claims for employee leave, to monitor the progress of claims, to receive requests for information from the system and from leave management specialists, and to obtain reports relating to employee leave. Comprehensive leave management system server 1550 provides a single point of contact for employees and managers relative to a variety of different types of leave, including short term disability 1552, long-term disability 1554, workers compensation 1556, family medical leave 1558, employer-specific leave 1560 and state-mandated leave 1562. Data provided to leave management system server 1550 may be employed in connection with administration and analysis of the various types of leave.

Figure 16:
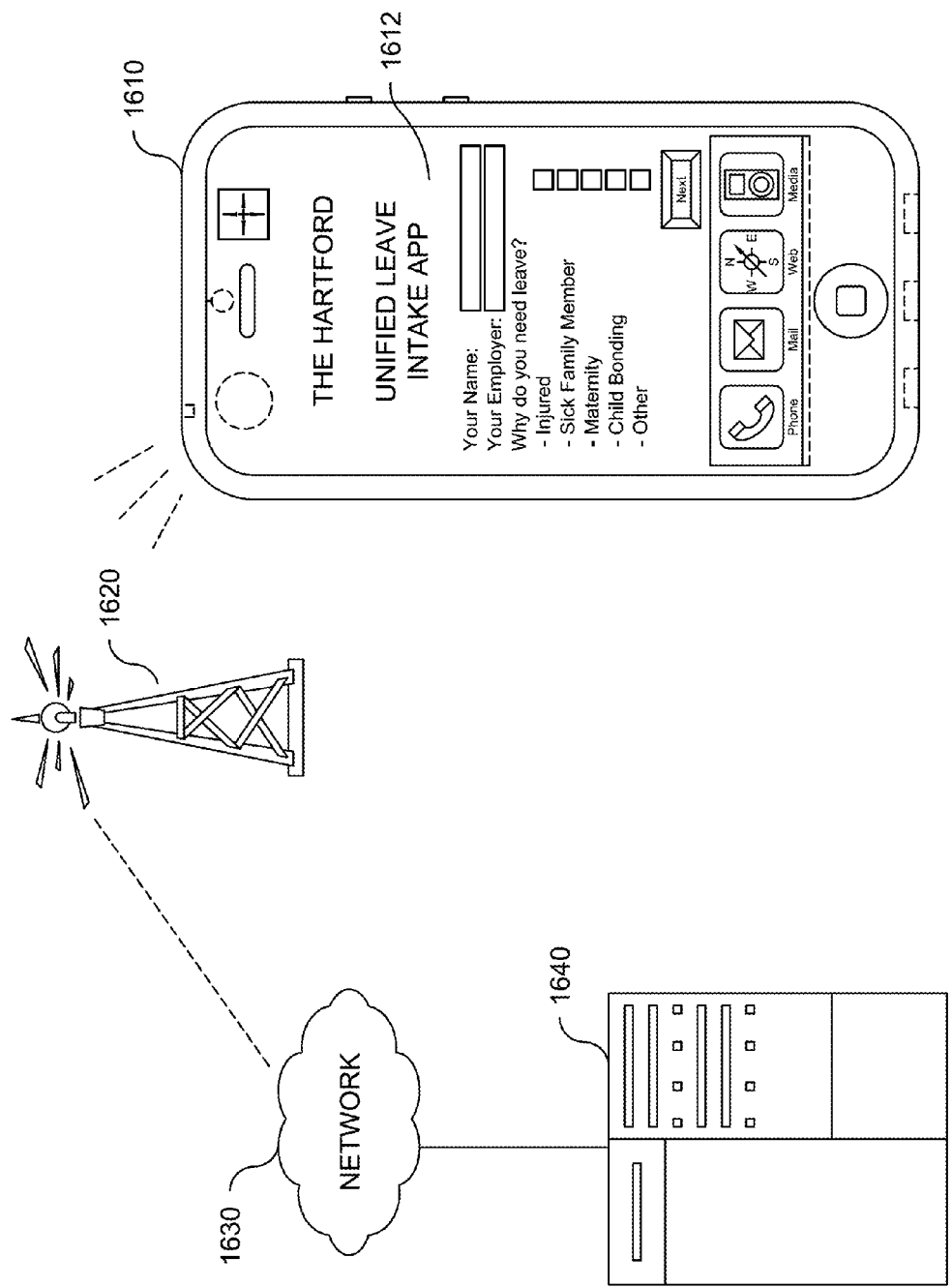
FIG. 16 is a schematic diagram illustrating a system including a handheld wireless device for implementing an embodiment of the invention.

Referring now to FIG. 16, there is shown a system for administration of claims for employee leave. Hardware server 1640 is an exemplary computer system, such as an insurance company computer system. Hardware server 1640 may include a processor and devices in communication with the processor via a bus, the devices including data storage devices, communications devices, user interfaces, and other devices. Hardware server 1640 may be configured, such as through processor-executable instructions stored as program code in one or more of the data storage devices, to provide the functionality of a comprehensive leave management computer system. Hardware server 1640 is in communication, via network 1630, which may include one or more local area networks, wide area networks and interconnected networks (including the Internet), with a wireless communications network, represented by antenna 1620. The wireless communications network may be a wireless telephone communications network for transmission of voice and data to and from mobile wireless devices, such as cellular telephones, smart phones and computers. Handheld wireless communications device 1610 is in wireless communication with the wireless communications network via antenna 1620. Handheld wireless communications device may be any device capable of bidirectional wireless communications via cellular telephone networks, wi-fi devices, two-way radio, or any other form of wireless communications. Handheld wireless communications device 1610 may be a cellular telephone, smart phone, personal digital assistant, tablet computer, notebook computer, or other type of wireless communications device with a display and processing capability.

In an embodiment, handheld wireless communications device 1610 may include a processor and memory device or memory devices in communication with the processor, as well as wireless antenna assemblies and one or more displays, such as touch screen displays, in communication with the processor. In an embodiment, a memory device of handheld wireless communications device 1610 has stored therein an application program including processor executable instructions for receiving submissions for claims for employee leave and analyzing submitted claims for eligibility. The application program instructions, when executed by the processor of the device 1610, may cause the processor to provide an output to cause displays, such as display 1612, to prompt a user to enter information required to request leave. The prompts may request information including the name and employer of the employee and a general reason for the requested leave. In an embodiment, the general reasons may include that the employee is injured, that a family member of the employee is ill, maternity of the employee, or child bonding, such as for adoption. An "other" selection may be provided, which results in the processor generating a display having questions for types of leave not covered by the categories listed on an initial screen. Once a user has input via the display a category of leave, the device may display additional questions specific to the type of leave requested.

In an embodiment, a memory device may have stored, as part of an application program, instructions which, when executed by the processor, cause the processor to determine whether the submitted information is sufficient for an eligibility determination to be made, before transmission of data indicative of the request for leave to server 1640. The memory device may have further stored, as part of the application program, instructions which, when executed by the processor, cause the processor to determine whether the claim is eligible for leave before transmission of the information to server 1640. The instructions may further, when executed by the processor, cause the processor to provide a signal to the display to cause the a display of the result of the determination. Thus, in an embodiment, a handheld wireless device may prompt the user for information sufficient for a complete request for leave via a display, receive via a user interface, such as a touch screen or keypad, data necessary for the determination, and determine, based on the received data and stored rules, whether the employee is eligible for the requested leave. The handheld wireless device may then generate a display having text and graphics that inform the user whether the leave is eligible, and provide information and documents setting forth the rights and responsibilities of the employee, depending upon the result of the determination. In embodiments, one or more of these functions may be performed by a processor of a server. By way of example, steps of determining whether the data is complete for an eligibility determination and the determining of the eligibility of the employee for leave may be performed by a processor of the server based on data received by the handheld device and transmitted to the server. The server may then transmit to the handheld device data indicative of a result of the determination. Any steps described in the present application as being performed by a comprehensive leave management computer system, by way of example, may be performed, in whole or in part, by a processor of a handheld device executing instructions stored in a non-transitory computer-readable medium of the handheld device.

Embodiments of the present invention, including any embodiments described in the present application, may be implemented with steps performed by a processor of a smart phone accessing data in a leave management database of the system, and accessing and executing instructions stored in a computer-readable memory of the smart phone. The instructions may be embodied in an application program that may be executed by the processor of the smart phone.

As used herein, a module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, comprise the module and achieve the stated purpose for the module such as implementing the business rules logic prescribed by the present system. In the present invention a module of executable code may be a compilation of many instructions, and may even be distributed over several different code partitions or segments, among different programs, and across several devices. Similarly, data, including by way of example claim, employee and employer data, may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a system and/or network as shown and described herein.

Embodiments of the present invention are operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to non-transitory computer-readable media, including magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over one or more networks, which networks may include the Internet. Either stand-alone computers or client/server systems, or any combination thereof, may be employed.

In embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. For example, data may be formatted in accordance with a data format for insurance data, such as an ACORD compatible format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system in accordance with embodiments the invention may include means corresponding to each step in each method described herein. Each means may be implemented by a processor executing instructions contained in programs which may be stored in a storage medium, such as a magnetic or optical storage medium. The instructions may, when executed by a processor, cause the processor to execute algorithms disclosed in association with each step. It will be appreciated that any of the steps in the methods in accordance with embodiments of the invention described herein may be so implemented.

Exemplary advantages of a system and method in accordance with an embodiment include: simplified and streamlined initiation and review of leave claims and analysis of leave claims.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for employee leave management, comprising:
a leave management system processor;
a memory storage device in communication with the leave management system processor; and
a communications device in communication with the leave management system processor, the memory storage device and a computer communications network;
wherein the leave management system processor is configured to:
receive, from a user-accessible device, via the computer communications network, data in the nature of a request to initiate a claim for one of a plurality of types of employee leave;
responsive to receiving the data, determine the type of leave from at least a first leave type and a second leave type, and cause the user-accessible device to prompt the user for data specific to the determined type of leave;
in accordance with the determination, provide an output signal to transmit data relating to the leave to one of a first computer system for processing leaves determined to be of the first leave type, the first computer system being a workers compensation administration computer system and the first leave type being workers compensation leave and a second computer system for processing leaves determined to be of the second leave type, the second computer system being a short term disability administration computer system and the second leave type being short term disability leave,
receive and store leave claim data in the memory storage device; and
receive from the workers compensation administration computer system data indicative of a denial of a claim for workers compensation leave for an injury and, responsive to receipt of the data indicating the denial of the claim for workers compensation leave for the injury, provide an output signal to the short term disability administration computer system providing data for initiating a short term disability claim for the injury.

2. The computer system of claim 1, further comprising analyzing received data relating to a plurality of types of employee leave claims, and providing one or more reports based on the analyzing.

3. The computer system of claim 1, wherein the leave management system processor is further configured to determine, based on the received leave claim data, whether sufficient leave claim data has been received to make a determination as to eligibility for leave of a third leave type.

4. The computer system of claim 3, wherein the leave management system processor is further configured to, responsive to determining that sufficient leave claim data has not been received, prompt a user to submit additional data.

5. The computer system of claim 3, wherein the leave management system processor is further configured to, responsive to determining that sufficient leave claim data has not been received, determine whether a time period to provide data has expired, and responsive to determining that the time period to provide data has expired, determine to close the claim.

6. The computer system of claim 5, wherein the data to be provided within the time period comprises treating physician records.

7. The computer system of claim 1, wherein the leave management system processor is further configured to determine, based on the received leave claim data, whether sufficient leave claim data has been received to make a determination as to eligibility for leave of a third leave type, and, responsive to determining that sufficient leave claim data has been received, determine eligibility.

8. The computer system of claim 7, wherein the leave management system processor is further configured to, responsive to determining eligibility, provide an output signal indicative of referring the claim for management.

9. The computer system of claim 1, wherein the step of determining the type of leave comprises applying a set of predetermined rules to the received data for categorizing the claim as at least one of the first leave type or the second leave type.

10. The computer system of claim 1, wherein the first and second computer systems comprise separate computer systems each having at least one discrete processor.

11. A computer-implemented method for management of employee leave, comprising:
receiving, by a leave management system processor, from a user-accessible device, via a computer communications network, data in the nature of a request to initiate a claim for one of a plurality of types of employee leave;
responsive to receiving the data, determining by the leave management system processor the type of leave from at least a first leave type and a second leave type, and causing the user-accessible device to prompt the user for data specific to the determined type of leave;
in accordance with the determination, provide an output signal to transmit data relating to the leave to one of a first computer system for processing leaves determined to be of the first leave type, the first computer system being a workers compensation administration computer system and the first leave type being workers compensation leave and a second computer system for processing leaves determined to be of the second leave type, the second computer system being a short term disability administration computer system and the second leave type being short term disability leave, storing received leave claim data in a memory storage device in communication with the leave management system processor; and receiving by the leave management computer system processor from the workers compensation administration computer system data indicative of a denial of a claim for workers compensation leave for an injury and, responsive to receipt of the data indicating the denial of the claim for workers compensation leave for the injury, provide an output signal to the short term disability administration computer system providing data for initiating a short term disability claim for the injury.

12. The computer-implemented method of claim 11, wherein the step of determining by the leave management system processor the type of leave comprises determining that the leave is one of workers compensation, short term disability, long term disability, and Family and Medical Leave Act leave.

13. The computer-implemented method of claim 11, further comprising, based on the received leave claim data, determining whether sufficient leave claim data has been received to make a determination as to eligibility for leave of a third leave type.

14. The computer-implemented method of claim 13, further comprising, responsive to determining that sufficient leave claim data has been received to make a determination, making a determination, and generating correspondence documenting the determination.

15. The computer-implemented method of claim 11, further comprising assigning an individual to a task comprising obtaining data for an eligibility determination for a third leave type.

16. The computer-implemented method of claim 11, further comprising providing on the user-accessible device a script to facilitate telephone intake of a claim.

17. A non-transitory computer-readable medium, the medium having computer-readable instructions stored thereon, which instructions, when executed by a leave management system processor, cause the leave management system processor to:

receive, from a user-accessible device, data in the nature of a request to initiate a claim for one of a plurality of types of employee leave;

responsive to receiving the data, determine the type of leave from at least a first leave type and a second leave type, and cause the user-accessible device to prompt the user for data specific to the determined type of leave;

in accordance with the determination, provide an output signal to transmit data relating to the leave to one of a first computer system for processing leaves determined to be of the first leave type, the first computer system being a workers compensation administration computer system and the first leave type being workers compensation leave and a second computer system for processing leaves determined to be of the second leave type, the second computer system being a short term disability administration computer system and the second leave type being short term disability leave, receive and store leave claim data in the memory storage device; and receive from the workers compensation administration computer system data indicative of a denial of a claim for workers compensation leave for an injury and, responsive to receipt of the data indicating the denial of the claim for workers compensation leave for the injury, provide an output signal to the short term disability administration computer system providing data for initiating a short term disability claim for the injury.

18. The non-transitory computer-readable medium of claim 17, wherein the instructions further cause the leave management system processor to receive data identifying an employee associated with the claim, search in data stored in a memory storage device for data relating to the employee, and provide a notification to a user responsive to failing to identify the employee.

19. The non-transitory computer-readable medium of claim 17, wherein the instructions further cause the leave management system processor to determine whether sufficient data has been received to make a determination of eligibility for the claim, the claim being of a third leave type.

20. A computer system for administration of employee leave, comprising:

a comprehensive leave management computer system, comprising a leave management system processor and a memory storage device in communication with the processor, wherein the leave management system processor is configured to:

receive data indicative of an employee leave claim;

determine, based on the received data, a type of claim from at least a first claim type and a second claim type;

in accordance with the determination, provide an output signal to transmit data relating to the claim to one of a first computer system for processing claims determined to be of the first claim type, the first computer system being a workers compensation administration computer system and the first claim type being a workers compensation claim, and a second computer system for processing claims determined to be of the second claim type, the second computer system being a short term disability administration computer system and the second claim type being short term disability leave; and receive from the workers compensation administration computer system data indicative of a denial of a claim for workers compensation leave for an injury and, responsive to receipt of the data indicating the denial of the claim for workers compensation leave for the injury, provide an output signal to the short term disability administration computer system providing data for initiating a short term disability claim for the injury.

21. The computer system of claim 20, wherein the leave management system processor is further configured to, prior to providing the output signal to the short term disability administration computer system, determine whether required consents for sharing of data have been obtained, and responsive to determining that the required consents have not been obtained, provide a signal indicative that the data is not to be transmitted to the short term disability administration computer system.

22. A computer-implemented method for administration of employee leave, comprising:

receiving, by a processor of a comprehensive leave management computer system, data indicative of an employee leave claim;

determining by the processor of the comprehensive leave management computer system, based on the received data and rules stored in a memory storage device of the comprehensive leave management computer system, a type of claim from at least a first claim type and a second claim type;

in accordance with the determination, provide an output signal to transmit data relating to the claim to one of a first computer system for processing claims determined to be of the first claim type, the first computer system being a workers compensation administration computer system and the first claim type being a workers compensation claim, and a second computer system for processing claims determined to be of the second claim type, the second computer system being a short term disability administration computer system and the second claim type being a short term disability claim; and receiving by the processor of the comprehensive leave management computer system from the workers compensation administration computer system data indicative of a denial of a claim for workers compensation leave for an injury and, responsive to receipt of data indicating the denial of the claim for workers compensation leave for the injury, providing by the processor of the comprehensive leave management computer system an output signal to the short term disability administration computer system providing data for initiating a short term disability claim for the injury.

23. The computer-implemented method of claim 22, further comprising, prior to providing the output signal to the short term disability administration computer system, determining by the processor of the comprehensive leave management computer system whether required consents for sharing of data have been obtained, and responsive to determining that the required consents have not been obtained, providing by the processor of the comprehensive leave management computer system a signal indicative that the data is not to be transmitted to the short term disability administration computer system.

24. A non-transitory computer-readable medium, the medium having computer-readable instructions stored thereon, which instructions, when executed by a processor, cause the processor to:

receive data indicative of an employee leave claim;

determine, based on the received data, a type of claim from at least a first claim type and a second claim type;

in accordance with the determination, provide an output signal to transmit data relating to the claim to one of a first computer system for processing claims determined to be of the first claim type, the first computer system being a workers compensation administration computer system and the first claim type being a workers compensation claim and a second computer system for processing claims determined to be of the second claim type, the second computer system being a short term disability administration computer system and the second claim type being a short term disability claim; and receive from the workers compensation administration computer system data indicative of a denial of a claim for workers compensation leave for an injury and responsive to receipt of data indicating the denial of the claim for workers compensation leave for the injury, provide an output signal to the short term disability administration computer system providing data for initiating a short term disability claim for the injury.

\* \* \* \* \*

UNITED STATES PATENT AND TRADEMARK OFFICE
CERTIFICATE OF CORRECTION

| | |
|---|---|
| PATENT NO. | : 8,639,634 B2 |
| APPLICATION NO. | : 13/025498 |
| DATED | : January 28, 2014 |
| INVENTOR(S) | : Karen J. Nelson, Marjorie E. Savage and Fredrick J. Weber |

It is certified that error appears in the above-identified patent and that said Letters Patent is hereby corrected as shown below:

In the Specification:

Column 12, TABLE-1 continued, after "Volunteer Firefighter" in line 8 and before "District of Columbia" in line 9, please insert the following 4 lines:

--Connecticut   Family and Medical Leave
                Maternity Leave
                Crime Victims Leave
                Volunteer Firefighter--

Signed and Sealed this
Sixth Day of May, 2014

Michelle K. Lee
*Deputy Director of the United States Patent and Trademark Office*